US012566114B2

(12) United States Patent
Cox et al.

(10) Patent No.: US 12,566,114 B2
(45) Date of Patent: Mar. 3, 2026

(54) METHODS OF USING MODULAR ASSAY SUPPORT DEVICES

(71) Applicant: 10x Genomics, Inc., Pleasanton, CA (US)

(72) Inventors: David Maurice Cox, Foster City, CA (US); Layla Katiraee, Castro Valley, CA (US)

(73) Assignee: 10x Genomics, Inc., Pleasanton, CA (US)

(*) Notice: Subject to any disclaimer, the term of this patent is extended or adjusted under 35 U.S.C. 154(b) by 0 days.

(21) Appl. No.: 19/081,651

(22) Filed: Mar. 17, 2025

(65) Prior Publication Data

US 2025/0216303 A1     Jul. 3, 2025

Related U.S. Application Data

(63) Continuation of application No. 18/784,392, filed on Jul. 25, 2024, now Pat. No. 12,287,264, which is a
(Continued)

(51) Int. Cl.
*G01N 1/36* (2006.01)
*B01L 9/00* (2006.01)

(52) U.S. Cl.
CPC ................ *G01N 1/36* (2013.01); *B01L 9/527* (2013.01); *B01L 2200/025* (2013.01);
(Continued)

(58) Field of Classification Search
CPC .... G01N 1/36; G01N 2001/368; B01L 9/527; B01L 2200/025; B01L 2200/0689;
(Continued)

(56) References Cited

U.S. PATENT DOCUMENTS 4,557,903 A * 12/1985 McCormick ............. G01N 1/36
425/84
4,574,729 A   3/1986 Wells
(Continued)

FOREIGN PATENT DOCUMENTS

CA       3054046       3/2020
CN       1425133       6/2003
(Continued)

OTHER PUBLICATIONS

[No Author Listed], "Chromium Next GEM Single Cell 3' Reagent Kits v3.1—User Guide," 10x Genomics, Document No. CG000204, Nov. 2019, 58 pages.
(Continued)

*Primary Examiner* — Jill A Warden
*Assistant Examiner* — Jacqueline Brazin
(74) *Attorney, Agent, or Firm* — Fish & Richardson P.C.

(57)           ABSTRACT

A substrate holder includes a base configured to receive a substrate; a cover configured to mateably engage with the base, the cover defining an opening formed by inner sidewalls; and a removable insert defining a surface, the removable insert being configured to be received within the opening of the cover. The removable insert includes a gasket; a projection coupled to the gasket; and at least two insert tabs extending from opposite sides of the removable insert, each insert tab being configured to engage with at least one of the inner sidewalls forming the opening of the cover.

30 Claims, 21 Drawing Sheets

Specification includes a Sequence Listing.

Related U.S. Application Data continuation of application No. 18/357,610, filed on Jul. 24, 2023, now Pat. No. 12,098,985, which is a continuation of application No. PCT/US2022/017006, filed on Feb. 18, 2022.

(60) Provisional application No. 63/270,254, filed on Oct. 21, 2021, provisional application No. 63/151,300, filed on Feb. 19, 2021.

(52) U.S. Cl.
CPC . *B01L 2200/0689* (2013.01); *B01L 2300/043* (2013.01); *B01L 2300/045* (2013.01); *B01L 2300/0819* (2013.01); *G01N 2001/368* (2013.01)

(58) Field of Classification Search
CPC ......... B01L 2300/043; B01L 2300/045; B01L 2300/0819
USPC ........................................................ 422/536
See application file for complete search history.

(56) References Cited

U.S. PATENT DOCUMENTS

| | | | |
|---|---|---|---|
| 4,683,195 A | 7/1987 | Mullis |
| 4,683,202 A | 7/1987 | Mullis |
| 4,800,159 A | 1/1989 | Mullis |
| 4,883,867 A | 11/1989 | Lee |
| 4,965,188 A | 10/1990 | Mullis |
| 5,002,882 A | 3/1991 | Lunnen |
| 5,061,049 A | 10/1991 | Hornbeck |
| 5,130,238 A | 7/1992 | Malek |
| 5,183,053 A | 2/1993 | Yeh et al. |
| 5,308,751 A | 5/1994 | Ohkawa |
| 5,321,130 A | 6/1994 | Yue |
| 5,410,030 A | 4/1995 | Yue |
| 5,436,134 A | 7/1995 | Haugland |
| 5,455,166 A | 10/1995 | Walker |
| 5,494,810 A | 2/1996 | Barany et al. |
| 5,503,980 A | 4/1996 | Cantor |
| 5,512,439 A | 4/1996 | Hornes |
| 5,512,462 A | 4/1996 | Cheng |
| 5,559,032 A | 9/1996 | Pomeroy |
| 5,582,977 A | 12/1996 | Yue |
| 5,599,675 A | 2/1997 | Brenner |
| 5,641,658 A | 6/1997 | Adams |
| 5,648,245 A | 7/1997 | Fire et al. |
| 5,658,751 A | 8/1997 | Yue |
| 5,716,825 A | 2/1998 | Hancock et al. |
| 5,750,333 A | 5/1998 | Clark |
| 5,750,341 A | 5/1998 | Macevicz |
| 5,763,175 A | 6/1998 | Brenner |
| 5,830,711 A | 11/1998 | Barany et al. |
| 5,837,832 A | 11/1998 | Chee et al. |
| 5,854,033 A | 12/1998 | Lizardi |
| 5,863,753 A | 1/1999 | Haugland |
| 5,871,921 A | 2/1999 | Landegren et al. |
| 5,912,148 A | 6/1999 | Eggerding |
| 6,013,440 A | 1/2000 | Lipshutz |
| 6,027,889 A | 2/2000 | Barany et al. |
| 6,060,240 A | 5/2000 | Kamb et al. |
| 6,083,761 A | 7/2000 | Kedar et al. |
| 6,130,073 A | 10/2000 | Eggerding |
| 6,136,592 A | 10/2000 | Leighton |
| 6,143,496 A | 11/2000 | Brown |
| 6,153,389 A | 11/2000 | Haarer |
| 6,157,432 A | 12/2000 | Helbing |
| 6,165,714 A | 12/2000 | Lane et al. |
| 6,210,891 B1 | 4/2001 | Nyren |
| 6,210,894 B1 | 4/2001 | Brennan |
| 6,214,587 B1 | 4/2001 | Dattagupta |
| 6,221,654 B1 | 4/2001 | Quake |
| 6,258,568 B1 | 7/2001 | Nyren |
| 6,266,459 B1 | 7/2001 | Walt |
| 6,274,320 B1 | 8/2001 | Rothberg |
| 6,291,180 B1 | 9/2001 | Chu |
| 6,300,063 B1 | 10/2001 | Lipshutz et al. |
| 6,309,824 B1 | 10/2001 | Drmanac |
| 6,337,472 B1 | 1/2002 | Garner et al. |
| 6,344,316 B1 | 2/2002 | Lockhart |
| 6,348,990 B1 | 2/2002 | Igasaki et al. |
| 6,355,431 B1 | 3/2002 | Chee |
| 6,368,801 B1 | 4/2002 | Faruqi |
| 6,391,937 B1 | 5/2002 | Beuhler et al. |
| 6,401,267 B1 | 6/2002 | Drmanac |
| 6,404,907 B1 | 6/2002 | Gilchrist |
| 6,432,360 B1 | 8/2002 | Church et al. |
| 6,485,982 B1 | 11/2002 | Charlton |
| 6,503,713 B1 | 1/2003 | Rana |
| 6,506,561 B1 | 1/2003 | Cheval et al. |
| 6,544,732 B1 | 4/2003 | Chee |
| 6,565,727 B1 | 5/2003 | Shenderov |
| 6,620,584 B1 | 9/2003 | Chee |
| 6,632,641 B1 | 10/2003 | Brennan |
| 6,673,620 B1 | 1/2004 | Loeffler |
| 6,737,236 B1 | 5/2004 | Pieken et al. |
| 6,770,441 B2 | 8/2004 | Dickinson |
| 6,773,566 B2 | 8/2004 | Shenderov |
| 6,773,886 B2 | 8/2004 | Kaufman |
| 6,787,308 B2 | 9/2004 | Balasubramanian |
| 6,800,453 B2 | 10/2004 | Labaer |
| 6,812,005 B2 | 11/2004 | Fan et al. |
| 6,828,100 B1 | 12/2004 | Ronaghi |
| 6,833,246 B2 | 12/2004 | Balasubramanian |
| 6,859,570 B2 | 2/2005 | Walt |
| 6,864,052 B1 | 3/2005 | Drmanac |
| 6,897,023 B2 | 5/2005 | Fu |
| 6,911,132 B2 | 6/2005 | Pamula |
| 6,911,345 B2 | 6/2005 | Quake |
| 6,913,921 B2 | 7/2005 | Fischer |
| 6,942,968 B1 | 9/2005 | Dickinson et al. |
| 6,969,488 B2 | 11/2005 | Bridgham |
| 6,977,033 B2 | 12/2005 | Becker |
| 7,001,792 B2 | 2/2006 | Sauer et al. |
| 7,008,788 B2 | 3/2006 | Schremp et al. |
| 7,052,244 B2 | 5/2006 | Fouillet |
| 7,057,026 B2 | 6/2006 | Barnes |
| 7,098,041 B2 | 8/2006 | Kaylor et al. |
| 7,115,400 B1 | 10/2006 | Adessi |
| 7,118,883 B2 | 10/2006 | Inoue |
| 7,163,612 B2 | 1/2007 | Sterling |
| 7,166,431 B2 | 1/2007 | Chee et al. |
| 7,211,414 B2 | 5/2007 | Hardin |
| 7,220,573 B2 | 5/2007 | Shea et al. |
| 7,223,371 B2 | 5/2007 | Hayenga et al. |
| 7,223,592 B2 | 5/2007 | Shea et al. |
| 7,244,559 B2 | 7/2007 | Rothberg |
| 7,255,994 B2 | 8/2007 | Lao |
| 7,258,976 B2 | 8/2007 | Mitsuhashi |
| 7,264,929 B2 | 9/2007 | Rothberg |
| 7,297,518 B2 | 11/2007 | Quake |
| 7,328,979 B2 | 2/2008 | Decre |
| 7,329,492 B2 | 2/2008 | Hardin |
| 7,361,488 B2 | 4/2008 | Fan et al. |
| 7,364,897 B2 | 4/2008 | Heaney |
| 7,378,242 B2 | 5/2008 | Hurt |
| 7,393,665 B2 | 7/2008 | Brenner |
| 7,405,281 B2 | 7/2008 | Xu |
| 7,407,757 B2 | 8/2008 | Brenner |
| 7,456,012 B2 | 11/2008 | Ryttsen et al. |
| 7,462,449 B2 | 12/2008 | Quake |
| 7,501,245 B2 | 3/2009 | Quake |
| 7,537,897 B2 | 5/2009 | Brenner |
| 7,547,380 B2 | 6/2009 | Velev |
| 7,561,336 B2 | 7/2009 | Osaka et al. |
| 7,563,576 B2 | 7/2009 | Chee |
| 7,582,420 B2 | 9/2009 | Oliphant et al. |
| 7,595,883 B1 | 9/2009 | El Gamal |
| 7,601,492 B2 | 10/2009 | Fu et al. |
| 7,601,498 B2 | 10/2009 | Mao |
| 7,635,566 B2 | 12/2009 | Brenner |
| 7,641,779 B2 | 1/2010 | Becker |

(56)                  References Cited

U.S. PATENT DOCUMENTS

| | | |
|---|---|---|
| 7,674,752 B2 | 3/2010 | He |
| 7,776,567 B2 | 8/2010 | Mao |
| 7,785,869 B2 | 8/2010 | Belgrader et al. |
| 7,803,943 B2 | 9/2010 | Mao |
| 7,858,321 B2 | 12/2010 | Glezer |
| 7,910,304 B2 | 3/2011 | Drmanac |
| 7,919,308 B2 | 4/2011 | Paul |
| 7,955,794 B2 | 6/2011 | Shen et al. |
| 7,960,119 B2 | 6/2011 | Chee |
| 8,003,354 B2 | 8/2011 | Shen et al. |
| 8,074,802 B2 | 12/2011 | Webb et al. |
| 8,148,068 B2 | 4/2012 | Brenner |
| 8,168,134 B2 | 5/2012 | Lehto |
| 8,206,917 B2 | 6/2012 | Chee |
| 8,278,034 B2 | 10/2012 | Muraca |
| 8,288,103 B2 | 10/2012 | Oliphant |
| 8,330,087 B2 | 12/2012 | Domenicali |
| 8,460,865 B2 | 6/2013 | Chee |
| 8,481,257 B2 | 7/2013 | Van Eijk |
| 8,603,743 B2 | 12/2013 | Liu et al. |
| 8,637,242 B2 | 1/2014 | Shen |
| 8,778,849 B2 | 7/2014 | Bowen |
| 8,815,512 B2 | 8/2014 | Van Eijk |
| 8,835,358 B2 | 9/2014 | Fodor |
| 8,900,529 B2 | 12/2014 | Shaikh et al. |
| 8,911,945 B2 | 12/2014 | Van Eijk |
| 8,951,781 B2 | 2/2015 | Reed |
| 9,062,348 B1 | 6/2015 | Van Eijk |
| 9,194,001 B2 | 11/2015 | Brenner |
| 9,201,063 B2 | 12/2015 | Sood et al. |
| 9,290,808 B2 | 3/2016 | Fodor |
| 9,290,809 B2 | 3/2016 | Fodor |
| 9,328,383 B2 | 5/2016 | Van Eijk |
| 9,330,295 B2 | 5/2016 | Dunn |
| 9,334,536 B2 | 5/2016 | Van Eijk |
| 9,371,598 B2 | 6/2016 | Chee |
| 9,416,409 B2 | 8/2016 | Hayden |
| 9,506,061 B2 | 11/2016 | Brown et al. |
| 9,512,422 B2 | 12/2016 | Barnard et al. |
| 9,557,330 B2 | 1/2017 | Siciliano et al. |
| 9,582,877 B2 | 2/2017 | Fu |
| 9,593,365 B2 | 3/2017 | Frisen et al. |
| 9,644,204 B2 | 5/2017 | Hindson et al. |
| 9,694,361 B2 | 7/2017 | Bharadwaj |
| 9,702,004 B2 | 7/2017 | Van Eijk |
| 9,727,810 B2 | 8/2017 | Fodor et al. |
| 9,751,084 B2 | 9/2017 | Greenizen et al. |
| 9,777,324 B2 | 10/2017 | Van Eijk |
| 9,783,841 B2 | 10/2017 | Nolan et al. |
| 9,799,992 B2 | 10/2017 | Hirose et al. |
| 9,834,814 B2 | 12/2017 | Peter et al. |
| 9,850,536 B2 | 12/2017 | Oliphant et al. |
| 9,868,979 B2 | 1/2018 | Chee et al. |
| 9,879,313 B2 | 1/2018 | Chee et al. |
| 9,889,422 B2 | 2/2018 | Smith et al. |
| 9,975,122 B2 | 5/2018 | Masquelier et al. |
| 10,002,316 B2 | 6/2018 | Fodor et al. |
| 10,023,907 B2 | 7/2018 | Van Eijk |
| 10,030,261 B2 | 7/2018 | Frisen et al. |
| 10,032,064 B2 | 7/2018 | Hoyt |
| 10,053,723 B2 | 8/2018 | Hindson et al. |
| 10,071,377 B2 | 9/2018 | Bharadwaj et al. |
| 10,101,336 B2 | 10/2018 | Bergo |
| 10,246,700 B2 | 4/2019 | Dunaway et al. |
| 10,266,888 B2 | 4/2019 | Daugharthy et al. |
| 10,273,541 B2 | 4/2019 | Hindson et al. |
| 10,308,982 B2 | 6/2019 | Chee |
| 10,357,771 B2 | 7/2019 | Bharadwaj |
| 10,428,326 B2 | 10/2019 | Belhocine et al. |
| 10,472,669 B2 | 11/2019 | Chee |
| 10,480,022 B2 | 11/2019 | Chee |
| 10,480,029 B2 | 11/2019 | Bent et al. |
| 10,494,667 B2 | 12/2019 | Chee |
| 10,495,554 B2 | 12/2019 | Deisseroth et al. |
| 10,550,429 B2 | 2/2020 | Harada et al. |
| 10,590,244 B2 | 3/2020 | Delaney et al. |
| 10,662,468 B2 | 5/2020 | Chee |
| 10,710,081 B2 | 7/2020 | Liu |
| 10,724,078 B2 | 7/2020 | Van Driel et al. |
| 10,725,027 B2 | 7/2020 | Bell |
| 10,773,255 B2 | 9/2020 | Schmolke |
| 10,774,372 B2 | 9/2020 | Chee et al. |
| 10,774,374 B2 | 9/2020 | Frisen et al. |
| 10,787,701 B2 | 9/2020 | Chee |
| 10,858,702 B2 | 12/2020 | Lucero et al. |
| 10,913,975 B2 | 2/2021 | So et al. |
| 10,914,730 B2 | 2/2021 | Chee et al. |
| 10,927,403 B2 | 2/2021 | Chee et al. |
| 10,961,566 B2 | 3/2021 | Chee |
| 10,994,275 B2 | 5/2021 | Pallas et al. |
| 11,001,879 B1 | 5/2021 | Chee |
| 11,008,607 B2 | 5/2021 | Chee |
| 11,046,996 B1 | 6/2021 | Chee et al. |
| 11,067,567 B2 | 7/2021 | Chee |
| 11,156,603 B2 | 10/2021 | Chee |
| 11,162,132 B2 | 11/2021 | Frisen et al. |
| 11,208,684 B2 | 12/2021 | Chee |
| 11,214,796 B2 | 1/2022 | Shirai et al. |
| 11,286,515 B2 | 3/2022 | Chee et al. |
| 11,293,917 B2 | 4/2022 | Chee |
| 11,299,774 B2 | 4/2022 | Frisen et al. |
| 11,313,856 B2 | 4/2022 | Chee |
| 11,332,790 B2 | 5/2022 | Chell et al. |
| 11,352,659 B2 | 6/2022 | Frisen et al. |
| 11,352,667 B2 | 6/2022 | Hauling et al. |
| 11,359,228 B2 | 6/2022 | Chee et al. |
| 11,365,442 B2 | 6/2022 | Chee |
| 11,371,086 B2 | 6/2022 | Chee |
| 11,384,386 B2 | 7/2022 | Chee |
| 11,390,912 B2 | 7/2022 | Frisen et al. |
| 11,401,545 B2 | 8/2022 | Chee |
| 11,407,992 B2 | 8/2022 | Dadhwal |
| 11,408,029 B2 | 8/2022 | Katiraee et al. |
| 11,434,524 B2 | 9/2022 | Ramachandran Iyer et al. |
| 11,459,607 B1 | 10/2022 | Terry et al. |
| 11,479,809 B2 | 10/2022 | Frisen et al. |
| 11,479,810 B1 | 10/2022 | Chee |
| 11,492,612 B1 | 11/2022 | Dadhwal |
| 11,501,440 B2 | 11/2022 | Weisenfeld et al. |
| 11,505,828 B2 | 11/2022 | Chell et al. |
| 11,512,308 B2 | 11/2022 | Gallant et al. |
| 11,519,022 B2 | 12/2022 | Chee |
| 11,519,033 B2 | 12/2022 | Schnall-Levin et al. |
| 11,530,438 B2 | 12/2022 | Persson et al. |
| 11,535,887 B2 | 12/2022 | Gallant et al. |
| 11,542,543 B2 | 1/2023 | Chee |
| 11,549,138 B2 | 1/2023 | Chee |
| 11,560,587 B2 | 1/2023 | Chee |
| 11,560,592 B2 | 1/2023 | Chew et al. |
| 11,560,593 B2 | 1/2023 | Chell et al. |
| 11,592,447 B2 | 2/2023 | Uytingco et al. |
| 11,608,498 B2 | 3/2023 | Gallant et al. |
| 11,608,520 B2 | 3/2023 | Galonska et al. |
| 11,613,773 B2 | 3/2023 | Frisen et al. |
| 11,618,897 B2 | 4/2023 | Kim et al. |
| 11,618,918 B2 | 4/2023 | Chee et al. |
| 11,624,063 B2 | 4/2023 | Dadhwal |
| 11,624,086 B2 | 4/2023 | Uytingco et al. |
| 11,634,756 B2 | 4/2023 | Chee |
| 11,649,485 B2 | 5/2023 | Yin et al. |
| 11,661,626 B2 | 5/2023 | Katiraee et al. |
| 11,680,260 B2 | 6/2023 | Kim et al. |
| 11,692,218 B2 | 7/2023 | Engblom et al. |
| 11,702,693 B2 | 7/2023 | Bharadwaj |
| 11,702,698 B2 | 7/2023 | Stoeckius |
| 11,713,480 B2 | 8/2023 | Lee |
| 11,732,292 B2 | 8/2023 | Chee |
| 11,732,299 B2 | 8/2023 | Ramachandran Iyer |
| 11,732,300 B2 | 8/2023 | Bava |
| 11,733,238 B2 | 8/2023 | Chee |
| 11,739,372 B2 | 8/2023 | Frisen et al. |
| 11,739,381 B2 | 8/2023 | Chew et al. |
| 11,753,673 B2 | 9/2023 | Chew et al. |
| 11,753,674 B2 | 9/2023 | Chee et al. |

(56) References Cited

U.S. PATENT DOCUMENTS

| | | | |
|---|---|---|---|
| 11,753,675 B2 | 9/2023 | Ramachandran Iyer |
| 11,761,030 B2 | 9/2023 | Chee |
| 11,761,038 B1 | 9/2023 | Stoeckius |
| 11,767,550 B2 | 9/2023 | Chee |
| 11,767,557 B2 | 9/2023 | Love et al. |
| 11,768,175 B1 | 9/2023 | Kim et al. |
| 11,773,433 B2 | 10/2023 | Gallant et al. |
| 11,781,130 B2 | 10/2023 | Dadhwal |
| 11,788,122 B2 | 10/2023 | Frisen et al. |
| 11,795,498 B2 | 10/2023 | Frisen et al. |
| 11,795,507 B2 | 10/2023 | Chell et al. |
| 11,808,769 B2 | 11/2023 | Uytingco et al. |
| 11,821,024 B2 | 11/2023 | Chee et al. |
| 11,821,035 B1 | 11/2023 | Bent et al. |
| 11,827,935 B1 | 11/2023 | Ramachandran Iyer et al. |
| 11,835,462 B2 | 12/2023 | Bava |
| 11,840,687 B2 | 12/2023 | Gallant et al. |
| 11,840,724 B2 | 12/2023 | Chew et al. |
| 11,845,979 B2 | 12/2023 | Engblom et al. |
| 11,859,178 B2 | 1/2024 | Gallant et al. |
| 11,866,767 B2 | 1/2024 | Uytingco et al. |
| 11,866,770 B2 | 1/2024 | Chee |
| 11,873,482 B2 | 1/2024 | Kim et al. |
| 11,891,654 B2 | 2/2024 | Alvarado Martinez et al. |
| 11,898,205 B2 | 2/2024 | Bava |
| 11,926,822 B1 | 3/2024 | Gohil et al. |
| 11,926,863 B1 | 3/2024 | Boutet |
| 11,926,867 B2 | 3/2024 | Yin et al. |
| 11,933,957 B1 | 3/2024 | Tentori et al. |
| 11,952,627 B2 | 4/2024 | Stoeckius |
| 11,959,076 B2 | 4/2024 | Kim et al. |
| 11,959,130 B2 | 4/2024 | Galonska et al. |
| 11,965,213 B2 | 4/2024 | Williams |
| 11,970,739 B2 | 4/2024 | Chew et al. |
| 11,981,958 B1 | 5/2024 | Galonska |
| 11,981,960 B1 | 5/2024 | Lin et al. |
| 11,981,965 B2 | 5/2024 | Chell et al. |
| RE50,065 E | 7/2024 | Frisen et al. |
| 12,024,741 B2 | 7/2024 | Tentori et al. |
| 12,031,177 B1 | 7/2024 | Tentori et al. |
| 12,060,604 B2 | 8/2024 | Katiraee et al. |
| 12,071,655 B2 | 8/2024 | Sukovich et al. |
| 12,076,701 B2 | 9/2024 | Bava |
| 12,098,417 B2 | 9/2024 | Engblom et al. |
| 12,098,985 B2* | 9/2024 | Cox ........................ B01L 9/527 |
| 12,110,541 B2 | 10/2024 | Bava |
| 12,117,439 B2 | 10/2024 | Delaney et al. |
| 12,128,403 B2 | 10/2024 | Kim et al. |
| 12,129,516 B2 | 10/2024 | Tentori et al. |
| 12,157,124 B2 | 12/2024 | Cox et al. |
| 12,180,543 B2 | 12/2024 | Uytingco et al. |
| 12,186,755 B2 | 1/2025 | Chen et al. |
| 12,195,790 B2 | 1/2025 | Sukovich et al. |
| 12,203,134 B2 | 1/2025 | Nagendran et al. |
| 12,209,280 B1 | 1/2025 | Mignardi et al. |
| D1,064,308 S | 2/2025 | Alimsijah et al. |
| 12,223,751 B2 | 2/2025 | Li et al. |
| 12,228,544 B2 | 2/2025 | Kim et al. |
| 12,234,505 B2 | 2/2025 | Chee |
| 12,241,060 B2 | 3/2025 | Kim et al. |
| 12,241,890 B2 | 3/2025 | Delaney et al. |
| 12,249,085 B2 | 3/2025 | Tentori et al. |
| 12,265,079 B1 | 4/2025 | Bent |
| 12,270,077 B2 | 4/2025 | Schnall-Levin et al. |
| 12,275,988 B2 | 4/2025 | Galonska et al. |
| 12,281,357 B1 | 4/2025 | Tentori et al. |
| 12,286,673 B2 | 4/2025 | Bava |
| 12,287,264 B2 | 4/2025 | Cox et al. |
| 12,297,486 B2 | 5/2025 | Patterson et al. |
| 12,297,487 B2 | 5/2025 | Chee |
| 12,297,488 B2 | 5/2025 | Chee |
| 12,344,892 B2 | 7/2025 | Schnall-Levin et al. |
| 12,365,935 B2 | 7/2025 | Chew et al. |
| 12,365,942 B2 | 7/2025 | Stoeckius |
| 12,371,688 B2 | 7/2025 | Kim et al. |
| 12,378,607 B2 | 8/2025 | Schnall-Levin et al. |
| 12,385,083 B2 | 8/2025 | Shah |
| 12,391,979 B2 | 8/2025 | Chee |
| 12,391,980 B2 | 8/2025 | Chee |
| 12,399,123 B1 | 8/2025 | Shah et al. |
| 12,404,544 B2 | 9/2025 | Tentori et al. |
| 12,405,264 B2 | 9/2025 | Stoeckius |
| 12,416,603 B2 | 9/2025 | Tentori et al. |
| 12,435,363 B1 | 10/2025 | Gallant et al. |
| 12,442,045 B2 | 10/2025 | Williams |
| 2002/0022261 A1 | 2/2002 | Anderson et al. |
| 2002/0040275 A1 | 4/2002 | Cravatt |
| 2002/0045272 A1 | 4/2002 | McDevitt et al. |
| 2002/0150909 A1 | 10/2002 | Stuelpnagel |
| 2002/0164611 A1 | 11/2002 | Bamdad |
| 2002/0194938 A1 | 12/2002 | Koo et al. |
| 2003/0017451 A1 | 1/2003 | Wang et al. |
| 2003/0022207 A1 | 1/2003 | Balasubramanian |
| 2003/0113713 A1 | 6/2003 | Glezer |
| 2003/0134410 A1 | 7/2003 | Silva et al. |
| 2003/0138353 A1 | 7/2003 | Bargoot et al. |
| 2003/0148335 A1 | 8/2003 | Shen et al. |
| 2003/0162216 A1 | 8/2003 | Gold |
| 2003/0175947 A1 | 9/2003 | Liu et al. |
| 2003/0190744 A1 | 10/2003 | McGarry et al. |
| 2003/0205632 A1 | 11/2003 | Kim et al. |
| 2003/0211489 A1 | 11/2003 | Shen et al. |
| 2003/0215936 A1 | 11/2003 | Kallioniemi et al. |
| 2003/0224419 A1 | 12/2003 | Corcoran |
| 2003/0232348 A1 | 12/2003 | Jones et al. |
| 2003/0232382 A1 | 12/2003 | Brennan |
| 2004/0033499 A1 | 2/2004 | Ilsley et al. |
| 2004/0050699 A1 | 3/2004 | Goncalves |
| 2004/0067492 A1 | 4/2004 | Peng et al. |
| 2004/0071605 A1 | 4/2004 | Coonan et al. |
| 2004/0082058 A1 | 4/2004 | Schleifer et al. |
| 2004/0096853 A1 | 5/2004 | Mayer |
| 2004/0106110 A1 | 6/2004 | Balasubramanian |
| 2004/0112442 A1 | 6/2004 | Maerkl |
| 2004/0121456 A1 | 6/2004 | Fischer |
| 2004/0219588 A1 | 11/2004 | Furuta |
| 2004/0223890 A1 | 11/2004 | Summers et al. |
| 2004/0241660 A1* | 12/2004 | Wojtowicz .............. B01L 3/502 |
| | | 435/6.12 |
| 2004/0248287 A1 | 12/2004 | Hu et al. |
| 2005/0037393 A1 | 2/2005 | Gunderson et al. |
| 2005/0048580 A1 | 3/2005 | Labaer |
| 2005/0100900 A1 | 5/2005 | Kawashima et al. |
| 2005/0106617 A1 | 5/2005 | Besemer et al. |
| 2005/0130173 A1 | 6/2005 | Leamon et al. |
| 2005/0136414 A1 | 6/2005 | Gunderson et al. |
| 2005/0170373 A1 | 8/2005 | Monforte |
| 2005/0179746 A1 | 8/2005 | Roux et al. |
| 2005/0191656 A1 | 9/2005 | Drmanac et al. |
| 2005/0191698 A1 | 9/2005 | Chee et al. |
| 2005/0202433 A1 | 9/2005 | Van Beuningen |
| 2005/0226780 A1 | 10/2005 | Sandell et al. |
| 2005/0227271 A1 | 10/2005 | Kwon |
| 2005/0239192 A1 | 10/2005 | Nasarabadi et al. |
| 2005/0260653 A1 | 11/2005 | LaBaer |
| 2006/0039823 A1 | 2/2006 | Yamakawa et al. |
| 2006/0041385 A1 | 2/2006 | Bauer et al. |
| 2006/0063160 A1 | 3/2006 | West et al. |
| 2006/0093528 A1 | 5/2006 | Benerjee et al. |
| 2006/0127946 A1 | 6/2006 | Montagu et al. |
| 2006/0134669 A1 | 6/2006 | Casasanta |
| 2006/0153736 A1 | 7/2006 | Kalra et al. |
| 2006/0164490 A1 | 7/2006 | Kim et al. |
| 2006/0172278 A1 | 8/2006 | Bonner et al. |
| 2006/0180489 A1 | 8/2006 | Guiney et al. |
| 2006/0194331 A1 | 8/2006 | Pamula et al. |
| 2006/0211001 A1 | 9/2006 | Yu et al. |
| 2006/0216775 A1 | 9/2006 | Burkart et al. |
| 2006/0263789 A1 | 11/2006 | Kincaid |
| 2007/0020640 A1 | 1/2007 | McCloskey et al. |
| 2007/0023292 A1 | 2/2007 | Kim et al. |
| 2007/0036511 A1 | 2/2007 | Lundquist et al. |
| 2007/0054288 A1 | 3/2007 | Su et al. |
| 2007/0099208 A1 | 5/2007 | Drmanac et al. |

(56) References Cited

U.S. PATENT DOCUMENTS

| | | |
|---|---|---|
| 2007/0116612 A1 | 5/2007 | Williamson |
| 2007/0128071 A1 | 6/2007 | Shea et al. |
| 2007/0128624 A1 | 6/2007 | Gormley et al. |
| 2007/0128656 A1 | 6/2007 | Agrawal |
| 2007/0166725 A1 | 7/2007 | McBride et al. |
| 2007/0172873 A1 | 7/2007 | Brenner et al. |
| 2007/0184456 A1 | 8/2007 | Chee et al. |
| 2007/0207482 A1 | 9/2007 | Church et al. |
| 2007/0215466 A1 | 9/2007 | Okada |
| 2007/0243634 A1 | 10/2007 | Pamula et al. |
| 2007/0254305 A1 | 11/2007 | Paik et al. |
| 2007/0269805 A1 | 11/2007 | Hogers |
| 2008/0009071 A1 | 1/2008 | Sogard |
| 2008/0009420 A1 | 1/2008 | Schroth et al. |
| 2008/0043235 A1 | 2/2008 | Oldham et al. |
| 2008/0108804 A1 | 5/2008 | Hayashizaki et al. |
| 2008/0160580 A1 | 7/2008 | Adessi et al. |
| 2008/0218838 A1 | 9/2008 | Rey-Mermet |
| 2008/0220434 A1 | 9/2008 | Thomas |
| 2008/0261204 A1 | 10/2008 | Lexow |
| 2008/0286795 A1 | 11/2008 | Kawashima et al. |
| 2009/0005252 A1 | 1/2009 | Drmanac et al. |
| 2009/0006002 A1 | 1/2009 | Honisch et al. |
| 2009/0011943 A1 | 1/2009 | Drmanac et al. |
| 2009/0018024 A1 | 1/2009 | Church et al. |
| 2009/0023148 A1 | 1/2009 | Moyle et al. |
| 2009/0026082 A1 | 1/2009 | Rothberg et al. |
| 2009/0082212 A1 | 3/2009 | Williams |
| 2009/0099041 A1 | 4/2009 | Church et al. |
| 2009/0105959 A1 | 4/2009 | Braverman et al. |
| 2009/0117573 A1 | 5/2009 | Fu et al. |
| 2009/0127589 A1 | 5/2009 | Rothberg et al. |
| 2009/0155781 A1 | 6/2009 | Drmanac et al. |
| 2009/0169089 A1 | 7/2009 | Hunt et al. |
| 2009/0192044 A1 | 7/2009 | Fouillet |
| 2009/0197326 A1 | 8/2009 | El Gamal et al. |
| 2009/0233802 A1 | 9/2009 | Bignell et al. |
| 2009/0239232 A1 | 9/2009 | Kurn |
| 2009/0253163 A1 | 10/2009 | Xie et al. |
| 2009/0253581 A1 | 10/2009 | Van Eijk et al. |
| 2009/0253582 A1 | 10/2009 | Pena et al. |
| 2009/0270273 A1 | 10/2009 | Burns et al. |
| 2009/0291854 A1 | 11/2009 | Weisinger-Mayr et al. |
| 2009/0312193 A1 | 12/2009 | Kim et al. |
| 2009/0321262 A1 | 12/2009 | Adachi et al. |
| 2010/0009871 A1 | 1/2010 | Reed et al. |
| 2010/0031757 A1 | 2/2010 | Hoyer |
| 2010/0035249 A1 | 2/2010 | Hayashizaki et al. |
| 2010/0047790 A1 | 2/2010 | Southern et al. |
| 2010/0096266 A1 | 4/2010 | Kim et al. |
| 2010/0111768 A1 | 5/2010 | Banerjee et al. |
| 2010/0120097 A1 | 5/2010 | Matz et al. |
| 2010/0120098 A1 | 5/2010 | Grunenwald et al. |
| 2010/0126862 A1 | 5/2010 | Sabin et al. |
| 2010/0145037 A1 | 6/2010 | Brive et al. |
| 2010/0151511 A1 | 6/2010 | Gereenizer et al. |
| 2010/0267590 A1 | 10/2010 | Grudzien et al. |
| 2010/0273219 A1 | 10/2010 | May et al. |
| 2010/0273679 A1 | 10/2010 | Cuppoletti et al. |
| 2010/0282617 A1 | 11/2010 | Rothberg et al. |
| 2011/0028685 A1 | 2/2011 | Purkayastha et al. |
| 2011/0048951 A1 | 3/2011 | Wu |
| 2011/0059436 A1 | 3/2011 | Hardin et al. |
| 2011/0090563 A1 | 4/2011 | Krasov |
| 2011/0177518 A1 | 7/2011 | Kartalov et al. |
| 2011/0237449 A1 | 9/2011 | McMaster et al. |
| 2011/0244448 A1 | 10/2011 | Shirai et al. |
| 2011/0245111 A1 | 10/2011 | Chee |
| 2012/0135871 A1 | 5/2012 | Van Eijk et al. |
| 2012/0160683 A1 | 6/2012 | Ye et al. |
| 2012/0177543 A1 | 7/2012 | Battrell |
| 2012/0195810 A1 | 8/2012 | Cohen et al. |
| 2012/0202698 A1 | 8/2012 | Van Eijk et al. |
| 2012/0270305 A1 | 10/2012 | Reed et al. |
| 2012/0279954 A1 | 11/2012 | Ceremony et al. |
| 2013/0045473 A1 | 2/2013 | Duerr et al. |
| 2013/0053273 A1 | 2/2013 | Juncker et al. |
| 2013/0065788 A1 | 3/2013 | Glezer et al. |
| 2013/0146459 A1 | 6/2013 | Bazant et al. |
| 2013/0203100 A1 | 8/2013 | Otter et al. |
| 2013/0252847 A1 | 9/2013 | McKenna et al. |
| 2013/0260372 A1 | 10/2013 | Buermann et al. |
| 2013/0296174 A1 | 11/2013 | Peumans |
| 2014/0011707 A1 | 1/2014 | Ye et al. |
| 2014/0066318 A1 | 3/2014 | Frisen et al. |
| 2014/0155295 A1 | 6/2014 | Hindson et al. |
| 2014/0270435 A1 | 9/2014 | Dunn |
| 2014/0272965 A1* | 9/2014 | Handique ............ C12Q 1/6841 |
| | | 435/6.12 |
| 2014/0274731 A1 | 9/2014 | Raymond et al. |
| 2014/0323330 A1 | 10/2014 | Glezer et al. |
| 2014/0378350 A1 | 12/2014 | Hindson et al. |
| 2015/0292988 A1 | 10/2015 | Bharadwaj et al. |
| 2015/0298091 A1 | 10/2015 | Weitz et al. |
| 2015/0344942 A1 | 12/2015 | Frisen et al. |
| 2016/0033496 A1 | 2/2016 | Chou et al. |
| 2016/0138091 A1 | 5/2016 | Chee et al. |
| 2016/0145677 A1 | 5/2016 | Chee et al. |
| 2016/0157838 A1 | 6/2016 | Tatnell et al. |
| 2016/0253584 A1 | 9/2016 | Fodor et al. |
| 2016/0289669 A1 | 10/2016 | Fan et al. |
| 2016/0289740 A1 | 10/2016 | Fu et al. |
| 2016/0298180 A1 | 10/2016 | Chee |
| 2016/0299165 A1 | 10/2016 | Zhou |
| 2017/0014824 A1 | 1/2017 | Boyd et al. |
| 2017/0159109 A1 | 6/2017 | Zheng et al. |
| 2017/0220733 A1 | 8/2017 | Zhuang et al. |
| 2017/0253918 A1 | 9/2017 | Kohman |
| 2017/0342405 A1 | 11/2017 | Fu et al. |
| 2017/0349940 A1 | 12/2017 | Morin et al. |
| 2018/0052081 A1 | 2/2018 | Kohman |
| 2018/0052082 A1 | 2/2018 | Groll et al. |
| 2018/0057873 A1 | 3/2018 | Zhou et al. |
| 2018/0074039 A1 | 3/2018 | Soper et al. |
| 2018/0080876 A1 | 3/2018 | Rockel et al. |
| 2018/0088112 A1 | 3/2018 | Fan et al. |
| 2018/0095067 A1 | 4/2018 | Huff et al. |
| 2018/0104694 A1 | 4/2018 | Huff et al. |
| 2018/0104964 A1 | 4/2018 | Uemura et al. |
| 2018/0112248 A1 | 4/2018 | Lam et al. |
| 2018/0112261 A1 | 4/2018 | Van Driel et al. |
| 2018/0201980 A1 | 7/2018 | Chee et al. |
| 2018/0216162 A1 | 8/2018 | Belhocine et al. |
| 2018/0217094 A1 | 8/2018 | Herr et al. |
| 2018/0245142 A1 | 8/2018 | So et al. |
| 2018/0251833 A1 | 9/2018 | Daugharthy et al. |
| 2018/0291439 A1 | 10/2018 | van Eijk et al. |
| 2018/0305681 A1 | 10/2018 | Jovanovich et al. |
| 2018/0334670 A1 | 11/2018 | Bharadwaj et al. |
| 2018/0347064 A1 | 12/2018 | Rauenbusch et al. |
| 2019/0064173 A1 | 2/2019 | Bharadwaj et al. |
| 2019/0099754 A1 | 4/2019 | Dupouy et al. |
| 2019/0113532 A1 | 4/2019 | Tan et al. |
| 2019/0126280 A1 | 5/2019 | Gach et al. |
| 2019/0155835 A1 | 5/2019 | Daugharthy et al. |
| 2019/0161796 A1 | 5/2019 | Hauling et al. |
| 2019/0177777 A1 | 6/2019 | Chee |
| 2019/0177778 A1 | 6/2019 | Chee |
| 2019/0177789 A1 | 6/2019 | Hindson et al. |
| 2019/0177800 A1 | 6/2019 | Boutet et al. |
| 2019/0201891 A1 | 7/2019 | Pallas et al. |
| 2019/0203275 A1 | 7/2019 | Frisen et al. |
| 2019/0218276 A1 | 7/2019 | Regev et al. |
| 2019/0233878 A1 | 8/2019 | Delaney et al. |
| 2019/0249226 A1 | 8/2019 | Bent et al. |
| 2019/0262831 A1 | 8/2019 | West et al. |
| 2019/0264268 A1 | 8/2019 | Frisen et al. |
| 2019/0271030 A1 | 9/2019 | Chee |
| 2019/0271031 A1 | 9/2019 | Chee |
| 2019/0300943 A1 | 10/2019 | Chee et al. |
| 2019/0300944 A1 | 10/2019 | Chee et al. |
| 2019/0300945 A1 | 10/2019 | Chee et al. |
| 2019/0309353 A1 | 10/2019 | Chee |
| 2019/0309354 A1 | 10/2019 | Chee |

(56) References Cited

U.S. PATENT DOCUMENTS

| | | |
|---|---|---|
| 2019/0309355 A1 | 10/2019 | Chee |
| 2019/0323071 A1 | 10/2019 | Chee |
| 2019/0323088 A1 | 10/2019 | Boutet et al. |
| 2019/0338353 A1 | 11/2019 | Belgrader et al. |
| 2019/0367969 A1 | 12/2019 | Belhocine et al. |
| 2019/0367982 A1 | 12/2019 | Belhocine et al. |
| 2019/0367997 A1 | 12/2019 | Bent et al. |
| 2020/0002763 A1 | 1/2020 | Belgrader et al. |
| 2020/0048690 A1 | 2/2020 | Chee |
| 2020/0049599 A1 | 2/2020 | Alexander et al. |
| 2020/0063191 A1 | 2/2020 | Kennedy-Darling et al. |
| 2020/0063195 A1 | 2/2020 | Chee |
| 2020/0063196 A1 | 2/2020 | Chee |
| 2020/0071751 A1 | 3/2020 | Daugharthy et al. |
| 2020/0109443 A1 | 4/2020 | Chee |
| 2020/0131570 A1 | 4/2020 | Berti et al. |
| 2020/0173985 A1 | 6/2020 | Dong et al. |
| 2020/0256867 A1 | 8/2020 | Hennek et al. |
| 2020/0277663 A1 | 9/2020 | Iyer |
| 2020/0277664 A1 | 9/2020 | Frenz |
| 2020/0298241 A1 | 9/2020 | Kabaha et al. |
| 2020/0299757 A1 | 9/2020 | Chee et al. |
| 2020/0325531 A1 | 10/2020 | Chee |
| 2020/0370095 A1 | 11/2020 | Farmer et al. |
| 2020/0393343 A1 | 12/2020 | Kennedy-Darling et al. |
| 2020/0399687 A1 | 12/2020 | Frisen et al. |
| 2020/0407781 A1 | 12/2020 | Schnall-Levin |
| 2021/0010068 A1 | 1/2021 | Chee et al. |
| 2021/0010070 A1 | 1/2021 | Schnall-Levin et al. |
| 2021/0077079 A1 | 3/2021 | Cureton et al. |
| 2021/0095331 A1 | 4/2021 | Fan et al. |
| 2021/0123040 A1 | 4/2021 | Macosko et al. |
| 2021/0130881 A1 | 5/2021 | Cox |
| 2021/0140982 A1 | 5/2021 | Uytingco et al. |
| 2021/0155982 A1 | 5/2021 | Yin et al. |
| 2021/0158522 A1 | 5/2021 | Weisenfeld et al. |
| 2021/0172007 A1 | 6/2021 | Chee et al. |
| 2021/0189475 A1 | 6/2021 | Tentori et al. |
| 2021/0190770 A1 | 6/2021 | Delaney et al. |
| 2021/0198741 A1 | 7/2021 | Williams |
| 2021/0199660 A1 | 7/2021 | Williams et al. |
| 2021/0207202 A1 | 7/2021 | Chee |
| 2021/0214785 A1 | 7/2021 | Stoeckius |
| 2021/0222235 A1 | 7/2021 | Chee |
| 2021/0222241 A1 | 7/2021 | Bharadwaj |
| 2021/0222242 A1 | 7/2021 | Ramachandran Iyer |
| 2021/0222253 A1 | 7/2021 | Uytingco |
| 2021/0223227 A1 | 7/2021 | Stoeckius |
| 2021/0230584 A1 | 7/2021 | Mikkelsen et al. |
| 2021/0230681 A1 | 7/2021 | Patterson et al. |
| 2021/0230692 A1 | 7/2021 | Daugharthy et al. |
| 2021/0237022 A1 | 8/2021 | Bava |
| 2021/0238581 A1 | 8/2021 | Mikkelsen et al. |
| 2021/0238664 A1 | 8/2021 | Bava et al. |
| 2021/0238675 A1 | 8/2021 | Bava |
| 2021/0238680 A1 | 8/2021 | Bava |
| 2021/0247316 A1 | 8/2021 | Bava |
| 2021/0255175 A1 | 8/2021 | Chee et al. |
| 2021/0262018 A1 | 8/2021 | Bava et al. |
| 2021/0262019 A1 | 8/2021 | Alvarado Martinez et al. |
| 2021/0269864 A1 | 9/2021 | Chee |
| 2021/0270822 A1 | 9/2021 | Chee |
| 2021/0277460 A1 | 9/2021 | Bava |
| 2021/0285036 A1 | 9/2021 | Yin et al. |
| 2021/0285046 A1 | 9/2021 | Chell et al. |
| 2021/0292748 A1 | 9/2021 | Frisen et al. |
| 2021/0292822 A1 | 9/2021 | Frisen et al. |
| 2021/0317510 A1 | 10/2021 | Chee et al. |
| 2021/0317524 A1 | 10/2021 | Lucero et al. |
| 2021/0324457 A1 | 10/2021 | Ramachandran Iyer et al. |
| 2021/0332424 A1 | 10/2021 | Schnall-Levin |
| 2021/0332425 A1 | 10/2021 | Pfeiffer et al. |
| 2021/0348221 A1 | 11/2021 | Chell et al. |
| 2022/0002791 A1 | 1/2022 | Frisen et al. |
| 2022/0003755 A1 | 1/2022 | Chee |
| 2022/0010367 A1 | 1/2022 | Ramachandran Iyer et al. |
| 2022/0017951 A1 | 1/2022 | Ramachandran Iyer et al. |
| 2022/0025446 A1 | 1/2022 | Shah |
| 2022/0025447 A1 | 1/2022 | Tentori et al. |
| 2022/0033888 A1 | 2/2022 | Schnall-Levin et al. |
| 2022/0049293 A1 | 2/2022 | Frenz et al. |
| 2022/0049294 A1 | 2/2022 | Uytingco et al. |
| 2022/0064630 A1 | 3/2022 | Bent et al. |
| 2022/0081728 A1 | 3/2022 | Williams |
| 2022/0090058 A1 | 3/2022 | Frisen et al. |
| 2022/0090175 A1 | 3/2022 | Uytingco et al. |
| 2022/0098576 A1 | 3/2022 | Dadhwal |
| 2022/0098661 A1 | 3/2022 | Chew et al. |
| 2022/0106632 A1 | 4/2022 | Galonska et al. |
| 2022/0106633 A1 | 4/2022 | Engblom et al. |
| 2022/0112486 A1 | 4/2022 | Ramachandran Iyer et al. |
| 2022/0112545 A1 | 4/2022 | Chee |
| 2022/0119869 A1 | 4/2022 | Ramachandran Iyer et al. |
| 2022/0127659 A1 | 4/2022 | Frisen et al. |
| 2022/0127666 A1 | 4/2022 | Katiraee et al. |
| 2022/0127672 A1 | 4/2022 | Stoeckius |
| 2022/0145361 A1 | 5/2022 | Frenz et al. |
| 2022/0154255 A1 | 5/2022 | Chee et al. |
| 2022/0170083 A1 | 6/2022 | Khaled et al. |
| 2022/0195422 A1 | 6/2022 | Gallant et al. |
| 2022/0195505 A1 | 6/2022 | Frisen et al. |
| 2022/0196644 A1 | 6/2022 | Chee |
| 2022/0213526 A1 | 7/2022 | Frisen et al. |
| 2022/0220544 A1 | 7/2022 | Ach et al. |
| 2022/0241780 A1 | 8/2022 | Tentori et al. |
| 2022/0267844 A1 | 8/2022 | Ramachandran Iyer et al. |
| 2022/0268673 A1 | 8/2022 | Dyson-Holland et al. |
| 2022/0282329 A1 | 9/2022 | Chell et al. |
| 2022/0290217 A1 | 9/2022 | Frenz et al. |
| 2022/0290219 A1 | 9/2022 | Chee |
| 2022/0298560 A1 | 9/2022 | Frisen et al. |
| 2022/0325325 A1 | 10/2022 | Chee et al. |
| 2022/0326251 A1 | 10/2022 | Uytingco et al. |
| 2022/0333171 A1 | 10/2022 | Chee |
| 2022/0333191 A1 | 10/2022 | Mikkelsen et al. |
| 2022/0333192 A1 | 10/2022 | Uytingco |
| 2022/0333195 A1 | 10/2022 | Schnall-Levin et al. |
| 2022/0334031 A1 | 10/2022 | Delaney et al. |
| 2022/0348905 A1 | 11/2022 | Dadhwal |
| 2022/0348992 A1 | 11/2022 | Stoeckius et al. |
| 2022/0356464 A1 | 11/2022 | Kim et al. |
| 2022/0364163 A1 | 11/2022 | Stahl et al. |
| 2022/0389491 A1 | 12/2022 | Chee |
| 2022/0389503 A1 | 12/2022 | Mikkelsen et al. |
| 2022/0389504 A1 | 12/2022 | Chew et al. |
| 2022/0403455 A1 | 12/2022 | Ramachandran Iyer et al. |
| 2022/0404245 A1 | 12/2022 | Chell et al. |
| 2023/0002812 A1 | 1/2023 | Stoeckius et al. |
| 2023/0014008 A1 | 1/2023 | Shastry |
| 2023/0017773 A1 | 1/2023 | Kim et al. |
| 2023/0031305 A1 | 2/2023 | Neuta et al. |
| 2023/0033960 A1 | 2/2023 | Gallant et al. |
| 2023/0034039 A1 | 2/2023 | Shahjamali |
| 2023/0034216 A1 | 2/2023 | Bava |
| 2023/0040363 A1 | 2/2023 | Chee |
| 2023/0042088 A1 | 2/2023 | Chee |
| 2023/0042817 A1 | 2/2023 | Mignardi |
| 2023/0047782 A1 | 2/2023 | Tentori et al. |
| 2023/0056549 A1 | 2/2023 | Dadhwal |
| 2023/0064372 A1 | 3/2023 | Chell et al. |
| 2023/0069046 A1 | 3/2023 | Chew et al. |
| 2023/0077364 A1 | 3/2023 | Patterson et al. |
| 2023/0080543 A1 | 3/2023 | Katiraee et al. |
| 2023/0081381 A1 | 3/2023 | Chew et al. |
| 2023/0100497 A1 | 3/2023 | Frisen et al. |
| 2023/0107023 A1 | 4/2023 | Chee |
| 2023/0111225 A1 | 4/2023 | Chew et al. |
| 2023/0113230 A1 | 4/2023 | Kim et al. |
| 2023/0126825 A1 | 4/2023 | Nagendran et al. |
| 2023/0129552 A1 | 4/2023 | Ramachandran Iyer |
| 2023/0135010 A1 | 5/2023 | Tentori et al. |
| 2023/0143569 A1 | 5/2023 | Iyer et al. |
| 2023/0145575 A1 | 5/2023 | Gallant et al. |
| 2023/0147726 A1 | 5/2023 | Hadrup et al. |

(56) References Cited

U.S. PATENT DOCUMENTS

| | | |
|---|---|---|
| 2023/0151412 A1 | 5/2023 | Chee |
| 2023/0159994 A1 | 5/2023 | Chee |
| 2023/0159995 A1 | 5/2023 | Iyer et al. |
| 2023/0160008 A1 | 5/2023 | Chell et al. |
| 2023/0175045 A1 | 6/2023 | Katsori et al. |
| 2023/0183684 A1 | 6/2023 | Gallant et al. |
| 2023/0183785 A1 | 6/2023 | Frisen et al. |
| 2023/0194469 A1 | 6/2023 | Tentori et al. |
| 2023/0194470 A1 | 6/2023 | Kim et al. |
| 2023/0203478 A1 | 6/2023 | Kim et al. |
| 2023/0212650 A1 | 7/2023 | Chew et al. |
| 2023/0212655 A1 | 7/2023 | Chee |
| 2023/0212656 A1 | 7/2023 | Chow et al. |
| 2023/0220368 A1 | 7/2023 | Kim |
| 2023/0220454 A1 | 7/2023 | Bent et al. |
| 2023/0220455 A1 | 7/2023 | Galonska et al. |
| 2023/0227811 A1 | 7/2023 | Dadhwal |
| 2023/0228762 A1 | 7/2023 | Uytingco et al. |
| 2023/0242973 A1 | 8/2023 | Frisen et al. |
| 2023/0242976 A1 | 8/2023 | Tentori et al. |
| 2023/0265488 A1 | 8/2023 | Gohil et al. |
| 2023/0265489 A1 | 8/2023 | Uytingco et al. |
| 2023/0265491 A1 | 8/2023 | Tentori et al. |
| 2023/0267625 A1 | 8/2023 | Tentori et al. |
| 2023/0279474 A1 | 9/2023 | Katiraee |
| 2023/0279477 A1 | 9/2023 | Kvastad et al. |
| 2023/0279481 A1 | 9/2023 | Marrache et al. |
| 2023/0287399 A1 | 9/2023 | Gallant et al. |
| 2023/0287475 A1 | 9/2023 | Chell et al. |
| 2023/0287481 A1 | 9/2023 | Katsori et al. |
| 2023/0295699 A1 | 9/2023 | Sukovich et al. |
| 2023/0295722 A1 | 9/2023 | Bharadwaj |
| 2023/0304072 A1 | 9/2023 | Gohil et al. |
| 2023/0304074 A1 | 9/2023 | Chee et al. |
| 2023/0304078 A1 | 9/2023 | Frisen et al. |
| 2023/0313279 A1 | 10/2023 | Giacomello et al. |
| 2023/0323340 A1 | 10/2023 | Dadhwal |
| 2023/0323434 A1 | 10/2023 | Yin et al. |
| 2023/0323436 A1 | 10/2023 | Chee |
| 2023/0323447 A1 | 10/2023 | Schnall-Levin et al. |
| 2023/0323453 A1 | 10/2023 | Stoeckius |
| 2023/0332138 A1 | 10/2023 | Kim et al. |
| 2023/0332211 A1 | 10/2023 | Chee |
| 2023/0332212 A1 | 10/2023 | Chew et al. |
| 2023/0332227 A1 | 10/2023 | Ramachandran Iyer |
| 2023/0332247 A1 | 10/2023 | Singh et al. |
| 2023/0351619 A1 | 11/2023 | Tentori et al. |
| 2023/0358733 A1 | 11/2023 | Chee |
| 2023/0366008 A1 | 11/2023 | Chew et al. |
| 2023/0383285 A1 | 11/2023 | Kim et al. |
| 2023/0383344 A1 | 11/2023 | Stoeckius |
| 2023/0392204 A1 | 12/2023 | Chell et al. |
| 2023/0393071 A1 | 12/2023 | Bava |
| 2023/0407404 A1 | 12/2023 | Baumgartner et al. |
| 2023/0416807 A1 | 12/2023 | Chee |
| 2023/0416808 A1 | 12/2023 | Sukovich et al. |
| 2023/0416850 A1 | 12/2023 | Singh et al. |
| 2024/0002931 A1 | 1/2024 | Bava |
| 2024/0011081 A1 | 1/2024 | Chee |
| 2024/0011090 A1 | 1/2024 | Chew et al. |
| 2024/0018572 A1 | 1/2024 | Mignardi |
| 2024/0018575 A1 | 1/2024 | Gallant et al. |
| 2024/0018589 A1 | 1/2024 | Schnall-Levin et al. |
| 2024/0026445 A1 | 1/2024 | Ramachandran Iyer et al. |
| 2024/0033743 A1 | 2/2024 | Tentori et al. |
| 2024/0035937 A1 | 2/2024 | Cox et al. |
| 2024/0043908 A1 | 2/2024 | Chew et al. |
| 2024/0043925 A1 | 2/2024 | Bent et al. |
| 2024/0052343 A1 | 2/2024 | Gallant et al. |
| 2024/0053351 A1 | 2/2024 | Uytingco et al. |
| 2024/0060115 A1 | 2/2024 | Chee et al. |
| 2024/0067953 A1 | 2/2024 | Mikkelsen et al. |
| 2024/0068016 A1 | 2/2024 | Frisen et al. |
| 2024/0068017 A1 | 2/2024 | Lundeberg et al. |
| 2024/0076723 A1 | 3/2024 | Mignardi |
| 2024/0080346 A1 | 3/2024 | Engblom et al. |
| 2024/0084365 A1 | 3/2024 | Frisen et al. |
| 2024/0084366 A1 | 3/2024 | Chee |
| 2024/0084383 A1 | 3/2024 | Ramachandran Iyer et al. |
| 2024/0093274 A1 | 3/2024 | Frisen et al. |
| 2024/0093290 A1 | 3/2024 | Stahl et al. |
| 2024/0110228 A1 | 4/2024 | Uytingco et al. |
| 2024/0124933 A1 | 4/2024 | Chell et al. |
| 2024/0125772 A1 | 4/2024 | Delaney et al. |
| 2024/0141327 A1 | 5/2024 | Kim et al. |
| 2024/0158838 A1 | 5/2024 | Alvarado Martinez et al. |
| 2024/0175080 A1 | 5/2024 | Galonska et al. |
| 2024/0182968 A1 | 6/2024 | Bava |
| 2024/0191286 A1 | 6/2024 | Boutet et al. |
| 2024/0200121 A1 | 6/2024 | Boutet |
| 2024/0209425 A1 | 6/2024 | Yin et al. |
| 2024/0218427 A1 | 7/2024 | Sukovich et al. |
| 2024/0218432 A1 | 7/2024 | Mielinis |
| 2024/0219701 A1 | 7/2024 | Tentori et al. |
| 2024/0253036 A1 | 8/2024 | Kim et al. |
| 2024/0263218 A1 | 8/2024 | Katiraee et al. |
| 2024/0271190 A1 | 8/2024 | Stoeckius et al. |
| 2024/0271195 A1 | 8/2024 | Mikhaiel et al. |
| 2024/0279747 A1 | 8/2024 | Williams |
| 2024/0287600 A1 | 8/2024 | Iyer et al. |
| 2024/0294971 A1 | 9/2024 | Galonska |
| 2024/0294974 A1 | 9/2024 | Galonska et al. |
| 2024/0294975 A1 | 9/2024 | Lin et al. |
| 2024/0301488 A1 | 9/2024 | Stoeckius |
| 2024/0301489 A1 | 9/2024 | Chew et al. |
| 2024/0360494 A1 | 10/2024 | Costa et al. |
| 2024/0368711 A1 | 11/2024 | Giacomello et al. |
| 2024/0377297 A1 | 11/2024 | Cox et al. |
| 2024/0385088 A1 | 11/2024 | Kim et al. |
| 2024/0392349 A1 | 11/2024 | Frisen et al. |
| 2024/0392351 A1 | 11/2024 | Chee |
| 2024/0392352 A1 | 11/2024 | Stahl et al. |
| 2024/0392353 A1 | 11/2024 | Engblom et al. |
| 2024/0401109 A1 | 12/2024 | Kim et al. |
| 2024/0401117 A1 | 12/2024 | Bava |
| 2024/0401118 A1 | 12/2024 | Tentori et al. |
| 2024/0404301 A1 | 12/2024 | Li et al. |
| 2024/0408593 A1 | 12/2024 | Kim et al. |
| 2024/0416315 A1 | 12/2024 | Bava |
| 2024/0417783 A1 | 12/2024 | Chew et al. |
| 2024/0417784 A1 | 12/2024 | Sukovich et al. |
| 2025/0002980 A1 | 1/2025 | Tentori et al. |
| 2025/0002982 A1 | 1/2025 | Stoeckius et al. |
| 2025/0003956 A1 | 1/2025 | Delaney et al. |
| 2025/0019689 A1 | 1/2025 | Galonska et al. |
| 2025/0019749 A1 | 1/2025 | Katiraee et al. |
| 2025/0066762 A1 | 2/2025 | Man et al. |
| 2025/0066770 A1 | 2/2025 | Costa |
| 2025/0073719 A1 | 3/2025 | Cox et al. |
| 2025/0075261 A1 | 3/2025 | Kim |
| 2025/0101501 A1 | 3/2025 | Chee |
| 2025/0101502 A1 | 3/2025 | Chee |
| 2025/0101504 A1 | 3/2025 | Nagendran et al. |
| 2025/0122564 A1 | 4/2025 | Mignardi et al. |
| 2025/0122565 A1 | 4/2025 | Schnall-Levin et al. |
| 2025/0129412 A1 | 4/2025 | Uytingco et al. |
| 2025/0129421 A1 | 4/2025 | Schnall-Levin et al. |
| 2025/0137043 A1 | 5/2025 | Tentori |
| 2025/0145984 A1 | 5/2025 | Ma et al. |
| 2025/0146057 A1 | 5/2025 | Schnall-Levin et al. |
| 2025/0146058 A1 | 5/2025 | Tentori |
| 2025/0146071 A1 | 5/2025 | Schnall-Levin et al. |
| 2025/0146072 A1 | 5/2025 | Schnall-Levin et al. |
| 2025/0154565 A1 | 5/2025 | Chee |
| 2025/0154566 A1 | 5/2025 | Chee |
| 2025/0154567 A1 | 5/2025 | Chee |
| 2025/0154568 A1 | 5/2025 | Frisen et al. |
| 2025/0154569 A1 | 5/2025 | Stoeckius et al. |
| 2025/0154571 A1 | 5/2025 | Ramachandran Iyer et al. |
| 2025/0154588 A1 | 5/2025 | Ramachandran Iyer et al. |
| 2025/0155446 A1 | 5/2025 | Uytingco et al. |
| 2025/0163501 A1 | 5/2025 | Singh et al. |
| 2025/0163509 A1 | 5/2025 | Daugharthy et al. |
| 2025/0171833 A1 | 5/2025 | Frisen et al. |

(56) References Cited

U.S. PATENT DOCUMENTS

| | | |
|---|---|---|
| 2025/0171848 A1 | 5/2025 | Chell et al. |
| 2025/0179475 A1 | 6/2025 | Borgstrom et al. |
| 2025/0182305 A1 | 6/2025 | Tentori et al. |
| 2025/0182503 A1 | 6/2025 | Li et al. |
| 2025/0188526 A1 | 6/2025 | Sukovich et al. |
| 2025/0189483 A1 | 6/2025 | Kim et al. |
| 2025/0197847 A1 | 6/2025 | Kim et al. |
| 2025/0197938 A1 | 6/2025 | Bjorninen |
| 2025/0207125 A1 | 6/2025 | Gupta et al. |
| 2025/0207182 A1 | 6/2025 | Chee |
| 2025/0207183 A1 | 6/2025 | Chee |
| 2025/0207195 A1 | 6/2025 | Chell et al. |
| 2025/0208115 A1 | 6/2025 | Bent |
| 2025/0215482 A1 | 7/2025 | Mignardi et al. |
| 2025/0215484 A1 | 7/2025 | Ramachandran Iyer et al. |
| 2025/0216300 A1 | 7/2025 | Delaney et al. |
| 2025/0223633 A1 | 7/2025 | Frenz et al. |
| 2025/0230487 A1 | 7/2025 | Chee et al. |
| 2025/0230498 A1 | 7/2025 | Katiraee |
| 2025/0250621 A1 | 8/2025 | Galonska et al. |
| 2025/0250632 A1 | 8/2025 | Mignardi et al. |
| 2025/0257393 A1 | 8/2025 | Katiraee et al. |
| 2025/0263791 A1 | 8/2025 | Bava |
| 2025/0264411 A1 | 8/2025 | Bava |
| 2025/0283154 A1 | 9/2025 | Iyer et al. |
| 2025/0283157 A1 | 9/2025 | Uytingco et al. |
| 2025/0297308 A1 | 9/2025 | Tentori |
| 2025/0313890 A1 | 10/2025 | Lundeberg et al. |
| 2025/0313892 A1 | 10/2025 | Stoeckius |

FOREIGN PATENT DOCUMENTS

| | | |
|---|---|---|
| CN | 1680604 | 10/2005 |
| CN | 1981188 | 6/2007 |
| CN | 202548048 | 11/2012 |
| CN | 102851369 | 1/2013 |
| CN | 104513785 | 4/2015 |
| CN | 204951607 | 1/2016 |
| CN | 106536054 | 3/2017 |
| CN | 107416357 | 11/2022 |
| EP | 0961110 | 12/1999 |
| EP | 1878502 | 1/2008 |
| EP | 1923471 | 5/2008 |
| EP | 2002017 | 12/2008 |
| EP | 2130913 | 12/2009 |
| EP | 2881465 | 6/2015 |
| EP | 3013984 | 5/2016 |
| EP | 3511423 | 7/2019 |
| EP | 3541956 | 9/2019 |
| WO | WO 1989/010977 | 11/1989 |
| WO | WO 1991/006678 | 5/1991 |
| WO | WO 1995/025116 | 9/1995 |
| WO | WO 1995/035505 | 12/1995 |
| WO | WO 1999/063385 | 12/1999 |
| WO | WO 2000/063437 | 10/2000 |
| WO | WO 2002/040874 | 5/2002 |
| WO | WO 2002/059355 | 8/2002 |
| WO | WO 2002/077283 | 10/2002 |
| WO | WO 2003/002979 | 1/2003 |
| WO | WO 2003/010176 | 2/2003 |
| WO | WO 2003/106973 | 12/2003 |
| WO | WO 2004/028955 | 4/2004 |
| WO | WO 2004/108268 | 12/2004 |
| WO | WO 2005/007814 | 1/2005 |
| WO | WO 2006/056861 | 6/2006 |
| WO | WO 2007/073171 | 6/2007 |
| WO | WO 2007/076726 | 7/2007 |
| WO | WO 2007/120241 | 10/2007 |
| WO | WO 2007/123744 | 11/2007 |
| WO | WO 2007/145612 | 12/2007 |
| WO | WO 2008/075086 | 6/2008 |
| WO | WO 2008/157801 | 12/2008 |
| WO | WO 2009/032167 | 3/2009 |
| WO | WO 2009/152928 | 12/2009 |
| WO | WO 2010/062310 | 6/2010 |
| WO | WO 2010/088517 | 8/2010 |
| WO | WO 2010/126614 | 11/2010 |
| WO | WO 2011/068088 | 6/2011 |
| WO | WO 2011/102903 | 8/2011 |
| WO | WO 2012/058096 | 5/2012 |
| WO | WO 2012/159089 | 11/2012 |
| WO | WO 2012/168003 | 12/2012 |
| WO | WO 2013/123442 | 8/2013 |
| WO | WO 2013/131962 | 9/2013 |
| WO | WO 2013/138510 | 9/2013 |
| WO | WO 2013/150082 | 10/2013 |
| WO | WO 2013/150083 | 10/2013 |
| WO | WO 2014/060483 | 4/2014 |
| WO | WO 2014/128129 | 8/2014 |
| WO | WO 2014/142841 | 9/2014 |
| WO | WO 2014/210223 | 12/2014 |
| WO | WO 2014/210225 | 12/2014 |
| WO | WO 2015/031691 | 3/2015 |
| WO | WO 2016/138496 | 9/2016 |
| WO | WO 2016/138500 | 9/2016 |
| WO | WO 2016/162309 | 10/2016 |
| WO | WO 2016/166128 | 10/2016 |
| WO | WO 2016/168825 | 10/2016 |
| WO | WO 2016/172362 | 10/2016 |
| WO | WO 2017/019456 | 2/2017 |
| WO | WO 2017/048871 | 3/2017 |
| WO | WO 2017/075293 | 5/2017 |
| WO | WO 2017/112957 | 6/2017 |
| WO | WO 2017/096158 | 7/2017 |
| WO | WO 2017/144338 | 8/2017 |
| WO | WO 2018/064640 | 4/2018 |
| WO | WO 2018/075436 | 4/2018 |
| WO | WO 2018/091676 | 5/2018 |
| WO | WO 2018/148471 | 8/2018 |
| WO | WO 2018/175779 | 9/2018 |
| WO | WO 2019/104337 | 5/2019 |
| WO | WO 2019/113457 | 6/2019 |
| WO | WO 2019/140334 | 7/2019 |
| WO | WO 2019/213254 | 11/2019 |
| WO | WO 2019/213294 | 11/2019 |
| WO | WO 2020/028194 | 2/2020 |
| WO | WO 2020/047002 | 3/2020 |
| WO | WO 2020/047010 | 3/2020 |
| WO | WO 2020/076979 | 4/2020 |
| WO | WO 2020/099640 | 5/2020 |
| WO | WO 2020/123301 | 6/2020 |
| WO | WO 2020/123305 | 6/2020 |
| WO | WO 2020/123309 | 6/2020 |
| WO | WO 2020/123311 | 6/2020 |
| WO | WO 2020/123316 | 6/2020 |
| WO | WO 2020/123317 | 6/2020 |
| WO | WO 2020/123318 | 6/2020 |
| WO | WO 2020/123319 | 6/2020 |
| WO | WO 2020/123320 | 7/2020 |
| WO | WO 2020/160044 | 8/2020 |
| WO | WO 2020/167862 | 8/2020 |
| WO | WO 2020/176788 | 9/2020 |
| WO | WO 2020/176882 | 9/2020 |
| WO | WO 2020/190509 | 9/2020 |
| WO | WO 2020/198071 | 10/2020 |
| WO | WO 2020/206285 | 10/2020 |
| WO | WO 2020/219901 | 10/2020 |
| WO | WO 2020/227309 | 11/2020 |
| WO | WO 2020/243579 | 12/2020 |
| WO | WO 2021/041974 | 3/2021 |
| WO | WO 2021/067246 | 4/2021 |
| WO | WO 2021/067514 | 4/2021 |
| WO | WO 2021/102003 | 5/2021 |
| WO | WO 2021/102005 | 5/2021 |
| WO | WO 2021/102039 | 5/2021 |
| WO | WO 2021/116715 | 6/2021 |
| WO | WO 2021/133842 | 7/2021 |
| WO | WO 2021/133845 | 7/2021 |
| WO | WO 2021/133849 | 7/2021 |
| WO | WO 2021/142233 | 7/2021 |
| WO | WO 2021/168261 | 8/2021 |
| WO | WO 2021/168278 | 8/2021 |
| WO | WO 2021/207610 | 10/2021 |
| WO | WO 2021/216708 | 10/2021 |

(56) References Cited

FOREIGN PATENT DOCUMENTS

| | | |
|---|---|---|
| WO | WO 2021/225900 | 11/2021 |
| WO | WO 2021/236625 | 11/2021 |
| WO | WO 2021/236929 | 11/2021 |
| WO | WO 2021/237056 | 11/2021 |
| WO | WO 2021/237087 | 11/2021 |
| WO | WO 2021/242834 | 12/2021 |
| WO | WO 2021/247543 | 12/2021 |
| WO | WO 2021/247568 | 12/2021 |
| WO | WO 2021/247593 | 12/2021 |
| WO | WO 2021/252499 | 12/2021 |
| WO | WO 2021/252576 | 12/2021 |
| WO | WO 2021/252591 | 12/2021 |
| WO | WO 2021/252747 | 12/2021 |
| WO | WO 2021/263111 | 12/2021 |
| WO | WO 2022/025965 | 2/2022 |
| WO | WO 2022/051152 | 3/2022 |
| WO | WO 2022/060798 | 3/2022 |
| WO | WO 2022/060953 | 3/2022 |
| WO | WO 2022/061150 | 3/2022 |
| WO | WO 2022/061152 | 3/2022 |
| WO | WO 2022/087273 | 4/2022 |
| WO | WO 2022/098810 | 5/2022 |
| WO | WO 2022/099037 | 5/2022 |
| WO | WO 2022/103712 | 5/2022 |
| WO | WO 2022/109181 | 5/2022 |
| WO | WO 2022/132645 | 6/2022 |
| WO | WO 2022/140028 | 6/2022 |
| WO | WO 2022/147005 | 7/2022 |
| WO | WO 2022/147296 | 7/2022 |
| WO | WO 2022/164615 | 8/2022 |
| WO | WO 2022/178267 | 8/2022 |
| WO | WO 2022/198068 | 9/2022 |
| WO | WO 2022/221425 | 10/2022 |
| WO | WO 2022/226057 | 10/2022 |
| WO | WO 2022/236054 | 11/2022 |
| WO | WO 2022/243303 | 11/2022 |
| WO | WO 2022/226372 | 12/2022 |
| WO | WO 2022/256503 | 12/2022 |
| WO | WO 2022/271820 | 12/2022 |
| WO | WO 2023/287765 | 1/2023 |
| WO | WO 2023/018799 | 2/2023 |
| WO | WO 2023/034489 | 3/2023 |
| WO | WO 2023/044071 | 3/2023 |
| WO | WO 2023/076345 | 5/2023 |
| WO | WO 2023/086880 | 5/2023 |
| WO | WO 2023/102118 | 6/2023 |
| WO | WO 2023/122033 | 6/2023 |
| WO | WO 2023/130019 | 7/2023 |
| WO | WO 2023/147355 | 8/2023 |
| WO | WO 2023/150098 | 8/2023 |
| WO | WO 2023/150163 | 8/2023 |
| WO | WO 2023/150171 | 8/2023 |
| WO | WO 2023/215552 | 11/2023 |
| WO | WO 2023/225519 | 11/2023 |
| WO | WO 2023/229988 | 11/2023 |
| WO | WO 2023/250077 | 12/2023 |
| WO | WO 2024/015578 | 1/2024 |
| WO | WO 2024/035844 | 2/2024 |
| WO | WO 2024/081212 | 4/2024 |
| WO | WO 2024/086167 | 4/2024 |
| WO | WO 2024/086776 | 4/2024 |
| WO | WO 2024/102809 | 5/2024 |
| WO | WO 2024/137826 | 6/2024 |
| WO | WO 2024/145224 | 7/2024 |
| WO | WO 2024/145441 | 7/2024 |
| WO | WO 2024/145445 | 7/2024 |
| WO | WO 2024/145491 | 7/2024 |
| WO | WO 2024/206603 | 10/2024 |
| WO | WO 2024/220882 | 10/2024 |
| WO | WO 2024/238900 | 11/2024 |
| WO | WO 2024/254316 | 12/2024 |
| WO | WO 2025/029605 | 2/2025 |
| WO | WO 2025/029627 | 2/2025 |
| WO | WO 2025/043076 | 2/2025 |
| WO | WO 2025/072119 | 4/2025 |
| WO | WO 2025/090912 | 5/2025 |
| WO | WO 2025/096581 | 5/2025 |
| WO | WO 2025/101864 | 5/2025 |

OTHER PUBLICATIONS

[No Author Listed], "Chromium Next GEM Single Cell 3' Reagent Kits v3.1 (Dual Index)—User Guide," 10x Genomics, Mar. 2021, Document No. CG000315, 61 pages.

[No Author Listed], "HuSNP Mapping Assay User's Manual," Affymetrix Part No. 90094 (Affymetrix, Santa Clara, Calif.), GeneChip, 2000, 104 pages.

[No Author Listed], "Microarray technologies have excellent possibilities in genomics-related researches," Science Tools From Amersham Pharmacia Biotech, 1998, 3(4): 8 pages (with English Translation).

10xGenomics.com, [online], "Visium Spatial Gene Expression Reagent Kits—Tissue Optimization—User Guide," Feb. 2022, retrieved on Mar. 29, 2024, retrieved from URL<https://cdn.10xgenomics.com/image/upload/v1660261286/support-documents/CG000238_VisiumSpatialTissueOptimizationUserGuide_RevE.pdf>, 46 pages.

10xGenomics.com, [online], "Visium Spatial Gene Expression Reagent Kits—Tissue Optimization—User Guide," Jul. 2020, retrieved on May 25, 2021, retrieved from URL<https://assets.ctfassets.net/an68im79xiti/32YzaiURFKI5Rn1fE9nIrp/188b0b5a436edfa9856072a929332a00/CG000238_VisiumSpatialTissueOptimizationUserGuide_RevC.pdf>, 42 pages.

10xGenomics.com, [online], "Visium Spatial Gene Expression Reagent Kits—Tissue Optimization," Nov. 2019, retrieved on Jan. 25, 2022, retrieved from URL<https://assets.ctfassets.net/an68im79xiti/4q03w6959AJFxffSw5lee9/6a2ac61cf6388a72564eeb96bc294967/CG000238_VisiumSpatialTissueOptimizationUserGuide_Rev_A.pdf>, 46 pages.

10xGenomics.com, [online], "Visium Spatial Gene Expression Reagent Kits—Tissue Optimization," Oct. 2020, retrieved on Dec. 28, 2021, retrieved from URL<https://assets.ctfassets.net/an68im79xiti/5UJrN0cH17rEk0UXwd19It/e54d99fb08a8f1500aba503005a04a56/CG000238_VisiumSpatialTissueOptimizationUserGuide_RevD.pdf>, 43 pages.

10xGenomics.com, [online], "Visium Spatial Gene Expression Reagent Kits—User Guide," Jan. 2022, retrieved on Jun. 27, 2024, retrieved from URL<https://web.archive.org/web/20230326192142/https://www.10xgenomics.com/support/spatial-gene-expression-fresh-frozen/documentation/steps/library-construction/visium-spatial-gene-expression-reagent-kits-user-guide>, 71 pages.

10xGenomics.com, [online], "Visium Spatial Gene Expression Reagent Kits—User Guide," Jun. 2020, retrieved on May 25, 2021, retrieved from URL<https://assets.ctfassets.net/an68im79xiti/7AqbPw6d9eHXAba4eVJMSY/0c4fbd3957f50efd9c92d7cbf7d46ba5/CG000239_VisiumSpatialGeneExpression_UserGuide_RevC.pdf>, 69 pages.

10xGenomics.com, [online], "Visium Spatial Gene Expression Reagent Kits—User Guide," Oct. 2020, retrieved on Dec. 28, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 70 pages.

Adessi et al., "Solid phase DNA amplification: characterisation of primer attachment and amplification mechanisms," Nucl. Acids Res., 2000, 28(20):E87, 8 pages.

Affymetrix, "GeneChip Human Genome U133 Set," retrieved from the Internet: on the World Wide Web at affymetrix.com/support/technical/datasheets/hgu133_datasheet.pdf, retrieved on Feb. 26, 2003, 2 pages.

Affymetrix, "Human Genome U95Av2," Internet Citation, retrieved from the internet: on the World Wide Web affymetrix.com, retrieved on Oct. 2, 2002, 1 page.

Albretsen et al., "Applications of magnetic beads with covalently attached oligonucleotides in hybridization: Isolation and detection of specific measles virus mRNA from a crude cell lysate," Anal. Biochem., 1990, 189(1):40-50.

Allawi et al., "Thermodynamics and NMR of Internal G.T Mismatches in DNA," Biochemistry, 1996, 36(34):10581-10594.

(56)        References Cited

OTHER PUBLICATIONS

Andor.com [online], "Discover new ways of seeing," Next Generation Digital Illumination, Mosaic 3, 2020, 11 pages.

Armani et al., "2D-PCR: a method of mapping DNA in tissue sections," Lab Chip, 2009, 9(24):3526-34.

Asp et al., "A spatiotemporal organ-wide gene expression and cell atlas of the developing human heart," Cell, Dec. 12, 2019, 179(7):1647-1660.

Asp et al., "Spatially Resolved Transcriptomes-Next Generation Tools for Tissue Exploration," Bioessays, Oct. 2020, 42(10):e1900221, 16 pages.

Atkinson et al., "An Updated Protocol for High Throughput Plant Tissue Sectioning," Front Plant Sci, 2017, 8:1721, 8 pages.

Atkinson, "Overview of Translation: Lecture Manuscript," U of Texas, 2000, DD, pp. 6.1-6.8.

Bains et al., "A novel method for nucleic acid sequence determination," Journal of Theoretical Biology, 1988, 135(3), 303-7.

Barnes, "PCR amplification of up to 35-kb DNA with high fidelity and high yield from lambda bacteriophage templates," Proc. Natl. Acad. Sci USA, 1994, 91(6):2216-2220.

Beattie et al., "Advances in genosensor research," Clin Chem., May 1995, 41(5):700-6.

Beechem et al., "High-Plex Spatially Resolved RNA and Protein Detection Using Digital Spatial Profiling: A Technology Designed for Immuno-oncology Biomarker Discovery and Translational Research," Methods Mol Biol, 2020, Chapter 25, 2055:563-583.

Bergenstråhle et al., "Seamless integration of image and molecular analysis for spatial transcriptomics workflows," BMC Genomics, Jul. 2020, 21(1):482, 7 pages.

Birney et al., "Identification and analysis of functional elements in 1% of the human genome by the ENCODE pilot project," Nature, 2007, 447(7146):799-816.

Blair et al., "Microarray temperature optimization using hybridization kinetics," Methods Mol Biol., 2009, 529:171-96.

Blanchard et al., "High-density oligonucleotide arrays," Biosensors & Bioelectronics, 1996, 11(6-7):687-690.

Blokzijl et al., "Profiling protein expression and interactions: proximity ligation as a tool for personalized medicine," J Intern. Med., 2010, 268(3):232-245.

Blow, "Tissue Issues," Nature, 2007, 448(7156):959-962.

Bolotin et al., "MiXCR: software for comprehensive adaptive immunity profiling," Nat Methods., May 2015, 12(5):380-1.

Borm et al., "High throughput human embryo spatial transcriptome mapping by surface transfer of tissue RNA," Abstracts Selected Talks, Single Cell Genomics mtg, (SCG2019), 2019, 1 pages (Abstract Only).

Brandon et al., "Mitochondrial mutations in cancer," Oncogene, 2006, 25(34):4647-4662.

Brenner et al., "Gene expression analysis by massively parallel signature sequencing (MPSS) on microbead arrays," Nat. Biotech., 2000, 18(6):630-634.

Brenner et al., "In vitro cloning of complex mixtures of DNA on microbeads: physical separation of differentially expressed cDNAs," Proc. Natl. Acad. Sci. USA, 2000, 97(4):1665-1670.

Brow, "35 - The Cleavase I enzyme for mutation and polymorphism scanning," PCR Applications Protocols for Functional Genomics, 1999, pp. 537-550.

Brown et al., "Retroviral integration: structure of the initial covalent product and its precursor, and a role for the viral IN protein," Proc Natl Acad Sci USA, Apr. 1989, 86(8):2525-9.

Buenrostro et al., "Transposition of native chromatin for multimodal regulatory analysis and personal epigenomics," Nat Methods, Dec. 2013, 10(12):1213-1218.

Bullard et al., "Direct comparison of nick-joining activity of the nucleic acid ligases from bacteriophage T4," Biochem. J. 2006, 398(1):135-144.

Burgess, "A space for transcriptomics," Nature Reviews Genetics, 2016, 17(8):436-7.

Burgess, "Finding structure in gene expression," Nature Reviews Genetics, 2018, 19(5):249, 1 page.

Burgess, "Spatial transcriptomics coming of age," Nat Rev Genet., Jun. 2019, 20(6):317, 1 page.

Calvert, "Materials science. Printing cells," Science, Oct. 2007, 318(5848):208-209.

Carter et al., "Stabilization of an optical microscope to 0.1 nm in three dimensions," Applied Optics, 2007, 46:421-427.

Cha et al., "Specificity, efficiency, and fidelity of PCR," Genome Res., 1993, 3(3):S18-29.

Chandra et al., "Cell-free synthesis-based protein microarrays and their applications," Proteomics, 2009, 5(6):717-30.

Chatterjee et al., "Mitochondrial DNA mutations in human cancer. Oncogene," 2006, 25(34):4663-4674.

Chen et al., "DNA hybridization detection in a microfluidic Channel using two fluorescently labelled nucleic acid probes," Biosensors and Bioelectronics, 2008, 23(12):1878-1882.

Chen et al., "Large field of view-spatially resolved transcriptomics at nanoscale resolution," bioRxiv, Jan. 19, 2021, retrieved from URL <https://www.biorxiv.org/node/1751045.abstract>, 37 pages.

Chen et al., "Spatial Transcriptomics and In Situ Sequencing to Study Alzheimer's Disease," Cell, Aug. 2020, 182(4):976-991.

Chen et al., "µCB-seq: microfluidic cell barcoding and sequencing for high-resolution imaging and sequencing of single cells," Lab Chip, Nov. 2020, 20(21):3899-3913.

Cho et al., "Seq-Scope: Submicrometer-resolution spatial transcriptomics for single cell and subcellular studies," bioRxiv, Jan. 27, 2021, retrieved from URL <https://www.biorxiv.org/node/1754517.abstract>, 50 pages.

Cockroft et al., "A single-molecule nanopore device detects DNA polymerase activity with single-nucleotide resolution," J Am Chem Soc., Jan. 2008, 130(3):818-20.

Codeluppi et al., "Spatial organization of the somatosensory cortex revealed by osmFISH," Nature Methods, Nov. 2018, 15:932-935.

Constantine et al., "Use of genechip high-density oligonucleotide arrays for gene expression monitoring," Life Science News, Amersham Life Science, 1998, pp. 11-14.

Credle et al., "Multiplexed analysis of fixed tissue RNA using Ligation in situ Hybridization," Nucleic Acids Research, 2017, 45(14):e128, 9 pages.

Crosetto et al., "Spatially resolved transcriptomics and beyond," Nature Review Genetics, 2015, 16(1):57-66.

Czarnik, "Encoding methods for combinatorial chemistry," Curr Opin Chem Biol., Jun. 1997, 1(1):60-6.

Dahl et al., "Circle-to-circle amplification for precise and sensitive DNA analysis," Proc. Natl. Acad. Sci., 2004, 101(13):4548-4553.

Dalma-Weiszhausz et al., "The affymetrix GeneChip platform: an overview," Methods Enzymol., 2006, 410:3-28.

Daubendiek et al., "Rolling-Circle RNA Synthesis: Circular Oligonucleotides as Efficient Substrates for T7 RNA Polymerase," J. Am. Chem. Soc., 1995, 117(29):7818-7819.

Davies et al., "How best to identify chromosomal interactions: a comparison of approaches," Nat. Methods, 2017, 14(2):125-134.

Deamer et al., "Characterization of nucleic acids by Nanopore analysis," Acc Chem Res., Oct. 2002, 35(10):817-25.

Dean et al., "Comprehensive human genome amplification using multiple displacement amplification," Proc Natl. Acad. Sci. USA, 2002, 99(8):5261-66.

Dhindsa et al., "Virtual Electrowetting Channels: Electronic Liquid Transport with Continuous Channel Functionality," Lab Chip, 2010, 10:832-836.

Duncan et al., "Affinity chromatography of a sequence-specific DNA binding protein using Teflon-linked oligonucleotides," Anal. Biochem., 1988, 169(1):104-108.

Eastburn, "Microfluidic droplet enrichment for targeted sequencing," Nucleic Acids Research, 2015, 43(13):1-8.

Echeverria et al., "Functional Stimuli-Responsive Gels: Hydrogels and Microgels," Gels., Jun. 2018, 4(2):54, 37 pages.

Eguiluz et al., "Multitissue array review: a chronological description of tissue array techniques, applications and procedures," Pathology Research and Practice, 2006, 202(8):561-568.

Eldridge et al., "An in vitro selection strategy for conferring protease resistance to ligand binding peptides," Protein Eng Des Sel., 2009, 22(11):691-698.

(56)　　　　References Cited

OTHER PUBLICATIONS

Ellington et al., "Antibody-based protein multiplex platforms: technical and operational challenges," Clin Chem, 2010, 56(2):186-193.

Eng et al., "Transcriptome-scale super-resolved imaging in tissues by RNA seqFISH+," Nature, Apr. 2019, 568(7751):235-239, 37 pages.

Ertsey et al., "Coverslip Mounted-Immersion Cycled in Situ RT-PCR for the Localization of mRNA in Tissue Sections," Biotechniques, 1998, 24(1):92-100.

Extended European Search Report in European Appln. No. 24182016. 6, dated Oct. 10, 2024, 8 pages.

Fire et al., "Rolling replication of short DNA circles," Proc. Natl. Acad. Sci., 1995, 92(10):4641-4645.

Fluidigm, "Hyperion Imaging System: Visualize a new path forward," Feb. 2018, retrieved from URL <https://www.fluidigm.com/binaries/content/documents/fluidigm/search/hippo%3Aresultset/hyperion-imaging-system-br-400326/fluidigm%3Afile>, 27 pages.

Fluidigm, "Immuno-Oncology Research with the Hyperion Imaging System: A high-parameter imaging solution at subcellular resolution to characterize the immune repertoire in the tumor microenvironment," Apr. 2018, retrieved from URL <https://www.fluidigm.com/binaries/content/documents/fluidigm/search/hippo%3Aresultset/application-note-immuno-oncology-research-with-the-hyperion%E2%84%A2-imaging-system/fluidigm%3Afile>, 6 pages.

Fluidigm, "Immuno-Oncology Research with the Hyperion Imaging System: A high-parameter imaging solution at subcellular resolution to characterize the immune repertoire in the tumor microenvironment," Aug. 2018, retrieved from URL <https://www.fluidigm.com/binaries/content/documents/fluidigm/marketing/immuno-oncology-research-with-the-hyperion-imaging-system-appnote-400332/immuno-oncology-research-with-the-hyperion-imaging-system-appnote-400332/fluidigm%3Afile>, 6 pages.

Fluidigm, "Maxpar Antibodies for Imaging Mass Cytometry," Mar. 2018, retrieved from URL <https://www.fluidigm.com/binaries/content/documents/fluidigm/search/hippo%3Aresultset/hyperion-antibodies-for-imaging-mass-cytometry-br-101-7115/fluidigm%3Afile>, 2 pages.

Fodor et al., "Light-directed, spatially addressable parallel chemical synthesis," Science, 1995, 251(4995):767-773.

Forcucci et al., "All-plastic miniature fluorescence microscope for point-of-care readout of bead-based bioassays.," J. Biomed Opt., 2015, 20(10):105010, 15 pages.

Forster et al., "A human gut bacterial genome and culture collection for improved metagenomic analyses," Nature Biotechnology, 2019, 37(2):186-192.

Frese et al., "Formylglycine aldehyde Tag—protein engineering through a novel post-translational modification," ChemBioChem., 2009, 10(3):425-27.

Fu et al., "Continuous Polony Gels for Tissue Mapping with High Resolution and RNA Capture Efficiency," bioRxiv, doi: https://doi.org/10.1101/2021.03.17.435795, 2021, 20 pages (Preprint).

Fu et al., "Counting individual DNA molecules by the stochastic attachment of diverse labels," PNAS, 2011, 108(22):9026-9031.

Fullwood et al., "Next-generation DNA sequencing of paired-end tags (PET) for transcriptome and genome analyses," Genome Res., 2009, 19(4):521-532.

Ganguli et al., "Pixelated spatial gene expression analysis from tissue," Nat Commun., Jan. 2018, 9(1):202, 9 pages.

Gene@arrays[online], BeadArray Technology, available on or before Feb. 14, 2015, via Internet Archive: Wayback Machine URL <https://web.archive.org/web/20150214084616/http://genearrays.com/services/microarrays/illumina/beadarray-technology/>, [retrieved on Jan. 30, 2020], 3 pages.

Gnanapragasam, "Unlocking the molecular archive: the emerging use of formalin-fixed paraffin-embedded tissue for biomarker research in urological cancer," BJU International, 2009, 105(2):274-278.

Goh et al., "Highly Specific Multiplexed RNA Imaging in Tissues With Split-FISH," Nat Methods, Jun. 15, 2020, 17(7):689-693, 21 pages.

Goldkorn et al., "A simple and efficient enzymatic method for covalent attachment of DNA to cellulose. Application for hybridization-restriction analysis and for in vitro synthesis of DNA probes," Nucleic Acids Res., 1986, 14(22):9171-9191.

Gracia Villacampa et al., "Genome-wide Spatial Expression Profiling in FFPE Tissues," bioRxiv, Cell Genomics, posted Jul. 25, 2020, published Dec. 8, 2021, 1(3): 100065, 38 pages.

Gunderson et al., "Decoding randomly ordered DNA arrays," Genome Research, 2004, 14(5):870-877.

Guo et al., "Direct fluorescence analysis of genetic polymorphisms by hybridization with oligonucleotide arrays on glass supports," Nucleic Acids Res., Dec. 1994, 22(24):5456-65.

Hamaguchi et al., "Direct reverse transcription-PCR on oligo(dT)-immobilized polypropylene microplates after capturing total mRNA from crude cell lysates," Clin Chem., Nov. 1998, 44(11):2256-63.

Hattersley et al., "Development of a microfluidic device for the maintenance and interrogation of viable tissue biopsies," Lab Chip., Nov. 2008, 8(11):1842-6.

Hayes et al., "Electrophoresis of proteins and nucleic acids: I-Theory," BMJ, Sep. 1989, 299(6703):843-6.

He et al., "In situ synthesis of protein arrays," Current Opinion in Biotechnology, 2008, 19(1):4-9.

He, "Cell-free protein synthesis: applications in proteomics and biotechnology," New Biotechnology, 2008, 25(2-3):126-132.

Hejatko et al., "In situ hybridization technique for mRNA detection in whole mount Arabidopsis samples," Nature Protocols, 2006, 1(4):1939-1946.

Hiatt et al., "Parallel, tag-directed assembly of locally derived short sequence reads," Nature Methods, 2010, 7(2):119-25.

Hoyer et al., "Electrostatic spraying: a novel technique for preparation of polymer coatings on electrodes," Anal Chem, Nov. 1996, 68(21):3840-4.

Jamur et al., "Permeabilization of cell membranes.," Method Mol. Biol., 2010, 588:63-66.

Jemt et al., "An automated approach to prepare tissue-derived spatially barcoded RNA-sequencing libraries," Scientific Reports, 2016, 6:37137, 10 pages.

Kapteyn et al., "Incorporation of non-natural nucleotides into template-switching oligonucleotides reduces background and improves cDNA synthesis from very small RNA samples," BMC Genomics, Jul. 2010, 11:413, 9 pages.

Kim, "Development of Microdevices for Applications to Bioanalysis," Dissertation for the degree of Doctor of Philosophy, University of Texas at Austin, Aug. 2007, 176 pages.

Kishi et al., "Light-Seq: light-directed in situ barcoding of biomolecules in fixed cells and tissues for spatially indexed sequencing," Nature Methods, Oct. 10, 2022, 19(11):1393-1402.

Korbel et al., "Paired-end mapping reveals extensive structural variation in the human genome," Science, 2007, 318(5849):420-426.

Kozlov et al., "A highly scalable peptide-based assay system for proteomics," PLos One, 2012, 7(6):e37441, 10 pages.

Kristensen et al., "High-Throughput Methods for Detection of Genetic Variation," BioTechniques, Feb. 2001, 30(2):318-332.

Kuhn et al., "A novel, high-performance random array platform for quantitative gene expression profiling," Genome Res, 2004, 14:2347-2356.

Kurz et al., "cDNA - protein fusions: covalent protein—gene conjugates for the in vitro selection of peptides and proteins," ChemBioChem., 2001, 2(9):666-72.

Kwok, "High-throughput genotyping assay approaches," Pharmacogenomics, Feb. 2000, 1(1):95-100.

Lage et al., "Whole genome analysis of genetic alterations in small DNA samples using hyperbranched strand displacement amplification and array-CGH," Genome Research, 2003, 13(2):294-307.

Landegren et al., "Reading bits of genetic information: methods for single-nucleotide polymorphism analysis," Genome Res., Aug. 1998, 8(8):769-76.

Langdale et al., "A rapid method of gene detection using DNA bound to Sephacryl," Gene, 1985, 36(3):201-210.

Leriche et al., "Cleavable linkers in chemical biology," Bioorganic & Medicinal Chemistry, 2012, 20:571-582.

(56)          References Cited

OTHER PUBLICATIONS

Levene et al., "Zero-Mode Waveguides for Single-Molecule Analysis at High Concentrations," Science, 2003, 299:682-686.

Li et al., "DNA molecules and configurations in a solid-state nanopore microscope," Nat Mater., Sep. 2003, 2(9):611-5.

Lin et al., "Microfluidic cell trap array for controlled positioning of single cells on adhesive micropatterns," Lab Chip, Feb. 2013, 13(4):714-721.

Linnarsson, "Recent advances in DNA sequencing methods—general principles of sample preparation," Experimental Cell Research, 2010, 316(8):1339-1343.

Liu et al., "High-Spatial-Resolution Multi-Omics Atlas Sequencing of Mouse Embryos via Deterministic Barcoding in Tissue," BioRxiv, 2019, 55 pages.

Liu et al., "High-Spatial-Resolution Multi-Omics Sequencing via Deterministic Barcoding in Tissue," Cell, Nov. 13, 2020, 183(6):1665-1681, 36 pages.

Liu et al., "Spatial transcriptome sequencing of FFPE tissues at cellular level," bioRxiv 788992, doi: https://doi.org/10.21203/rs.3.rs-95064/v1, Oct. 14, 2020, 39 pages (Preprint).

Lizardi et al., "Mutation detection and single-molecule counting using isothermal rolling-circle amplification," Nat. Genet., 1998, 19(3):225-232.

Lu et al., "A microfluidic electroporation device for cell lysis," Lab Chip., Jan. 2005, 5(1):23-29.

Lundberg et al., "Multiplexed homogeneous proximity ligation assays for high-throughput protein biomarker research in serological material," Mol Cell Proteomics, 2011, 10(4):M110.004978, 11 pages.

Lundquist et al., "Parallel confocal detection of single molecules in real time," Opt. Lett., 2008, 33:1026-1028.

MacBeath et al., "Printing proteins as microarrays for high-throughput function determination," Science, Sep. 2000, 289(5485):1760-1763.

Marx, "Method of the Year: spatially resolved transcriptomics," Nature Methods, 2021, 18(1):9-14.

Merritt et al., "Multiplex digital spatial profiling of proteins and RNA in fixed tissue," Nat Biotechnol, May 2020, 38(5):586-599.

Metzker, "Sequencing technologies—the next generation," Nature Reviews Genetics, 2010, 11(1):31-46.

Miller et al., "Basic concepts of microarrays and potential applications in clinical microbiology," Clinical Microbiology Reviews, 2009, 22(4):611-633.

Miller et al., "Chapter 11—Solid and Suspension Microarrays for Microbial Diagnostics," Methods in Microbiology, 2015, 42:395-431.

Mishra et al., "Three-dimensional genome architecture and emerging technologies: looping in disease," Genome Medicine, 2017, 9(1):87, 14 pages.

Mitra et al., "Digital genotyping and haplotyping with polymerase colonies," Proc. Natl. Acad. Sci. USA, May 2003, 100(10):5926-5931.

Mizusawa et al., "A bacteriophage lambda vector for cloning with BamHI and Sau3A," Gene, 1982, 20(3):317-322.

Ncbi.nlm.nih.gov, [online], "Molecular Inversion Probe Assay," available on or before Oct. 14, 2014, via Internet Archive: Wayback Machine URL<https://web.archive.org/web/20141014124037/https://www.ncbi.nlm.nih.gov/probe/docs/techmip/>, retrieved on Jun. 16, 2021, retrieved from URL<https://www.ncbi.nlm.nih.gov/probe/docs/techmip/>, 2 pages.

Nikiforov et al., "The use of 96-well polystyrene plates for DNA hybridization-based assays: an evaluation of different approaches to oligonucleotide immobilization," Anal Biochem, May 1995, 227(1):201-9.

Nowak, "Entering the Postgenome Era," Science, 1995, 270(5235):368-71.

PCT International Preliminary Report on Patentability in International Appln. No. PCT/US2022/017006, dated Aug. 31, 2023, 20 pages.

PCT International Search Report and Written Opinion in International Appln. No. PCT/US2022/017006, dated Oct. 18, 2022, 28 pages.

PCT Invitation to Pay Addn'l Fees in International Appl'n No. PCT/US2022/017006, dated Jun. 14, 2022, 17 pages.

Pemov et al., "DNA analysis with multiplex microarray-enhanced PCR," Nucl. Acids Res., Jan. 2005, 33(2):e11, 9 pages.

Perler et al., "Intervening sequences in an Archaea DNA polymerase gene," Proc Natl Acad Sci USA, Jun. 1992, 89(12):5577-5581.

Petterson et al., "Generations of sequencing technologies," Genomics, 2009, 93(2):105-111.

Polsky-Cynkin et al., "Use of DNA immobilized on plastic and agarose supports to detect DNA by sandwich hybridization," Clin. Chem., 1985, 31(9):1438-1443.

Ranki et al., "Sandwich hybridization as a convenient method for the detection of nucleic acids in crude samples," Gene, 1983, 21(1-2):77-85.

Reinartz et al., "Massively parallel signature sequencing (MPSS) as a tool for in-depth quantitative gene expression profiling in all organisms," Brief Funct Genomic Proteomic, Feb. 2002, 1(1):95-104.

Rodriques et al., "Slide-seq: A scalable technology for measuring genome-wide expression at high spatial resolution," Science, 2019, 363(6434):1463-1467.

Ronaghi et al., "A sequencing method based on real-time pyrophosphate," Science, Jul. 1998, 281(5375):363-365.

Ronaghi et al., "Real-time DNA sequencing using detection of pyrophosphate release," Analytical Biochemistry, Nov. 1996, 242(1):84-89.

Ronaghi, "Pyrosequencing sheds light on DNA sequencing," Genome Res, Jan. 2001, 11(1):3-11.

Rountenberg et al., "Microfluidic probe: a new tool for integrating microfluidic environments and electronic wafer-orobina," Lab Chip, Oct. 2009, 10: 123-127.

Salmén et al., "Barcoded solid-phase RNA capture for Spatial Transcriptomics profiling in mammalian tissue sections," Nature Protocols, Oct. 2018, 13(11):2501-2534.

Saxonov et al., "10x Genomics, Mastering Biology to Advance Human Health," PowerPoint, 10x, 2020, 41 pages.

Schena et al., "Quantitative monitoring of gene expression patterns with a complementary DNA microarray," Science, Oct. 1995, 270(5235):467-470.

Shalon et al., "A DNA microarray system for analyzing complex DNA samples using two-color fluorescent probe hybridization," Genome Res., Jul. 1996, 6(7):639-45.

Soni and Meller, "Progress toward ultrafast DNA sequencing using solid-state nanopores," Clin Chem., 2007, 53:1996-2001.

Stahl et al., "Visualization and analysis of gene expression in tissue sections by spatial transcriptomics," Science, Jul. 2016, 353(6294):78-82.

Stahl et al., "Visualization and analysis of gene expression in tissue sections by spatial transcriptomics," Supplementary Materials, Science, Jul. 2016, 353(6294):78-82, 41 pages.

Stimpson et al., "Real-time detection of DNA hybridization and melting on oligonucleotide arrays by using optical wave guides," Proc Natl Acad Sci USA, Jul. 1995, 92(14):6379-83.

Strell et al., "Placing RNA in context and space—methods for spatially resolved transcriptomics," The FEBS Journal, 2019, 286(8):1468-1481.

Sun et al., "Statistical Analysis of Spatial Expression Pattern for Spatially Resolved Transcriptomic Studies," Nature Methods, Jan. 27, 2020, 17(2): 193-200.

Svensson et al., "SpatialDE: identification of spatially variable genes," Nature Methods, May 2018, 15:343-346, 15 pages.

Takei et al., "Integrated Spatial Genomics Reveals Global Architecture of Single Nuclei," Nature, Jan. 27, 2021, 590(7845):344-350, 53 pages.

Taylor et al., "Microfluidic local perfusion chambers for the visualization and manipulation of synapses," Neuron., Apr. 2010, 66(1):57-68, 25 pages.

Thomas et al., "A chamber for the perfusion of in vitro tissue with multiple solutions," J. Neurophysiol., Jul. 2013, 110:269-277.

(56) References Cited

OTHER PUBLICATIONS

Tijssen et al., "Overview of principles of hybridization and the strategy of nucleic acid assays" in Techniques in Biochemistry and Molecular Biology—Hybridization with Nucleic Acid Probes, 1993, 24(Chapter 2), 65 pages.
Toy et al., "A Simple Plastic Perfusion Chamber for Continuous Maintenance and Cinematography of Tissue Cultures," Experimental Cell Research, 1958, 14:97-103.
Twyman et al., "Techniques Patents for SNP Genotyping," Pharmacogenomics, Jan. 2003, 4(1):67-79.
Valley et al., "Optoelectronic tweezers as a tool for parallel single-cell manipulation and stimulation," IEEE Trans Biomed Circuits Syst., Dec. 2009, 3(6):424-31.
Van Gelder et al., "Amplified RNA synthesized from limited quantities of heterogeneous cDNA," Proc. Natl. Acad. Sci. USA, 1990, 87(5):1663-1667.
Vasiliskov et al., "Fabrication of microarray of gel-immobilized compounds on a chip by copolymerization," Biotechniques, Sep. 1999, 27(3):592-606.
Vickovic et al., "High-definition spatial transcriptomics for in situ tissue profiling," Nat Methods, Oct. 2019, 16(10):987-990.
Vickovic et al., "SM-Omics: An automated Platform for High-Throughput Spatial Multi-Omics," bioRxiv, Oct. 2020, 40 pages.
Vogelstein et al., "Digital PCR," Proceedings of the National Academy of Sciences, Aug. 1999, 96(16):9236-9241.
Walker et al., "Strand displacement amplification—an isothermal, in vitro DNA amplification technique," Nucleic Acids Research, 1992, 20(7):1691-1696.
Wang et al., "Concentration gradient generation methods based on microfluidic systems," RSC Adv., 2017, 7:29966-29984.
Wang et al., "High-fidelity mRNA amplification for gene profiling," Nature Biotechnology, Apr. 2000, 18(4):457-459.

Wang et al., "Imaging-based pooled CRISPR screening reveals regulators of lncRNA localization," Proc Natl Acad Sci USA, May 2019, 116(22):10842-10851.
Wheeler et al., "Microfluidic device for single-cell analysis," Analytical Chemistry, Jul. 2003, 75(14):3581-3586.
Willner, "Stimuli-Controlled Hydrogels and Their Applications," Acc Chem Res., Apr. 2017, 50(4):657-658.
Worthington et al., "Cloning of random oligonucleotides to create single-insert plasmid libraries," Anal Biochem, 2001, 294(2):169-175.
Xia et al., "Spatial transcriptome profiling by MERFISH reveals subcellular RNA compartmentalization and cell cycle-dependent gene expression", Proceedings of the National Academy of Sciences, Sep. 2019, 116(39):19490-19499.
Yershov et al., "DNA analysis and diagnostics on oligonucleotide microchips," Proc. Natl. Acad. Sci. USA, May 1996, 93(10):4913-4918.
Yoda et al., "Site-specific gene expression analysis using an automated tissue micro-dissection punching system," Sci Rep., Jun. 2017, 7(1):4325, 11 pages.
Zhu et al., "Reverse transcriptase template switching: a SMART approach for full-length cDNA library construction," Biotechniques, Apr. 2001, 30(4):892-897.
Stickels et al., "Highly sensitive spatial transcriptomics at near-cellular resolution with Slide-seqV2," Nat Biotechnol., Mar. 2021, 39(3):313-319, 28 pages (Author Manuscript).
Youtube, "Microarray Hybridization Cassette AHC1x24," youtube. com, retrieved on Jul. 28, 2025, retrieved from URL <https://www.youtube.com/watch?v=spHlUgljfAs>, 3 pages (with Machine Transcript).
Youtube, "Microarray Wash Tray & Multi-Well Hybridization Cassettes," youtube.com, available on or before Jul. 16, 2015, retrieved on Jul. 28, 2025, retrieved from URL <https://www.youtube.com/watch?v=147Kbe5BsbM>, 5 pages (with Machine Transcript).

* cited by examiner

METHODS OF USING MODULAR ASSAY SUPPORT DEVICES

CROSS-REFERENCE TO RELATED APPLICATIONS

This application is a continuation application of U.S. patent application Ser. No. 18/784,392, filed on Jul. 25, 2024, which is a continuation application of U.S. patent application Ser. No. 18/357,610, now U.S. Pat. No. 12,098, 985, filed on Jul. 24, 2023, which is a continuation of International Application PCT/US2022/017006, with an international filing date of Feb. 18, 2022, which claims the benefit of U.S. Provisional Patent Application No. 63/151, 300, filed Feb. 19, 2021, and U.S. Provisional Patent Application No. 63/270,254, filed Oct. 21, 2021. The contents of these applications are incorporated by reference in their entireties.

SEQUENCE LISTING

This application contains a Sequence Listing that has been submitted electronically as an XML file named "47706-0283003_SL_ST26.XML." The XML file, created on Mar. 14, 2025, is 3,634 bytes in size. The material in the XML file is hereby incorporated by reference in its entirety.

BACKGROUND

Cells within a tissue of a subject have differences in cell morphology and/or function due to varied analyte levels (e.g., gene and/or protein expression) within the different cells. The specific position of a cell within a tissue (e.g., the cell's position relative to neighboring cells or the cell's position relative to the tissue microenvironment) can affect, e.g., the cell's morphology, differentiation, fate, viability, proliferation, behavior, and signaling and crosstalk with other cells in the tissue.

Spatial heterogeneity has been previously studied using techniques that only provide data for a small handful of analytes in the context of an intact tissue or a portion of a tissue, or provide a lot of analyte data for single cells, but fail to provide information regarding the position of the single cell in a parent biological sample (e.g., tissue sample).

Furthermore, imaging systems used on spatial analyte data are inherently variable in their resolution and sensitivity. This is due in large part to the variability of manufacturers for imaging system components in addition to the arrangement of the imaging apparatus, differences between various types of imaging apparatuses, and image acquisition software. The image quality is further impacted by alterations in the image acquisition performed by the user. This problem becomes more apparent when trying to image samples of an unknown fluorescent intensity or by having samples imaged by users of varying experience.

Moreover, in a laboratory environment, a variety of processing protocols are used to prepare a sample for analysis. These protocols can be performed in test tubes, on slides, or more generally, on a sample that is supported by a substrate. Certain protocols are performed at a stable, controlled temperatures to ensure the fidelity of the sample and protocol reagents. Other protocols involve temperature cycling and other steps in which the temperature of the sample is adjusted in controlled fashion. To heat the sample and its supporting substrate during a protocol, a thermocycler, heating plate, or other heating device may be used. As one example, thermocyclers can be as part of polymerase chain reaction protocols for nucleic acid amplification and in transcription and reverse transcription analytical sequences. Controlled heating of samples in thermocyclers and other heating devices also can occur to facilitate temperature-sensitive reactions for restriction enzyme digestion and rapid diagnostics, for example.

In addition, a biological sample may be placed on a solid support to be analyzed for identification or characterization of an analyte, such as DNA, RNA, or other genetic material, within the sample. Printed guides may help improve placement of a sample on a solid support.

Current methods and devices to support biological samples (e.g., during spatial analysis and/or heating) often lack portability, do not provide access to specific sample regions or wells, and/or do not provide a vapor-tight seal for preventing cross-contamination between the sample regions or wells.

SUMMARY

Embodiments disclosed below include support devices for substrates including a sample region and methods of incubating a sample disposed on a sample region of a substrate. Some embodiments of the devices, systems, and methods described herein may provide one or more of the following advantages.

First, some embodiments described herein may provide a modular design providing the user with flexibility to load one or more inserts onto a same support device. In some embodiments, the inserts include a support structure and an over-molded gasket. The one or more inserts may include one or more ports configured to provide the user direct access to a substrate (e.g., a biological sample on a substrate). For example, the modular design of the support device may provide the user the option to use a variety of ports having different volumes while only requiring the use of one support device. Thus, the user may be able to use a same support device for different applications requiring different volumes.

Second, some embodiments described herein may facilitate precise positioning of a port (e.g., an insert) on a substrate (e.g., a glass slide) when the support device is in use. For example, the inserts may be movable to any portion or area of the or directly above the substrate once loaded onto the support device. In some embodiments, the inserts may be rotated about 0 degrees to about 360 degrees to facilitate alignment with a sample region of a substrate (e.g., a region supporting a sample such as a biological sample). In some embodiments, the inserts may be placed in different locations on or directly above a surface of the substrate, within the boundaries of the opening area of a cover of the support device. In some embodiments, the inserts may be slidable inserts including slidable gaskets that provide a user the flexibility to contact a substrate at one or more locations without the need to remove the insert from the support device or without the need to move the insert itself within the opening area of a cover of the support device.

Third, some embodiments described herein may accommodate one or more samples (e.g., biological samples) located anywhere on the substrate. For example, in some embodiments, a substrate may include two samples positioned at different locations on the substrate, and the removable and movable inserts of the support devices disclosed herein can create two seals (e.g., a vapor-tight and/or a liquid-tight seal) surrounding at least a portion of each of the two samples. In some embodiments, the support devices can form a reagent well (e.g., by aligning a gasket of the inserts with at least a portion of the samples) for assay reagent solutions used in assays for processing one or more samples. In some embodiments, the support devices disclosed herein facilitate the optimization of solution (e.g., assay reagent solutions) volumes.

Fourth, some embodiments described herein may facilitate set-up and reduce time spent by the user in assembling the device and substrate. In some embodiments, the user can easily insert a substrate into the devices described herein without fastening of multiple pieces. In some embodiments, the user does not use any tools to aid in the insertion of the substrate into the device or to aid in removing the substrate from the device. For example, the user may not need to use any type of fastener to assemble the support device nor to secure a substrate to the support device, thereby providing a more efficient way of supporting a sample (e.g., a biological sample). In other examples, the devices disclosed herein may alternatively use one or more fasteners to assemble the support device and/or to secure a substrate to the support device.

Fifth, some embodiments described herein may provide a vapor-tight, or liquid-tight, and/or air-tight seal formed between a gasket and the substrate when the substrate holder is in the closed position. For example, the insert may include a gasket configured to form a vapor-tight and/or air-tight seal that can prevent transport of liquid between one or more inserts or ports. The vapor-tight and/or air-tight seal can further prevent cross-contamination of biological samples via, e.g., the leakage of solution or liquid from a first sample region to a second sample region. Furthermore, the vapor-tight, liquid-tight, and/or air-tight seal formed between the gasket and the substrate may allow the user to utilize less volume of reagents (e.g., costly reagents) that would otherwise be required if a gasket would not be used to seal off an area of interest on the substrate (e.g., a sample region). Thus, the inserts including a gasket described herein may advantageously reduce the cost to perform assays using the support devices of the disclosure.

Sixth, some embodiments described herein may minimize shear forces on a substrate loaded onto a support device. For example, shear forces on a loaded substrate may be minimized near or at an area of the substrate in close proximity to the hinge or hinges of the support device. The minimization of shear forces can prevent damage to the substrate (e.g., breakage or cracking).

Seventh, some embodiments described herein may provide consistent and even heating to a substrate surface. Even heating can be critical to ensuring that preparative reactions performed on a sample supported by the substrate occur according to established protocols and achieve desired outcomes. The devices provided herein can be used to ensure that the temperature of a substrate and any samples and/or reagents supported on the substrate surface is controlled uniformly and consistently during a sample preparation and/or analysis protocol. During such protocols, uneven heating can lead to failure of the sample preparation.

Eighth, some embodiments described herein may reduce or prevent condensation from forming in substrate wells by sealing a substrate well (e.g., including a sample region or a sample) with the vapor-tight and/or air-tight seal generated by the gasket. Heating a substrate (e.g., a glass slide) to temperatures above room temperature can cause condensation to form on an upper surface of an enclosed substrate well if the substrate is heated without an upper lid. Condensation can change the composition of reaction mixtures in the substrate wells, inhibiting preparative reactions, and/or producing unpredictable results. Further, even when sample heating is relatively uniform, condensation that contacts the sample may impair certain reactions that are part of the protocol, or otherwise affect the chemical reactions that occur. The devices described, in various embodiments, provide for heating of multiple surfaces of a substrate (e.g., in a slide cassette or substrate holder), and can include features that facilitate heat transfer from heating elements to the substrate, and that can reduce or prevent condensation from forming in certain regions of the substrate (e.g., in sample wells or regions on the substrate surface).

Ninth, some embodiments described herein may provide mitigation of cross-contamination of samples and/or reagents from different locations on the substrate. For example, the described gaskets of the device can provide for discrete biological sample areas and a vapor barrier from one well to the next. Further, the gaskets can impede reagent spillage or flow from one well to the next. In some embodiments, the devices provided herein include a locking mechanism (e.g. locking tabs) that helps secure the gasket in place when the support device is in a closed position.

Tenth, some embodiments described herein may be used to support substrates within heating devices that are not designed for such substrates, ensuring that adequate and even heat transfer occurs to the substrates. Certain types of thermocyclers and heating devices are purpose-built for particular types of substrates such as multi-well substrates. Loading other types of substrates such as standard microscope slides into such devices can lead to uneven substrate heating. In particular, the support devices of the disclosure can be used to adapt thermocyclers designed to accept multi-well substrates so that other types of substrates can be effectively heated within the thermocyclers as part of a sample preparation protocol.

Eleventh, some embodiments described herein may provide uniform heating to a substrate by allowing a surface of the substrate to directly contact the surface of a heating device (e.g., a thermocycler). That is, in some embodiments, no additional substrates or housing elements are required to be positioned in between the heat source and the substrates to be heated. In addition, because the devices of the disclosure allow the surface of the substrate to directly contact the surface of a heating device (e.g., a thermocycler), the temperature of the substrate can be more easily controlled by the user and can be heated to a desired temperature in less time than when using devices that do not allow surface contact between the substrate and the heating device (e.g., a thermocycler). Thus, samples (e.g., a biological samples) on the substrate can be heated uniformly and in a controlled manner.

Twelfth, some embodiments described herein may withstand a high temperature range (e.g., ranging up to 135° C. or more). For example, the devices of the disclosure may be amenable to undergo steam sterilization in an autoclave. Thus, the devices of the disclosure may be sterilized (e.g., autoclaved) prior to and/or after use. Furthermore, a user may choose to sterilize (e.g., autoclave) a device of the disclosure and re-use the same device to process a different sample (e.g., a biological sample).

Thirteenth, some embodiments described herein may provide a substrate holder that can be in an unlocked state where the cover is placed over the base and the movable tabs rest on the non-movable tabs such the cover and the base are separated by a gap distance and a distal surface of the gasket is separated from a surface of the substrate. In some embodiments, the user can advantageously adjust the position of a gasket and/or a removable insert prior to placing the substrate holder in a releasably locked state. Thus, in some embodiments, the unlocked state of the substrate holder solves the problem of sealing off a surface area of interest on the substrate (e.g., a sample region or a surface are of the substrate where a sample is disposed on) without potentially damaging the sample on the surface of the substrate (e.g., by dislodging at least a portion of the sample from the substrate with a surface of the gasket).

Fourteenth, some embodiments described herein may provide a user the ability to adjust the position of a removable insert within an opening of a cover of a substrate holder and/or the position of a gasket within a projection of the removable insert such that the user can access an increased surface area of the substrate that is exposed within the opening of the cover (e.g., at least about 50% of the substrate area that is exposed within the opening of the cover). Thus, in some embodiments, the slideable couplings of the removable insert and the gasket provide the user greater freedom in terms of the number and placement of samples on the surface of the substrate that can be sealed off by the gasket when the substrate holder is in the releasably locked state.

Fifteenth, some embodiments described herein may provide movable tabs and non-movable tabs having at least portions of their surfaces be angled surfaces, which may facilitate engagement of the cover and the base of the substrate holder. For example, in some embodiments, the angled surfaces of the movable and non-movable tabs may allow a user to snap-fit the cover onto the base when the user chooses to place the substrate holder in a releasably locked state, thereby facilitating assembly of the substrate holder and the substrate.

In one aspect, this disclosure is directed to a support device comprising: a substrate holder comprising: a cover defining an opening; one or more removable inserts, the one or more removable inserts comprising a gasket and a projection, wherein at least a portion of the one or more removable inserts is configured to be received in the opening of the cover, the one or more removable inserts defining an insert opening; and a base configured to engage with the cover and receive a substrate.

In another aspect, this disclosure is directed to a support device comprising: a substrate holder comprising: a cover defining an opening; a first removable insert defining a first insert opening, the first removable insert comprising a first gasket and a first projection; a second removable insert defining a second insert opening, the second removable insert comprising a second gasket and a second projection; and a base configured to engage with the cover and receive a substrate, wherein at least a portion of the first removable insert and a portion of the second removable insert are configured to be received in the opening of the cover.

In another aspect, this disclosure is directed to a substrate holder comprising: a cover defining an opening; one or more removable inserts, the one or more removable inserts comprising a gasket and a projection, wherein at least a portion of the one or more removable inserts is configured to be received in the opening of the cover, the one or more removable inserts defining an insert opening; and a base configured to engage with the cover and receive a substrate.

In another aspect, this disclosure is directed to a substrate holder comprising: a cover defining an opening; a first removable insert defining a first insert opening, the first removable insert comprising a first gasket and a first projection; a second removable insert defining a second insert opening, the second removable insert comprising a second gasket and a second projection; and a base configured to engage with the cover and receive a substrate, wherein at least a portion of the first removable insert and a portion of the second removable insert are configured to be received in the opening of the cover.

In some embodiments, the cover defines a first recess. In some embodiments, the first recess defines a first recess opening configured to engage with the projection. In some embodiments, the first recess opening has an area that is larger than an area of the opening of the cover. In some embodiments, the cover comprises one or more ribs extending from a surface of the cover. In some embodiments, at least a portion of the first removable insert or the second removable insert is configured to engage with the first recess.

In some embodiments, the gasket contacts a surface of the substrate when the base is engaged with the cover. In some embodiments, the substrate holder comprises a first removable insert and a second removable insert. In some embodiments, the first insert opening has an area that is greater than an area of the second insert opening. In some embodiments, the first insert opening has an area that is about equal to an area of the second insert opening. In some embodiments, the substrate holder comprises three or more removable inserts. In some embodiments, a position of the projection is adjustable or slidable within the opening when the base is not engaged with the cover.

In some embodiments, the gasket comprises a gasket wall fixedly coupled to a surface of the removable insert. In some embodiments, the gasket comprises a flange extending from a surface of the gasket wall. In some embodiments, the removable insert comprises a second recess configured to receive the flange. In some embodiments, the flange is adjustable or slidable within the second recess. In some embodiments, the gasket is configured to form a vapor-tight seal between the gasket and the substrate when the substrate is secured by the substrate holder, and the base is engaged with the cover. In some embodiments, the gasket is configured to form a fluid-tight seal between the gasket and the substrate when the substrate is secured by the substrate holder, and the base is engaged with the cover.

In some embodiments, the substrate is a glass slide. In some embodiments, the substrate comprises a first surface and a second surface, the first surface configured for receiving a sample. In some embodiments, the second surface of the substrate rests on a portion of the base of the substrate holder. In some embodiments, the insert opening is smaller than an opening of the cover. In some embodiments, the support device further comprises the substrate. In some embodiments, the substrate comprises a biological sample. In some embodiments, the gasket is configured to be aligned with at least a portion of the biological sample.

In another aspect, this disclosure is directed to a method comprising: mounting a substrate on a base of a support device, the support device comprising: a substrate holder comprising: a cover defining an opening; one or more removable inserts comprising a gasket and a projection, wherein the one or more removable inserts is configured to be received in the opening, the one or more removable inserts defining an insert opening that is smaller than the opening; and a base configured to engage with the cover and receive the substrate; inserting the one or more removable inserts in the opening of the cover; placing the one or more inserts on a surface of the substrate while placing the cover on the base; and engaging the cover with the base to secure the substrate.

In another aspect, this disclosure is directed to a method comprising: mounting a substrate on a base of a substrate holder of a support device, the support device comprising: a substrate holder comprising: a cover defining an opening; one or more removable inserts, the one or more removable inserts comprising a gasket and a projection, the one or more removable inserts defining an insert opening that is smaller than the opening of the cover; and a base configured to engage with the cover and receive the substrate; placing the one or more removable inserts on a surface of the substrate; placing the cover over the one or more removable inserts and on the base such that at least a portion of the one or more removable inserts are received in the opening of the cover; and engaging the cover with the base to secure the substrate.

In another aspect, this disclosure is directed to a method comprising: mounting a substrate on a base of a substrate holder, the substrate holder comprising: a cover defining an opening; one or more removable inserts comprising a gasket and a projection, wherein the one or more removable inserts is configured to be received in the opening, the one or more removable inserts defining an insert opening that is smaller than the opening; and a base configured to engage with the cover and receive the substrate; inserting the one or more removable inserts in the opening of the cover; placing the one or more inserts on a surface of the substrate while placing the cover on the base; and engaging the cover with the base to secure the substrate.

In another aspect, this disclosure is directed to a method comprising: mounting a substrate on a base of a substrate holder, the substrate holder comprising: a cover defining an opening; one or more removable inserts, the one or more removable inserts comprising a gasket and a projection, the one or more removable inserts defining an insert opening that is smaller than the opening of the cover; and a base configured to engage with the cover and receive the substrate; placing the one or more removable inserts on a surface of the substrate; placing the cover over the one or more removable inserts and on the base such that at least a portion of the one or more removable inserts are received in the opening of the cover; and engaging the cover with the base to secure the substrate.

In some embodiments, the method further comprises adjusting or sliding the projection within the opening when the base is not engaged with the cover. In some embodiments, the method further comprises engaging a flange with a second recess of the one or more removable inserts, the flange extending from a surface of a gasket wall of the gasket. In some embodiments, the method further comprises adjusting or sliding a flange within the second recess. In some embodiments, the method further comprises engaging at least a portion of the removable insert with a first recess defined by the cover. In some embodiments, the method further comprises adjusting or sliding the projection within the opening when the base is not engaged with the cover.

In some embodiments, the support device further comprises a substrate. In some embodiments, the substrate comprises a biological sample. In some embodiments, the method further comprises aligning the gasket with at least a portion of the biological sample. In some embodiments, the method further comprises contacting the biological sample with a reagent.

In another aspect, this disclosure is directed to a substrate holder comprising: a base configured to receive a substrate, the base comprising non-movable tabs extending from at least two of its sidewalls; and a cover configured to mateably engage with the base, the cover defining an opening configured to receive a removable insert, the cover comprising movable tabs configured to engage with the non-movable tabs of the base, wherein each movable tab comprises first and second contacting surfaces configured to engage with a corresponding non-movable tab of the base, the first contacting surface configured to engage with the corresponding non-movable tab such that the cover and the base are engaged in an unlocked state, and wherein the second contacting surface is configured to engage with the corresponding non-movable tab such that the cover and the base are engaged in a releasably locked state.

In some embodiments, each movable tab is configured to flex to engage with the non-movable tab when the cover and the base are in the releasably locked state. In some embodiments, each movable tab is configured to flex to engage with the non-movable tab when the cover and the base are in the releasably locked state. In some embodiments, the first contacting surface of the movable tab is configured to be positioned on a surface of the corresponding non-movable tab. In some embodiments, the peripheral edges of the cover are substantially aligned with the peripheral edges of the base in the unlocked state or the releasably locked state. In some embodiments, mating surfaces of the cover and the base are separated by a gap in the unlocked state. In some embodiments, the gap is dimensionally configured to facilitate movable adjustment of the removable insert within the opening of the cover in the unlocked state. In some embodiments, the mating surfaces of the cover and the base are in direct contact in the releasably locked state. In some embodiments, the movable tab comprises a notch defined, at least in part, by the first contacting surface. In some embodiments, the first contacting surface of the non-movable tab comprises an angled surface.

In some embodiments, the base comprises a pair of guides extending from the sidewall of the base. In some embodiments, each guide is configured to contact a side surface of movable tab. In some embodiments, the removable insert comprises a gasket and a projection coupled to the gasket. In some embodiments, the gasket is configured to form a vapor-tight seal between the gasket and the substrate when the substrate is secured by the substrate holder, and the cover and the base are in the releasably locked state. In some embodiments, the gasket is configured to form a fluid-tight seal between the gasket and the substrate when the substrate is secured by the substrate holder, and the cover and the base are in the releasably locked state. In some embodiments, the substrate holder comprises a first removable insert and a second removable insert. In some embodiments, the first removable insert defines a first insert opening having an area that is greater than an area of a second insert opening defined by the second removable insert. In some embodiments, the first insert opening has an area that is about equal to an area of the second insert opening. In some embodiments, the substrate holder comprises three or more removable inserts. In some embodiments, the substrate is a glass slide. In some embodiments, the substrate comprises a biological sample. In some embodiments, the gasket is configured to be aligned with at least a portion of the biological sample. In some embodiments, the cover comprises one or more ribs extending from a surface of the cover. In some embodiments, the insert opening is smaller than the opening of the cover. In some embodiments, the first and second insert openings are smaller than the opening of the cover.

In another aspect, this disclosure is directed to a support device comprising any of the substrate holders described herein.

In another aspect, this disclosure is directed to a method comprising: mounting a substrate on a base of any of the preceding substrate holders, the substrate holder comprising: the base configured to receive a substrate, the base comprising non-movable tabs extending from at least two of its sidewalls; and a cover configured to mateably engage with the base, the cover defining an opening configured to receive a removable insert, the cover comprising movable tabs configured to engage with the non-movable tabs of the base; wherein each movable tab comprises first and second contacting surfaces configured to engage with a corresponding non-movable tab of the base, the first contacting surface configured to engage with the corresponding non-movable tab such that the cover and the base are engaged in an unlocked state, and wherein the second contacting surface is configured to engage with the corresponding non-movable tab such that the cover and the base are engaged in a releasably locked state; inserting the removable insert in the opening of the cover; engaging the first contacting surface of the movable tab with a surface of the non-movable tab while placing the cover on the base such that the cover and the base are engaged in the unlocked state; and adjusting a position of the removable insert.

In some embodiments, the method further comprises engaging the second contacting surface of the movable tab with a surface of the non-movable tab such that the cover and the base are engaged in the releasably locked state. In some embodiments, the substrate comprises a biological sample. In some embodiments, the adjusting the position of the removable insert comprises aligning the removable insert with at least a portion of the biological sample. In some embodiments, the methods further comprise engaging the second contacting surface of the movable tab with a surface of the non-movable tab such that the cover and the base are engaged in the releasably locked state. In some embodiments, the methods further comprise contacting the biological sample with a reagent. In some embodiments, each movable tab is configured to flex to engage with the non-movable tab when the cover and the base are in the releasably locked state. In some embodiments, the first contacting surface of the movable tab is configured to be positioned on a surface of the corresponding non-movable tab. In some embodiments, peripheral edges of the cover are substantially aligned with peripheral edges of the base in the unlocked state or the releasably locked state. In some embodiments, wherein mating surfaces of the cover and the base are separated by a gap in the unlocked state. In some embodiments, the gap is dimensionally configured to facilitate movable adjustment of the removable insert within the opening of the cover in the unlocked state.

In some embodiments, the mating surfaces of the cover and the base are in direct contact in the releasably locked state. In some embodiments, the movable tab comprises a notch defined, at least in part, by the first contacting surface. In some embodiments, the first contacting surface of the non-movable tab comprises an angled surface. In some embodiments, the base comprises a pair of guides extending from the sidewall of the base. In some embodiments, each guide is configured to contact a side surface of movable tab. In some embodiments, the removable insert comprises a gasket and a projection coupled to the gasket. In some embodiments, the gasket is configured to form a vapor-tight seal between the gasket and the substrate when the substrate is secured by the substrate holder, and the cover and the base are in the releasably locked state. In some embodiments, the gasket is configured to form a fluid-tight seal between the gasket and the substrate when the substrate is secured by the substrate holder, and the cover and the base are in the releasably locked state.

In some embodiments, the substrate holder comprises a first removable insert and a second removable insert. In some embodiments, the first removable insert defines a first insert opening having an area that is greater than an area of a second insert opening defined by the second removable insert. In some embodiments, the first insert opening has an area that is about equal to an area of the second insert opening. In some embodiments, the substrate holder comprises three or more removable inserts. In some embodiments, the substrate is a glass slide. In some embodiments, the substrate comprises a biological sample. In some embodiments, the gasket is configured to be aligned with at least a portion of the biological sample. In some embodiments, the cover comprises one or more ribs extending from a surface of the cover. In some embodiments, the insert opening is smaller than the opening of the cover.

In another aspect, this disclosure is directed to a substrate holder comprising: a base configured to receive a substrate; a cover configured to mateably engage with the base, the cover defining an opening formed by inner sidewalls; and a removable insert defining a surface, the removable insert being configured to be received within the opening of the cover, the removable insert comprising: a gasket; a projection coupled to the gasket; and at least two insert tabs extending from opposite sides of the removable insert, each insert tab being configured to engage with at least one of the inner sidewalls forming the opening of the cover.

In some embodiments, each insert tab extends the surface of the removable insert along a same planar direction. In some embodiments, the insert tab is configured to engage with the inner sidewalls of the cover such that the surface of the removable insert becomes substantially flush with the face of the cover. In some embodiments, the at least one of the inner sidewalls of the cover is sloped. In some embodiments, the insert tab comprises a sloped surface configured to engage with the at least one of the inner sidewalls of the cover. In some embodiments, the sloped surface is defined by an angle that is complementary to an angle of the sloped inner sidewall of the cover. In some embodiments, the removable insert is configured to snap-fit within the opening of the cover. In some embodiments, the removable insert comprises three insert tabs. In some embodiments, the gasket comprises a gasket wall coupled to the removable insert. In some embodiments, the gasket comprises a flange extending from a surface of the gasket wall. In some embodiments, the projection of the removable insert comprises a recess configured to receive the flange. In some embodiments, the flange is adjustable or slidable within the recess. In some embodiments, the projection of the removable insert comprises at least one holding tab configured to engage with the flange. In some embodiments, a position of the projection is adjustable or slidable within the opening when the base is not engaged with the cover.

In some embodiments, the base comprises non-movable tabs extending from at least two of its sidewalls, wherein the cover comprises movable tabs configured to engage with the non-movable tabs of the base, and wherein each movable tab comprises first and second contacting surfaces configured to engage with a corresponding non-movable tab of the base, the first contacting surface configured to engage with the corresponding non-movable tab such that the cover and the base are engaged in an unlocked state, and wherein the second contacting surface is configured to engage with the corresponding non-movable tab such that the cover and the base are engaged in a releasably locked state.

In yet another aspect, this disclosure is directed to a method comprising: mounting a cover on a base of any of the preceding substrate holders, the substrate holder comprising: a base configured to receive a substrate; a cover configured to mateably engage with the base, the cover defining an opening formed by inner sidewalls; and a removable insert defining a surface, the removable insert being configured to be received within the opening of the cover, the removable insert comprising: a gasket; a projection coupled to the gasket; and at least two insert tabs extending from opposite sides of the removable insert, each insert tab being configured to engage with at least one of the inner sidewalls forming the opening of the cover; and inserting the removable insert in the opening of the cover.

In some embodiments, the methods further comprises adjusting a position of the removable insert after engaging the at least one of the at least two insert tabs with the at least one of the inner sidewalls of the opening the cover. In some embodiments, inserting the removable insert comprises engaging the at least one of the at least two insert tabs with the at least one of the inner sidewalls of the opening the cover. In some embodiments, inserting the removable insert comprises snap-fitting the removable insert into the opening of the cover. In some embodiments, the substrate holder further comprises a substrate. In some embodiments, the substrate comprises a biological sample. In some embodiments, the method further comprises aligning the removable insert with at least a portion of the biological sample. In some embodiments, the method further comprises contacting the biological sample with a reagent.

In some embodiments, each insert tab extends the surface of the removable insert along a same planar direction. In some embodiments, the insert tab is configured to engage with the inner sidewalls of the cover such that the surface of the removable insert becomes substantially flush with a face of the cover. In some embodiments, the at least one of the inner sidewalls of the cover is sloped. In some embodiments, the insert tab comprises a sloped surface configured to engage with the at least one of the inner sidewalls of the cover. In some embodiments, the sloped surface is defined by an angle that is complementary to an angle of the sloped inner sidewall of the cover. In some embodiments, the removable insert is configured to snap-fit within the opening of the cover. In some embodiments, the removable insert comprises three insert tabs. In some embodiments, the gasket comprises a gasket wall coupled to the removable insert. In some embodiments, the gasket comprises a flange extending from a surface of the gasket wall. In some embodiments, the projection of the removable insert comprises a recess configured to receive the flange. In some embodiments, the flange is adjustable or slidable within the recess. In some embodiments, the projection of the removable insert comprises at least one holding tab configured to engage with the flange. In some embodiments, a position of the projection is adjustable or slidable within the opening when the base is not engaged with the cover. In some embodiments, the base comprises non-movable tabs extending from at least two of its sidewalls, wherein the cover comprises movable tabs configured to engage with the non-movable tabs of the base, and wherein each movable tab comprises first and second contacting surfaces configured to engage with a corresponding non-movable tab of the base, the first contacting surface configured to engage with the corresponding non-movable tab such that the cover and the base are engaged in an unlocked state, and wherein the second contacting surface is configured to engage with the corresponding non-movable tab such that the cover and the base are engaged in a releasably locked state.

In an aspect, the present disclosure includes kits comprising any of the substrate holders of the disclosure, and instructions for performing any method disclosed herein.

In some embodiments, the kits further comprise one or more assay reagents. In some embodiments, the one or more assay reagents comprise one or more of sodium dodecyl sulfate (SDS), proteinase K, pepsin, N-lauroylsarcosine, RNAse, and a sodium salt thereof. In some embodiments, the kits further comprise a plate having a first surface and a second surface, the first surface including one or more platforms configured to receive the substrate holder, and the second surface configured to be received by a heating device. In some embodiments, the plate is composed of a metal. In some embodiments, further comprise a magnetic separator.

In an aspect, the present disclosure includes systems comprising: a) any of the substrate holders disclosed herein, and b) a substrate comprising a biological sample. In some embodiments, the systems further comprise one or more assay reagents. In some embodiments, the one or more assay reagents comprise one or more of sodium dodecyl sulfate (SDS), proteinase K, pepsin, N-lauroylsarcosine, RNAse, and a sodium salt thereof. In some embodiments, the systems further comprise a heating device. In some embodiments, the systems further comprise a plate having a first surface and a second surface, the first surface including one or more platforms configured to receive the substrate holder, and the second surface configured to be received by the heating device. In some embodiments, the plate is composed of a metal. In some embodiments, further comprise a magnetic separator.

All publications, patents, patent applications, and information available on the internet and mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

Where values are described in terms of ranges, it should be understood that the description includes the disclosure of all possible sub-ranges within such ranges, as well as specific numerical values that fall within such ranges irrespective of whether a specific numerical value or specific sub-range is expressly stated.

The term "each," when used in reference to a collection of items, is intended to identify an individual item in the collection but does not necessarily refer to every item in the collection, unless expressly stated otherwise, or unless the context of the usage clearly indicates otherwise.

Various embodiments of the features of this disclosure are described herein. However, it should be understood that such embodiments are provided merely by way of example, and numerous variations, changes, and substitutions can occur to those skilled in the art without departing from the scope of this disclosure. It should also be understood that various alternatives to the specific embodiments described herein are also within the scope of this disclosure.

DESCRIPTION OF DRAWINGS

The following drawings illustrate certain embodiments of the features and advantages of this disclosure. These embodiments are not intended to limit the scope of the appended claims in any manner. Like reference symbols in the drawings indicate like elements.

DETAILED DESCRIPTION

I. Introduction

Figures 1A, 1B:
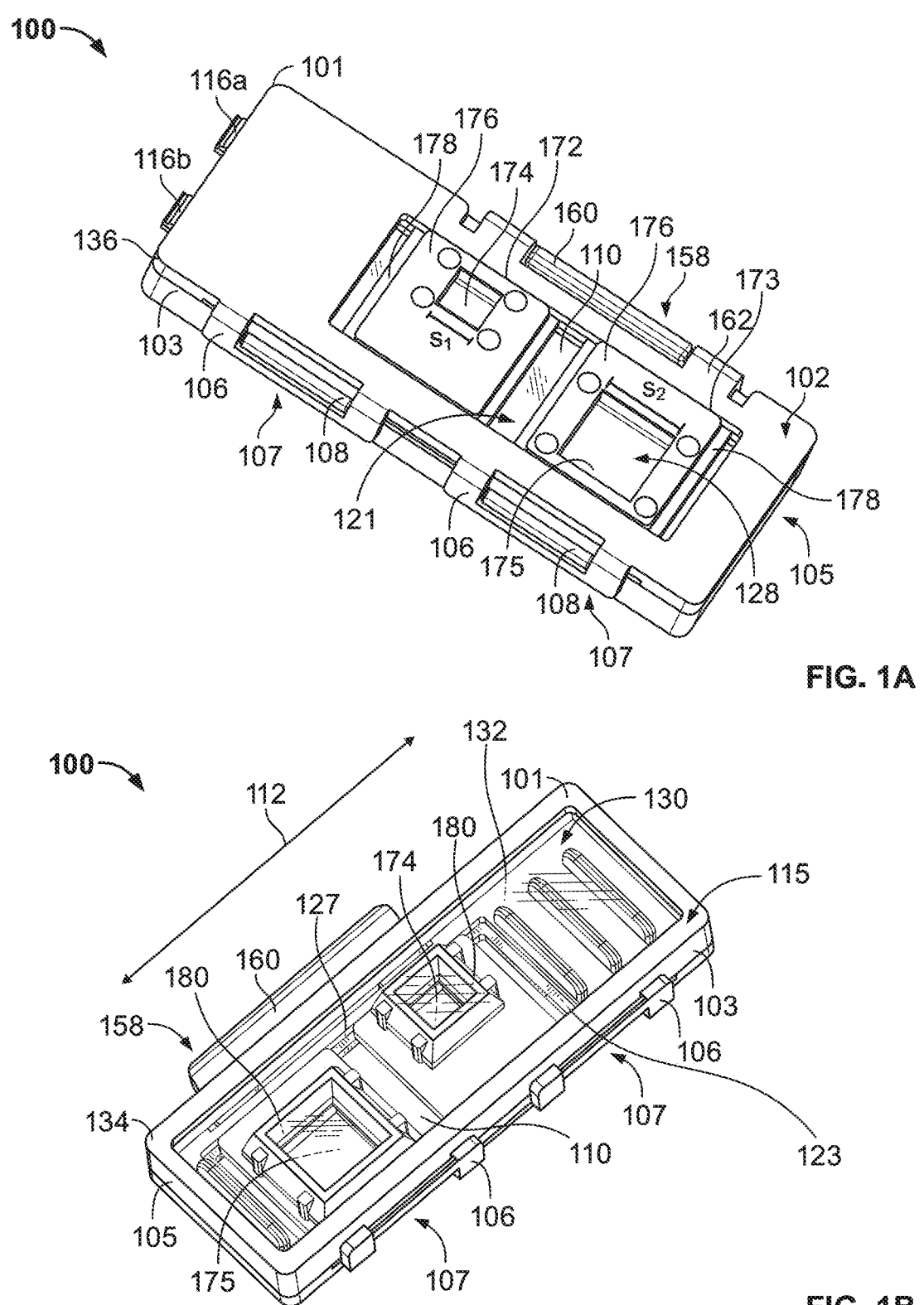
FIG. 1A is a top perspective view of an example support device in a closed position.
FIG. 1B is a bottom perspective view of the support device of FIG. 1A.

This disclosure describes devices and methods for spatial analysis of biological samples. This section describes certain general terminology, analytes, sample types, and preparative steps that are referred to in later sections of the disclosure.

1. Spatial Analysis

Tissues and cells can be obtained from any source. For example, tissues and cells can be obtained from single-cell or multicellular organisms (e.g., a mammal). Tissues and cells obtained from a mammal, e.g., a human, often have varied analyte levels (e.g., gene and/or protein expression) which can result in differences in cell morphology and/or function. The position of a cell or a subset of cells (e.g., neighboring cells and/or non-neighboring cells) within a tissue can affect, e.g., the cell's fate, behavior, morphology, and signaling and crosstalk with other cells in the tissue. Information regarding the differences in analyte levels (gene and/or protein expression) within different cells in a tissue of a mammal can also help physicians select or administer a treatment that will be effective and can allow researchers to identify and elucidate differences in cell morphology and/or cell function in the single-cell or multicellular organisms (e.g., a mammal) based on the detected differences in analyte levels within different cells in the tissue. Differences in analyte levels within different cells in a tissue of a mammal can also provide information on how tissues (e.g., healthy and diseased tissues) function and/or develop. Differences in analyte levels within different cells in a tissue of a mammal can also provide information of different mechanisms of disease pathogenesis in a tissue and mechanism of action of a therapeutic treatment within a tissue. Differences in analyte levels within different cells in a tissue of a mammal can also provide information on drug resistance mechanisms and the development of the same in a tissue of a mammal. Differences in the presence or absence of analytes within different cells in a tissue of a multicellular organism (e.g., a mammal) can provide information on drug resistance mechanisms and the development of the same in a tissue of a multicellular organism.

The support devices provided herein can be used with spatial analysis methodologies that provide a vast amount of analyte level and/or expression data for a variety of multiple analytes within a sample at high spatial resolution, e.g., while retaining the native spatial context. Spatial analysis methods include, e.g., the use of a capture probe including a spatial barcode (e.g., a nucleic acid sequence that provides information as to the position of the capture probe within a cell or a tissue sample (e.g., mammalian cell or a mammalian tissue sample) and a capture domain that is capable of binding to an analyte (e.g., a protein and/or nucleic acid) produced by and/or present in a cell.

The binding of an analyte to a capture probe can be detected using a number of different methods, e.g., nucleic acid sequencing, fluorophore detection, nucleic acid amplification, detection of nucleic acid ligation, and/or detection of nucleic acid cleavage products. In some examples, the detection is used to associate a specific spatial barcode with a specific analyte produced by and/or present in a cell (e.g., a mammalian cell).

Capture probes can be, e.g., attached to a surface, e.g., a solid array, a bead, or a coverslip. In some examples, capture probes are not attached to a surface. In some examples, capture probes can be encapsulated within, embedded within, or layered on a surface of a permeable composition (e.g., any of the substrates described herein). For example, capture probes can be encapsulated or disposed within a permeable bead (e.g., a gel bead). In some examples, capture probes can be encapsulated within, embedded within, or layered on a surface of a substrate (e.g., any of the example substrates described herein, such as a hydrogel or a porous membrane).

In some examples, a cell or a tissue sample including a cell are contacted with capture probes attached to a substrate (e.g., a surface of a substrate), and the cell or tissue sample is permeabilized to allow analytes to be released from the cell and bind to the capture probes attached to the substrate. In some examples, analytes released from a cell can be actively directed to the capture probes attached to a substrate using a variety of methods, e.g., electrophoresis, chemical gradient, pressure gradient, fluid flow, or magnetic field.

Non-limiting aspects of support devices are described in PCT/US2019/065100, the entire contents of which are incorporated herein by reference and can be used herein in any combination. Further non-limiting aspects of support devices are described herein.

(a) General Terminology (i) Biological Samples

The devices and methods described in this disclosure can be used to support substrates configured to receive on or more biological samples. As used herein, "biological sample" is a sample that can be obtained from a subject for analysis using any of a variety of techniques including, but not limited to, biopsy, surgery, and laser capture microscopy (LCM), and generally includes cells and/or other biological material from the subject. In addition to the subjects described below, a biological sample can be obtained from non-mammalian organisms (e.g., a plant, an insect, an arachnid, a nematode (e.g., *Caenorhabditis elegans*), a fungus, an amphibian, or a fish (e.g., zebrafish)). A biological sample can be obtained from a prokaryote such as a bacterium, e.g., *Escherichia coli*, Staphylococci or *Mycoplasma pneumoniae*; an archaeon; a virus such as Hepatitis C virus or human immunodeficiency virus; or a viroid. A biological sample can be obtained from a eukaryote, such as a patient derived organoid (PDO) or patient derived xenograft (PDX). The biological sample can include organoids, a miniaturized and simplified version of an organ produced in vitro in three dimensions that shows realistic micro-anatomy. Organoids can be generated from one or more cells from a tissue, embryonic stem cells, and/or induced pluripotent stem cells, which can self-organize in three-dimensional culture owing to their self-renewal and differentiation capacities. In some embodiments, an organoid is a cerebral organoid, an intestinal organoid, a stomach organoid, a lingual organoid, a thyroid organoid, a thymic organoid, a testicular organoid, a hepatic organoid, a pancreatic organoid, an epithelial organoid, a lung organoid, a kidney organoid, a gastruloid, a cardiac organoid, or a retinal organoid. Subjects from which biological samples can be obtained can be healthy or asymptomatic individuals, individuals that have or are suspected of having a disease (e.g., cancer) or a pre-disposition to a disease, and/or individuals that are in need of therapy or suspected of needing therapy.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells.

Biological samples can also include fetal cells. For example, a procedure such as amniocentesis can be performed to obtain a fetal cell sample from maternal circulation. Sequencing of fetal cells can be used to identify any of a number of genetic disorders, including, e.g., aneuploidy such as Down's syndrome, Edwards syndrome, and Patau syndrome. Further, cell surface features of fetal cells can be used to identify any of a number of disorders or diseases.

Biological samples can also include immune cells. Sequence analysis of the immune repertoire of such cells, including genomic, proteomic, and cell surface features, can provide a wealth of information to facilitate an understanding the status and function of the immune system. By way of example, determining the status (e.g., negative or positive) of minimal residue disease (MRD) in a multiple myeloma (MM) patient following autologous stem cell transplantation is considered a predictor of MRD in the MM patient (see, e.g., U.S. Patent Application Publication No. 2018/0156784, the entire contents of which are incorporated herein by reference).

Examples of immune cells in a biological sample include, but are not limited to, B cells, T cells (e.g., cytotoxic T cells, natural killer T cells, regulatory T cells, and T helper cells), natural killer cells, cytokine induced killer (CIK) cells, myeloid cells, such as granulocytes (basophil granulocytes, eosinophil granulocytes, neutrophil granulocytes/hypersegmented neutrophils), monocytes/macrophages, mast cells, thrombocytes/megakaryocytes, and dendritic cells.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a liquid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

Cell-free biological samples can include extracellular polynucleotides. Extracellular polynucleotides can be isolated from a bodily sample, e.g., blood, plasma, serum, urine, saliva, mucosal excretions, sputum, stool, and tears. A biological sample can include a single analyte of interest, or more than one analyte of interest.

(ii) Subject

As used herein, the term "subject" is an animal, such as a mammal (e.g., human or a non-human simian), or avian (e.g., bird), or other organism, such as a plant. Examples of subjects include, but are not limited to, a mammal such as a rodent, mouse, rat, rabbit, guinea pig, ungulate, horse, sheep, pig, goat, cow, cat, dog, primate (i.e. human or non-human primate); a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, or honey bee; an arachnid such as a spider; a fish such as zebrafish; a reptile; an amphibian such as a frog or *Xenopus laevis; a Dictyostelium discoideum*; a fungi such as *Pneumocystis carinii, Takifugu*

*rubripes*, yeast, *Saccharamoyces cerevisiae* or *Schizosaccharomyces pombe*; or a *Plasmodium falciparum*.

(iii) Substrate Attachment

In some embodiments, the biological sample can be attached to a substrate. Examples of substrates suitable for this purpose are described in detail below. Attachment of the biological sample can be irreversible or reversible, depending upon the nature of the sample and subsequent steps in the analytical method.

In certain embodiments, the sample can be attached to the substrate reversibly by applying a suitable polymer coating to the substrate and contacting the sample to the polymer coating. The sample can then be detached from the substrate using an organic solvent that at least partially dissolves the polymer coating. Hydrogels are examples of polymers that are suitable for this purpose.

More generally, in some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

(iv) Substrates

For analytical methods using a substrate (e.g., spatial array-based analytical methods), the substrate functions as a support for direct or indirect attachment of capture probes to features of the array. In addition, in some embodiments, a substrate (e.g., the same substrate or a different substrate) can be used to provide support to a biological sample, particularly, for example, a thin tissue section. Accordingly, as used herein, a "substrate" is a support that is insoluble in aqueous liquid and which allows for positioning of biological samples, analytes, features, and/or capture probes on the substrate.

Further, a "substrate" as used herein, and when not preceded by the modifier "chemical," refers to a member with at least one surface that generally functions to provide physical support for biological samples, analytes, and/or any of the other chemical and/or physical moieties, agents, and structures that can be used with various analytical methods. Substrates can be formed from a variety of solid materials, gel-based materials, colloidal materials, semi-solid materials (e.g., materials that are at least partially cross-linked), materials that are fully or partially cured, and materials that undergo a phase change or transition to provide physical support. Examples of substrates that can be used in the methods and devices described herein include, but are not limited to, slides (e.g., slides formed from various glasses, slides formed from various polymers), hydrogels, layers and/or films, membranes (e.g., porous membranes), wafers, plates, or combinations thereof. In some embodiments, substrates can optionally include functional elements such as recesses, protruding structures, microfluidic elements (e.g., channels, reservoirs, electrodes, valves, seals), and various markings, as will be discussed in further detail below.

1) Substrate Attributes

A substrate can generally have any suitable form or format that can be accommodated by the device disclosed herein. For example, a substrate can be flat, curved, e.g., convexly or concavely curved towards the area where the interaction between a biological sample, e.g., tissue sample, and a substrate takes place. In some embodiments, a substrate is flat, e.g., planar, chip, or slide. A substrate can contain one or more patterned surfaces within the substrate (e.g., channels, wells, projections, ridges, divots, etc.).

A substrate can be of any desired shape. For example, a substrate can be typically a thin, flat shape (e.g., a square or a rectangle). In some embodiments, a substrate structure has rounded corners (e.g., for increased safety or robustness). In some embodiments, a substrate structure has one or more cut-off corners (e.g., for use with a slide clamp or cross-table). In some embodiments, where a substrate structure is flat, the substrate structure can be any appropriate type of support having a flat surface (e.g., a chip or a slide such as a microscope slide).

Substrates can optionally include various structures such as, but not limited to, projections, ridges, and channels. A substrate can be micropatterned to limit lateral diffusion (e.g., to prevent overlap of spatial barcodes). A substrate modified with such structures can be modified to allow association of analytes, features (e.g., beads), or probes at individual sites. For example, the sites where a substrate is modified with various structures can be contiguous (e.g., the sites can be located within an area of the substrate that is enclosed by one of the gasket openings when the device is in a closed position) or non-contiguous with other sites (e.g., a first site can be located within a first area of the substrate that is enclosed by a first gasket opening and a second site can be located within a second area of the substrate that is enclosed by a second gasket opening when the support device is in a closed position).

In some embodiments, the surface of a substrate can be modified so that discrete sites are formed that can only have or accommodate a single feature. In some embodiments, the surface of a substrate can be modified so that features adhere to random sites (e.g., random sites within an area of the substrate that is enclosed by a gasket opening when the support device is in a closed position).

In some embodiments, the surface of a substrate is modified to contain one or more wells, using techniques such as (but not limited to) stamping, microetching, or molding techniques. In some embodiments in which a substrate includes one or more wells, the substrate can be a concavity slide or cavity slide. For example, wells can be formed by one or more shallow depressions on the surface of the substrate. In some embodiments, where a substrate includes one or more wells, the wells can be formed by attaching a cassette (e.g., a cassette containing one or more chambers) to a surface of the substrate structure.

In some embodiments, the structures of a substrate (e.g., wells or features) can each bear a different capture probe. Different capture probes attached to each structure can be identified according to the locations of the structures in or on the surface of the substrate. Example substrates include arrays in which separate structures are located on the substrate including, for example, those having wells that accommodate features.

In some embodiments where the substrate is modified to contain one or more structures, including but not limited to, wells, projections, ridges, features, or markings, the structures can include physically altered sites. For example, a substrate modified with various structures can include physical properties, including, but not limited to, physical configurations, magnetic or compressive forces, chemically functionalized sites, chemically altered sites, and/or electrostatically altered sites. In some embodiments where the substrate is modified to contain various structures, including but not limited to wells, projections, ridges, features, or markings, the structures are applied in a pattern. Alternatively, the structures can be randomly distributed.

The substrate (e.g., or a bead or a feature on an array) can include tens to hundreds of thousands or millions of individual oligonucleotide molecules (e.g., at least about 10,000, 50,000, 100,000, 500,000, 1,000,000, 10,000,000, 100,000,000, 1,000,000,000, or 10,000,000,000 oligonucleotide molecules).

In some embodiments, a substrate includes one or more markings on a surface of a substrate, e.g., to provide guidance for correlating spatial information with the characterization of the analyte of interest. For example, a substrate can be marked with a grid of lines (e.g., to allow the size of objects seen under magnification to be easily estimated and/or to provide reference areas for counting objects). In some embodiments, fiducial markers can be included on a substrate. Such markings can be made using techniques including, but not limited to, printing, sandblasting, and depositing on the surface.

A wide variety of different substrates can be used for the foregoing purposes. In general, a substrate can be any suitable support material that can be accommodated by the disclosed device. Example substrates include, but are not limited to, glass, modified and/or functionalized glass, hydrogels, films, membranes, plastics (including e.g., acrylics, polystyrene, copolymers of styrene and other materials, polypropylene, polyethylene, polybutylene, polyurethanes, Teflon™, cyclic olefins, polyimides etc.), nylon, ceramics, resins, Zeonor, silica or silica-based materials including silicon and modified silicon, carbon, metals, inorganic glasses, optical fiber bundles, and polymers, such as polystyrene, cyclic olefin copolymers (COCs), cyclic olefin polymers (COPs), polypropylene, polyethylene polycarbonate, or combinations thereof.

Among the examples of substrate materials discussed above, polystyrene is a hydrophobic material suitable for binding negatively charged macromolecules because it normally contains few hydrophilic groups. For nucleic acids immobilized on glass slides, by increasing the hydrophobicity of the glass surface the nucleic acid immobilization can be increased. Such an enhancement can permit a relatively more densely packed formation (e.g., provide improved specificity and resolution).

2) Conductive Substrates

In some embodiments, the substrate can be a conductive substrate. Conductive substrates (e.g., electrophoretic compatible arrays) generated as described herein can be used in the spatial detection of analytes.

In some embodiments, a conductive substrate can include glass (e.g., a glass slide) that has been coated with a substance or otherwise modified to confer conductive properties to the glass. In some embodiments, a glass slide can be coated with a conductive coating. In some embodiments, a conductive coating includes tin oxide (TO) or indium tin oxide (ITO). In some embodiments, a conductive coating includes a transparent conductive oxide (TCO). In some embodiments, a conductive coating includes aluminum doped zinc oxide (AZO). In some embodiments, a conductive coating includes fluorine doped tin oxide (FTO).

In some embodiments, arrays that are spotted or printed with oligonucleotides (e.g., capture probes) can be generated on a conductive substrate (e.g., any of the conductive substrates described herein). For example, the arrays described herein can be compatible with active analyte capture methods (e.g., including without limitation, electrophoretic capture methods). In some embodiments, a conductive substrate is a porous medium. Non-limiting examples of porous media that can be used in methods that employ active analyte capture include a nitrocellulose or nylon membrane. In some embodiments, a porous medium that can be used in methods described herein that employ active analyte capture includes paper. In some embodiments, the oligonucleotides can be printed on a paper substrate. In some embodiments, the printed oligonucleotides can interact with the substrate (e.g., interact with fibers of the paper). In some embodiments, printed oligonucleotides can covalently bind the substrate (e.g., to fibers of the paper). In some embodiments, oligonucleotides in a molecular precursor solution can be printed on a conductive substrate (e.g., paper). In some embodiments, a molecular precursor solution can polymerize, thereby generating gel pads on the conductive substrate (e.g., paper). In some embodiments, a molecular precursor solution can be polymerized by light (e.g., photocured). In some embodiments, gel beads containing oligonucleotides (e.g., barcoded oligonucleotides such as capture probes) can be printed on a conductive substrate (e.g., paper). In some embodiments, the printed oligonucleotides can be covalently attached into the gel matrix.

3) Coatings

In some embodiments, a surface of a substrate can be coated with a cell-permissive coating to allow adherence of live cells. A "cell-permissive coating" is a coating that allows or helps cells to maintain cell viability (e.g., remain viable) on the substrate. For example, a cell-permissive coating can enhance cell attachment, cell growth, and/or cell differentiation, e.g., a cell-permissive coating can provide nutrients to the live cells. A cell-permissive coating can include a biological material and/or a synthetic material. Non-limiting examples of a cell-permissive coating include coatings that feature one or more extracellular matrix (ECM) components (e.g., proteoglycans and fibrous proteins such as collagen, elastin, fibronectin and laminin), poly-lysine, poly (L)-ornithine, and/or a biocompatible silicone (e.g., CYTOSOFT®). For example, a cell-permissive coating that includes one or more extracellular matrix components can include collagen Type I, collagen Type II, collagen Type IV, elastin, fibronectin, laminin, and/or vitronectin. In some embodiments, the cell-permissive coating includes a solubilized basement membrane preparation extracted from the Engelbreth-Holm-Swarm (EHS) mouse sarcoma (e.g., MATRIGEL®). In some embodiments, the cell-permissive coating includes collagen. A cell-permissive coating can be used to culture adherent cells on a spatially-barcoded array, or to maintain cell viability of a tissue sample or section while in contact with a spatially-barcoded array.

In some embodiments, a substrate is coated with a surface treatment such as poly(L)-lysine. Additionally or alternatively, the substrate can be treated by silanation, e.g., with epoxy-silane, amino-silane, and/or by a treatment with poly-acrylamide.

In some embodiments, a substrate is treated in order to minimize or reduce non-specific analyte hybridization within or between features. For example, treatment can include coating the substrate with a hydrogel, film, and/or membrane that creates a physical barrier to non-specific hybridization. Any suitable hydrogel can be used. For example, hydrogel matrices prepared according to the methods set forth in U.S. Pat. Nos. 6,391,937, 9,512,422, and 9,889,422, and U.S. Patent Application Publication Nos. U.S. 2017/0253918 and U.S. 2018/0052081, can be used. The entire contents of each of the foregoing documents is incorporated herein by reference.

Treatment can include adding a functional group that is reactive or capable of being activated such that it becomes reactive after application of a stimulus (e.g., photoreactive functional groups). Treatment can include treating with polymers having one or more physical properties (e.g., mechanical, electrical, magnetic, and/or thermal) that minimize non-specific binding (e.g., that activate a substrate at certain locations to allow analyte hybridization at those locations).

A "removable coating" is a coating that can be removed from the surface of a substrate upon application of a releasing agent. In some embodiments, a removable coating includes a hydrogel as described herein, e.g., a hydrogel including a polypeptide-based material. Non-limiting examples of a hydrogel featuring a polypeptide-based material include a synthetic peptide-based material featuring a combination of spider silk and a trans-membrane segment of human muscle L-type calcium channel (e.g., PEPGEL®), an amphiphilic 16 residue peptide containing a repeating arginine-alanine-aspartate-alanine sequence (RADARADARA-DARADA, SEQ ID NO: 1) (e.g., PURAMATRIX®), EAK16 (AEAEAKAKAEAEAKAK, SEQ ID NO: 2), KLD12 (KLDLKLDLKLDL, SEQ ID NO: 3), and PGMA-TRIX™.

In some embodiments, the hydrogel in the removable coating is a stimulus-responsive hydrogel. A stimulus-responsive hydrogel can undergo a gel-to-solution and/or gel-to-solid transition upon application of one or more external triggers (e.g., a releasing agent). See, e.g., Willner, *Acc. Chem. Res.* 50:657-658, 2017, which is incorporated herein by reference in its entirety. Non-limiting examples of a stimulus-responsive hydrogel include a thermo-responsive hydrogel, a pH-responsive hydrogel, a light-responsive hydrogel, a redox-responsive hydrogel, an analyte-responsive hydrogel, or a combination thereof. In some embodiments, a stimulus-responsive hydrogel can be a multi-stimuli-responsive hydrogel.

A "releasing agent" or "external trigger" is an agent that allows for the removal of a removable coating from a substrate when the releasing agent is applied to the removable coating. An external trigger or releasing agent can include physical triggers such as thermal, magnetic, ultrasonic, electrochemical, and/or light stimuli as well as chemical triggers such as pH, redox reactions, supramolecular complexes, and/or biocatalytically driven reactions. See e.g., Echeverria, et al., *Gels* (2018), 4, 54; doi:10.3390/gels4020054, which is incorporated herein by reference in its entirety. The type of "releasing agent" or "external trigger" can depend on the type of removable coating. For example, a removable coating featuring a redox-responsive hydrogel can be removed upon application of a releasing agent that includes a reducing agent such as dithiothreitol (DTT). As another example, a pH-responsive hydrogel can be removed upon the application of a releasing agent that changes the pH. In some embodiments, the biological sample can be confined to a specific region or area. For example, a biological sample can be affixed to a glass slide and a chamber, gasket, or cage positioned over the biological sample to act as a containment region or frame within which the biological sample is deposited.

(v) Capture Probes

A "capture probe" refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe includes a barcode (e.g., a spatial barcode and/or a unique molecular identifier (UMI)) and a capture domain). In some embodiments, a capture probe can include a cleavage domain and/or a functional domain (e.g., a primer-binding site, such as for next-generation sequencing (NGS)).

2. Additional Support Device Embodiments

In some embodiments, a support device can be part of a system (e.g., a system 3102, as described in PCT/US2019/

065100, the entire contents of which are incorporated herein by reference) for heating a substrate that can further include a plate. The plate can be configured to be received by a heating device (e.g., a thermocycler) and provide heat transfer between the heating device and the support device. The support device (e.g., a substrate holder 3150, as described in PCT/US2019/065100) can hold one or more substrates (such as one or more glass slides) and can removably couple to the plate to facilitate heat transfer from the plate to the one or more substrates. The support device can include a bottom member and a top member. In some embodiments, the substrate device can further include a slide. In some embodiments, the support device can include a gasket that is positioned inside the support device. In some embodiments, the support device can include an engagement mechanism (e.g., screws) for coupling the bottom member and the top member.

In some embodiments, the support device can be a single-piece component (e.g., substrate holder 4400, as described in PCT/US2019/065100) that receives a gasket and a substrate. In some embodiments, the support device can include one or more fasteners (such as a side mounted press latch 4410, as described in PCT/US2019/065100) for snap engagement of a substrate. In some embodiments, the support device can further include one or more tabs (e.g., first tab 4412a and second tab 4412b, as described in PCT/US2019/065100) that are configured to engage the substrate. The support device can include a bottom surface defining a plurality of apertures that are configured to align with a plurality of apertures of a gasket.

In some embodiments, the support device can include a top component and a bottom component that are connected via one or more hinges (e.g., hinge 7360, as described in PCT/US2019/065100) extending from a side wall of the bottom component. The support device can further include one or more engagement features protruding from a side wall of the top component (e.g., first notch 7358a and second notch 7358b, as described in PCT/US2019/06510), which are configured to engage one or more tabs protruding from a side wall of the bottom component, thereby enabling closure of the support device.

II. Support Devices

Referring generally to FIGS. 1A-9D, an embodiment of an example support device can include a substrate (e.g., a glass slide) and a substrate holder. The substrate holder can include a cover, a base, and an insert including a gasket. In some embodiments, the insert is a removable, adjustable insert that is configured to be received by an opening defined by the cover. In some embodiments, the insert includes a gasket and a projection (can also be referred to as a support, a frame, etc.). In some embodiments, the gasket is configured to contact a surface (e.g., first surface) of the substrate. In some embodiments, a position of the insert can be adjusted and/or slid within the opening of the cover and on the surface of the substrate. The support devices disclosed herein may provide versatility in terms of the number, position, and size of a sample (positioned on a substrate) that can be accommodated by the support device by providing adjustable and/or slidable inserts. In some embodiments, the gasket of the insert can be readily aligned with at least a portion of a sample on the substrate by adjusting the insert.

In some embodiments, the cover and the base are detachably connected by one or more breakable hinges. In some embodiments, the substrate holder is manufactured using injection molding techniques. In some embodiments, the insert is manufactured using injection molding techniques. Non-limiting materials used to manufacture the support devices of the disclosure include polypropylene homopolymers. In some embodiments, the substrate holder is disposable. In some embodiments, the substrate holder is reusable. For example, in some embodiments, the substrate holder may be washed, sanitized (e.g., autoclaved), and/or disinfected prior to being reused.

In some embodiments, the substrate holder receives a substrate, such as a slide, for example a glass slide. In some embodiments, the substrate holder includes an attachment mechanism to couple and/or secure the substrate to the substrate holder. The cover can include one or more ribs extending substantially upwards from a surface of the cover. Furthermore, the base can be configured to receive a substrate.

In some examples, the support device can further include at least one pair of locking tabs where each locking tab includes a movable tab that is coupled to a first side wall of the cover and a non-movable tab coupled to a first side wall of the base. In other examples, each locking tab includes a movable tab that is coupled to a first side wall of the base and a non-movable tab is coupled to a first side wall of the cover. The movable tab can be configured to engage with the non-movable tab to releasably secure the cover to the base. In some embodiments, a first locking tab of the pair of locking tabs has a length that is greater than the length of a second locking tab of the pair of locking tabs.

In some examples, the cover and the base are detachably connected by at least one hinge. In some embodiments, the hinge can be a breakable hinge. In some embodiments, the cover and the base are pivotably connected together by two or more hinges. In some embodiments, at least one hinge extends from a second side wall of the cover to a second side wall of the base. For example, when the substrate holder is in a closed position, the cover can be configured to engage with the base to secure the substrate and insert including the gasket between the cover and the base. In some embodiments, the cover and the base are unconnected or detached. In some embodiments, the cover and the base are initially connected and subsequently disconnected by breakage of one or more breakable hinges.

Moreover, the support device can include a substrate (e.g., a glass slide) that is configured to receive a sample. In some embodiments, the sample can be a biological sample. In some embodiments, the sample can be any of the biological samples defined elsewhere in the disclosure. The substrate includes a first surface and a second surface. In some examples, at least one surface of the substrate is configured to receive a sample. In some embodiments, the substrate includes one or more sample regions receiving the sample. In some examples, the sample region receives one or more samples. In some embodiments, a sample region is marked with indicia that provides a visual marker identifying the sample location on the substrate (e.g., see 664 of FIG. 6).

FIGS. 1A and 1B show an example support device 100 in a closed position. Support device 100 includes a substrate holder 101 and a substrate 110. In particular, FIG. 1 shows the substrate holder 101 having a base 134 and a cover 136. The cover 136 defines a cover opening 121. The cover opening 121 can permit access to a sample region of the substrate (e.g., a tissue slide) when the support device is in a closed position. In some embodiments, the cover opening 121 can provide a user with access to the substrate (e.g., a sample region on the substrate) to view a sample on the sample region and/or deliver a solution directly onto the sample on the sample region or onto a surface of the substrate, for example, when the support device is in a closed position. In some embodiments, the cover opening 121 can be defined such that cover opening 121 overlaps, at least partially, with a base opening (e.g., see base opening 220 in FIG. 2) when cover 136 is positioned over base 134 (e.g., when support device 100 is in a closed position).

The base is dimensioned to receive a substrate (e.g., a slide). In some embodiments, the base 134 and cover 136 are sized and shaped to accommodate any suitable substrate and/or insert. For example, in some embodiments, the base 134 and cover 136 can have a rectangular, circular, squared, triangular, or any other suitable shape. The base 134 and cover 136 can have a first pair of side walls 103 and a second pair of side walls 105 sized and shaped to accommodate any suitable substrate and/or insert. For example, in some embodiments, the walls of the base 134 and cover 136 can have any suitable dimensions (e.g., length, width, thickness, etc.) to accommodate any suitable substrate and/or insert. As shown in FIGS. 1A and 1B, the base 134 and cover 136 have substantially rectangular shapes.

The support device 100 can include one or more inserts 172, 173 configured to be received within the cover opening 121. The inserts 172, 173 can provide a user with flexibility in port or insert opening size, which may be advantageous to effectively access a sample disposed on any given portion of the surface area of the substrate (e.g., on one or more sample regions or in an area between sample regions). The support device can be configured to include a single insert or multiple inserts. The support device 100 of FIGS. 1A-1B includes two inserts 172, 173. In some embodiments, the support device 100 can include three, four, five, or more inserts.

The inserts 172, 173 can define an opening that permits access to a substrate (e.g., a slide) that may include a biological sample on its surface. In some embodiments, each insert may define one or more openings (e.g. about 1 to 2, 2 to 3, 3 to 4, or more openings). In some embodiments, one or more openings defined by a single insert can provide a user with access to one or more sealed off portions of a sample on a substrate. The inserts as well as insert openings can be formed in various shapes, as desired. Non-limiting example shapes of the insert and insert openings can include polygonal shapes such as square, circular, rectangular, triangular, or any other suitable shape, such as irregular or round shapes.

The one or more inserts 172, 173 of the support device can be sized to accommodate any sample area. In some embodiments, the support device 100 includes multiple inserts having the same shape and sizes (e.g., one or more dimensions) that are about equal to each other. In some embodiments, the support device 100 includes multiple inserts having sizes and shapes that are not the same. For example, in some embodiments, a first insert may have size and/or dimensions that are greater than the size and/or dimensions of a second insert. In some embodiments, the first insert may have size and/or dimensions that are less than the size and/or dimensions of the second insert. In some embodiments, the support device 100 includes three or more inserts having size and/or dimensions that are about equal to each other. In some embodiments, the support device 100 includes three or more inserts having size and/or dimensions that are not equal to each other. In some embodiments, the inserts and the opening of the insert can have any suitable size and/or dimensions.

Referring back to FIGS. 1A and 1B, the support device 100 includes a first insert 172 and a second insert 173 that are configured to be received within cover opening 121. First insert 172 defines a first insert opening 174, and second insert 173 defines a second insert opening 175. First and second insert openings 174, 175 are square in shape and have side lengths s$_1$, s$_2$. Side length s$_2$ is greater than length s$_1$ thus, first insert opening 174 has a larger area than second insert opening 175. In some embodiments, side length s$_2$ is at least about 10% to about 100% greater than length s$_i$. In some embodiments, side length s$_2$ is at least about 50% greater than length s$_1$. In some embodiments, side length s$_2$ is at least about 10% to 20%, about 20% to 30%, about 30% to 40%, about 40% to 50%, about 50% to 60%, about 60% to 70%, about 70% to 80%, about 80% to 90%, or about 90% to 100% greater than length s$_1$. In some embodiments, first and second insert openings 174, 175 may provide a user with access to the substrate (e.g., a sample region on the substrate) to view a sample on the sample region and/or deliver a solution directly onto the sample on the sample region or onto a surface of the substrate, for example, when the support device is in a closed position.

In some embodiments, inserts 172, 173 can provide a user with differently sized ports configured to provide access to sample regions of various sizes and/or provide access to various portions of one or more sample regions. For example, the insert opening (e.g., see opening 174) may provide a user with a port or opening area of an equal to or smaller size with respect to a sample region (e.g., see FIGS. 7A-7D). In some embodiments, a smaller port may be advantageous to effectively access a sample occupying a surface area that is less than a total surface area (e.g., a sample occupying at least about 5% to 10%, 10% to 20%, 20% to 30%, 30% to 40%, 40% to 50%, or 50% to 75%) of a sample region (e.g., a sample positioned within a larger sample region). In various example embodiments, an insert opening (e.g., opening 175) may provide a user with a port or opening of a larger area with respect to a sample region (e.g., see FIGS. 8A-8D). In some embodiments, a larger port may be advantageous to effectively access a sample occupying a surface area that is about 50% to 100% (e.g., a sample occupying at least about 50% to 60%, 60% to 70%, 70% to 80%, 80% to 90%, or 90% to 100%) as large as a total surface area of a sample region.

In some embodiments, an insert includes a gasket configured to enclose and/or seal off an area on the surface of a substrate (e.g., a slide) of a support device. In some embodiments, the gaskets can have a square, circular, rectangular, triangular, or any other suitable shape. In some embodiments, the gaskets of the disclosure have any suitable size and/or dimensions to accommodate any number of samples, any area of one or more sample regions, and/or any area of a surface of the substrate.

As shown in FIGS. 1A and 1B, first and second inserts 172, 173 each include a gasket 180 forms a perimeter about the first and second insert openings 174, 175, respectively, and extends vertically below a top surface 176 of first and second inserts 172, 173. Gaskets 180 are configured to contact substrate 110 and form a seal (e.g., a vapor-tight seal, liquid-tight seal, and/or an air-tight seal) when support device 100 is in a closed configuration. In some embodiments, gasket 180 is an over-molded gasket. In some embodiments, gaskets 180 are fixedly coupled to the top surfaces 176. In some embodiments, cover 136 applies pressure on gasket 180, which in turn applies pressure on substrate 110 when substrate holder 201 is in a closed position.

The support device 100 can include one or more structures (e.g., ribs) to limit the movement and/or position (e.g., tilting) of a loaded substrate (e.g., a substrate placed in the base of the support device) such that the seals formed by one or more gaskets are not compromised (e.g., are not broken). The one or more structures can include one or more ribs (e.g., see a plurality of ribs 218 in FIG. 2) configured to support the substrate 110 and help ensure that the seal of the gasket 180 is maintained. In some embodiments, the one or more structures can include attachment tabs that provide support for the substrate and secure the substrate to the base 134. In some embodiments, the base 134 is defined with a tapered wall configured to press-fit a loaded substrate in the base 134. In some embodiments, the one or more structures can be made of a rigid or rubbery. In some embodiments, the structure is a frame that is adjacent to the side walls of the base 134.

In some embodiments, the first and second inserts 172, 173 and gaskets 180 are positioned so that when the substrate 110 is disposed in the substrate holder 101, and the substrate holder 101 is in the closed position, a vapor-tight seal is formed between the gasket 180 and the substrate 110. In some embodiments, an air-tight seal and/or a liquid-tight seal is formed between the gasket 180 and the substrate 110. In some embodiments, the gasket 180 is configured to prevent liquid transport between one or more substrate wells (e.g., one or more sample regions of substrate 110) when the cover 136 is in the closed position.

The support device 100 can include one or more recesses, guides, or guide rails along a perimeter of the cover opening that are configured to receive and/or support the one or more inserts. For example, in some embodiments, the insert has flat protrusions, edges that extend outward, or projections that are configured to rest on the recesses, guides, or guide rails. In some embodiments, instead of including one or more recesses, guides, or guide rails, the support device has a cover opening with angled edges that are configured to receive and/or support the one or more inserts. In some embodiments, the recesses, guides, or guide rails are sized accordingly to accommodate any suitable substrate. For example, referring to FIG. 1B, cover 136 includes a recess 123 (best viewed as recess 223 in FIG. 2) that extends from recess walls 127 and defines the opening 121 of the cover 136. The recess walls 127 extend from the bottom (interior) surface 132 and toward the outer surface of the cover 136. Recess-interfacing structures in the form of outwardly extending projections 178 may be included in the inserts 172, 173. Projections 178 extend outwardly from all four sides of first and second inserts 172, 173. In some embodiments, projections 178 may extend outwardly from two sides of first and second inserts 172, 173. Projections 178 extend outwardly in opposing directions of support device 100 (e.g., in an orthogonal direction with respect to the first pair of side walls 103 or in a parallel direction with respect to the second pair of side walls 105) to engage with recess walls 127 (e.g., see 227 of FIG. 2) and/or move (e.g., slide) first and second inserts 172, 173 on recess 123 in a direction generally parallel to the first pair of side walls 103, as shown by arrow 112 in FIG. 1B.

In some embodiments, first and second inserts 172, 173 are not slidable when the support device 100 is in a closed configuration (e.g., when support device 100 is locked). In some embodiments, first and second inserts 172, 173 are slidable and are configured to engage one or more recess walls 127 when the support device 100 is in an unlocked configuration (e.g., when cover 136 is placed over base 134 but no locking mechanism has been engaged). In some embodiments, the first and second inserts 172, 173 are slidable to provide a user the ability to adjust a position of the first and second inserts 172, 173 with respect to substrate 110. In some embodiments, at most one insert is loaded onto support device 100. In some embodiments, at least one insert is loaded onto support device 100. In some embodiments, two inserts are loaded onto support device 100.

In some embodiments, the support device can include one or more securing features that facilitate engagement of the cover and the base. In some embodiments, the support device can include at least one, two three, four, or more securing features that facilitate engagement of the cover and the base. In some embodiments, the securing features are sized to accommodate the dimensions of the support device. In some embodiments, when the support device includes at least two or more securing features, the dimensions of each securing feature can be equal or can differ among each other. In some embodiments, one or more securing features are magnets (e.g., magnetic closures) that can engage the cover with the base. In some embodiments, one or more securing features are interlocking features (e.g., a snap-fit connector, a press-fit connector, or a combination thereof) that can engage the cover with the base. In some embodiments, one or more securing features are locking tabs that can engage the cover with the base. In some embodiments, any type of fastener that allows releasable engagement of the base with the cover can be used, such as, for example, magnetic fasteners, snap-fits, hook-and-loop fasteners, press latches, screws, press-fit type connectors (e.g., lever, a clip, or a clamp), or any combination thereof. In some embodiments, the substrate holder can further include one or more spring-loaded fasteners.

As shown in FIGS. 1A and 1B, the substrate holder 101 can include at least one pair of locking tabs 107 that are configured to releasably secure, close, lock, fasten, and/or engage the base 134 with the cover 136. Each locking tab 107 can include a movable tab 106 coupled to a first side wall 103 of the cover 136 and a non-movable tab 108 coupled to a first side wall 103 of the base 134. In some embodiments, the movable tab 106 is configured to engage with the non-movable tab 108 to releasably secure the cover 136 to the base 134. In alternative examples, movable tab 106 may be coupled to a second side wall 105 of the cover 136 and a non-movable tab 108 may be coupled to a second side wall 105 of the base 134. In some embodiments, one or more locking tabs 107 may be coupled to one or both first side walls 103 and/or one or more locking tabs 107 may be coupled to one or both second side walls 105. In some embodiments, the movable tabs 106 and the cover 136 are integrally joined (e.g., fixedly attached). In some embodiments, the non-movable tabs 108 and the base 134 are integrally joined. In some examples, the substrate holder 101 can include multiple locking tabs 107 (e.g., at least 2, 3, 4, or 5 pairs of locking tabs 107). In some embodiments, the substrate holder 101 includes one locking tab.

The substrate holder 101 can include a locking tab 158 that is configured to releasably secure, close, lock, fasten, and/or engage the base 134 with the cover 136. The locking tab 158 can include a movable tab 160 coupled to a first side wall 103 of the cover 136 and a non-movable tab 162 coupled to a first side wall 103 of the base 134. In some embodiments, the movable tab 160 is configured to engage with the non-movable tab 162 to releasably secure the cover 136 to the base 134. In some examples, movable tab 160 may be coupled to a second side wall 105 of the cover 136 and a non-movable tab 162 may be coupled to a second side wall 105 of the base 134. In some embodiments, one or more locking tabs 158 may be coupled to one or both first side walls 103 and/or one or more locking tabs 158 may be coupled to one or both second side walls 105. In some embodiments, the movable tab 160 and the cover 136 are integrally joined (e.g., fixedly attached, one-piece part). In some embodiments, the non-movable tabs 162 and the base 134 are integrally joined. In some examples, substrate holder 101 can include multiple locking tabs 158 (e.g., at least 2, 3, 4, or 5 locking tabs 158). In some embodiments, substrate holder 101 includes one locking tab 158 and one locking tab 107. In some embodiments, substrate holder 101 includes one locking tab 158 and a pair of locking tabs 107. In some embodiments, substrate holder 101 includes one locking tab 158 and three locking tabs 107. In some embodiments, substrate holder 101 includes one locking tab 158 and four locking tabs 107.

As shown in FIGS. 1A-1B, at least a portion of a top surface 128 of substrate 110 is exposed through first and second insert openings 174, 175 of first and second inserts 172, 173. The first and second insert openings 174, 175 are defined by the top surfaces 176 of first and second insert openings 174, 175. The first and second insert openings 174, 175 can be align with one or more sample regions of the substrate when the support device 100 is in the closed position.

Figure 2:
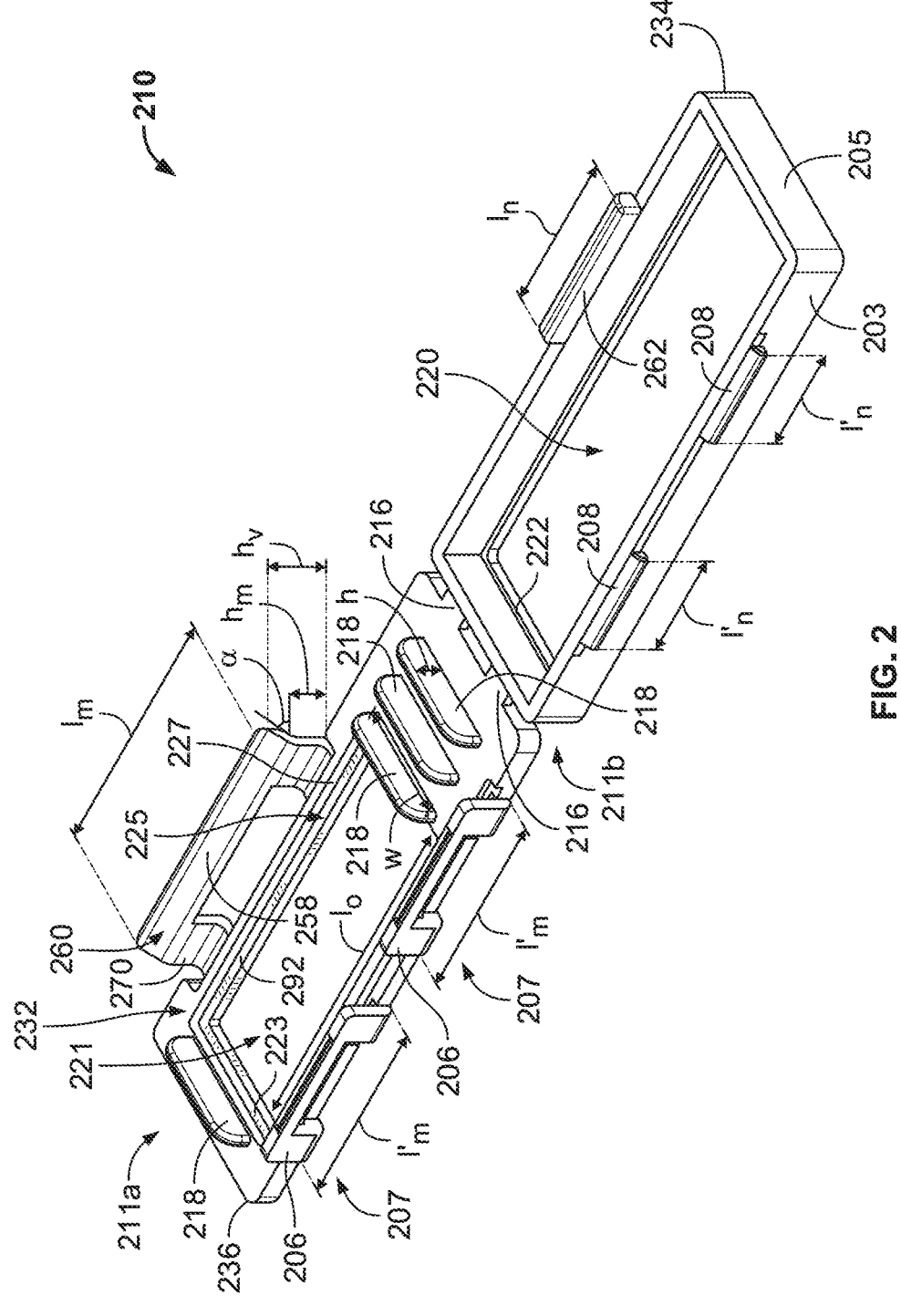
FIG. 2 is a perspective view of an example substrate holder in an open position.

FIG. 2 is a perspective view of an example substrate holder in an open position. The substrate holder 201 includes the locking tab 258 including a movable tab 260 having a length $l_m$ and a non-movable tab 262 having a length $l_n$. The substrate holder 201 includes the pair of locking tabs 207 including a movable tab 206 having a length $l'_m$ and a non-movable tab 208 having a length $l'_n$. A length of the locking tab 258 can be greater than a length of the pair of locking tabs 207. The length $l_m$ of the movable tab 260 can be greater than the length $l'_m$ of the movable tab 206. In some embodiments, the length $l_m$ of the movable tab 260 can be about 40% greater than the length $l'_m$ of the movable tab 206. In some embodiments, the length $l_m$ of the movable tab 260 can be at least about 10% to about 80% (e.g., between about 10% to 20%, 20% to 30%, 30% to 40%, 40% to 50%, 50% to 60%, 60% to 70%, or 70% to 80%) greater than the length $l'_m$ of the movable tab 206. The length $l_n$ of the non-movable tab 262 can be greater than the length $l'_n$ of the non-movable tab 208. In some embodiments, the length $l_n$ of the non-movable tab 262 can be about 40% greater than the length $l'_n$ of the non-movable tab 208. In some embodiments, the length $l_n$ of the movable tab 260 can be at least about 10% to about 80% (e.g., between about 10% to 20%, 20% to 30%, 30% to 40%, 40% to 50%, 50% to 60%, 60% to 70%, or 70% to 80%) or more greater than the length $l'_n$ of the movable tab 208.

In some embodiments, the length $l_m$ of the movable tab 260 is less than a length $l_o$ of cover opening 221. In some embodiments, the length $l_m$ of the movable tab 260 can be about 5% less than a length of $l_o$ of cover opening 221. In some embodiments, the length $l_m$ of the movable tab 260 can be at least about 5% to about 20% (e.g., between about 5% to 10%, 10% to 15%, 15% to 20%) less than a length $l_o$ of cover opening 221. In some embodiments, the length $l_m$ of the movable tab 260 is aligned with a length $l_o$ of cover opening 221. The length $l_m$ of the movable tab 260 can help secure one or more inserts, including their gaskets, when substrate holder 201 is in a closed position. In some embodiments, movable tab 260 is centered about the length $l_o$ of cover opening 221 (e.g., centered along the length $l_o$ of cover opening 221).

The cover 236 and base 234 are pivotably connected by a pair of hinges 216 that extend from opposing and adjoining second side walls 205 of the cover and the base 234. In some embodiments, the pair of hinges can be a pair of living hinges. In some embodiments, the cover and base are pivotably connected by at least one hinge. In some embodiments, one or more hinges can extend from a second side wall of the cover to a second side wall of the base. In some embodiments, the cover and the base can be pivotably connected by one hinge that has a length spanning about 50% or more of the length of the side from which it extends from. In some embodiments, the cover and the base are pivotably connected by several hinges. In some embodiments, the cover and base can be connected by one connector (e.g., a hinge) or by more than two connectors (e.g., a pair of hinges). In some embodiments, the at least one connector is a breakable connector (e.g., a breakable hinge) that allows separation of the base from the cover before use.

FIG. 2 shows the substrate holder 201 in an open position, having the cover 236 in an extended, unfolded position extending away from the base 234. In some embodiments, the substrate holder 201 is in an open position when the cover 236 is at about 180° with respect to the base 234, as shown in FIG. 2. In some embodiments, the substrate holder 201 is in an open position when the cover 236 is at an angle ranging from about 10° to about 170° with respect to the base 234.

The support device can include one or more recesses, guides, or guide rails along a perimeter of the cover opening that are defined by walls extending from a surface of the cover. In some embodiments, the walls are sized to accommodate any suitable recess, guide, or guide rail that can support the substrate accordingly (e.g., that can provide a snug fit for the substrate, retain the substrate, and/or prevent it from falling through the cover opening).

Referring still to FIG. 2, the cover 236 defines an opening 221 and a recess 223. Recess 223 extends generally orthogonal from a recess wall 227. The recess wall 227 defines a recess opening 225. The recess opening 225 has an area that is larger than an area of the opening 221 of the cover 236. In some embodiments, the recess opening is larger than the opening 221 of the cover 236 by at least about 5%. In some embodiments, the recess opening is larger than the opening 221 of the cover 236 by at least about 10%. In some embodiments, the recess opening is larger than the opening 221 of the cover 236 by at least about 1% to 20% or more (e.g., between about 1% to 3%, 3% to 5%, 5% to 7%, 7% to 10%, 10% to 12%, 12% to 15%, or 15% to 20%). The recess opening 225 is configured to engage with at least one projection of the insert. In some embodiments, the recess wall 227 is configured to engage a side wall (e.g., first, second, third, or fourth sides 384a-d, 484a-d, 584a-d of inserts) of the projection of the insert, thereby helping secure the insert in place.

In some embodiments, the cover 236 is configured to receive one or more inserts (e.g., first and second inserts 172, 173).

In some embodiments, any gaskets of the disclosure are constructed out of a thermoplastic polymer, such as a thermoplastic elastomer. In some embodiments, any gaskets of the disclosure removably adhere to the bottom surface 232 of the cover 236. In some embodiments, any gaskets of the disclosure are co-molded with a portion of the insert, for example, first and second inserts 172, 173.

In some embodiments, the gaskets described herein can withstand at least about 10% compression set. In some embodiments, any gaskets of the disclosure can withstand about 15% or more compression set. In some embodiments, any gaskets of the disclosure can withstand about 1%, 2%, 3%, 4%, 5%, 6%, 7%, 8%, 9%, 10%, 15%, 20%, 40%, 60%, 70% or more compression set. As used herein, compression set is expressed as the percentage of the original specimen thickness after being exposed to a constant compressive force. In some embodiments, any gaskets of the disclosure can withstand a compression force that results in a gasket height $h_g$ change of about 0.5 millimeters (mm). In some embodiments, any gaskets of the disclosure can withstand a compression force that results in a gasket height $h_g$ change of about 0.1 mm, 0.2 mm, 0.3 mm, 0.4 mm, 0.5 mm, 0.6 mm, 0.7 mm, 0.8 mm, 0.9 mm, 1 mm or more.

Movable tab 260 includes a top portion 268 extending from a substantially vertical wall 270 that further extends from the cover 236. The vertical wall 270 engages with the main body of the non-movable tab 262 (e.g., its mating part) when the substrate holder 201 is in a closed position. The top portion 268 extends outwardly away from the main body of movable tab 260 to form a gripping handle for the user. In some embodiments, the gripping handle may facilitate pulling or pushing of movable tab 260 by the user (e.g., when engaging and/or disengaging non-movable tab 262). The top portion 268 extends outwardly away from the main body of movable tab 260 at an angle α, with respect to a horizontal plane that is parallel to the bottom surface 232 of cover 236. In some embodiments, angle α can be about 15 degrees. In some embodiments, angle α can be at least about 5 degrees to about 90 degrees or more (e.g., between about 5 degrees to 10 degrees, 10 degrees to 15 degrees, 15 degrees to 20 degrees, 20 degrees to 25 degrees, 25 degrees to 30 degrees, 30 degrees to 35 degrees, 35 degrees to 40 degrees, 40 degrees to 45 degrees, 45 degrees to 50 degrees, 50 degrees to 55 degrees, 55 degrees to 60 degrees, 60 degrees to 65 degrees, 65 degrees to 70 degrees, 70 degrees to 75 degrees, 75 degrees to 80 degrees, 80 degrees to 85 degrees, 85 degrees to 90).

A first height $h_m$ includes a top portion 268 and vertical wall 270 of movable tab 260. A second height $h_v$ includes the vertical wall 270 of movable tab 260. In some embodiments, a first height $h_m$ of the movable tab 260 is greater than the height h of the plurality of ribs 218. In some embodiments, the first height $h_m$ of the movable tab 260 can be about 5% greater than the height h of the plurality of ribs 218. In some embodiments, the first height $h_m$ of the movable tab 260 can be at least about 5% to about 20% (e.g., between about 5% to 10%, 10% to 15%, 15% to 20%) greater than the height h of the plurality of ribs 218.

In some embodiments, a second height $h_v$ of the movable tab 260 can be about equal to the height h of the plurality of ribs 218. In some embodiments, the second height $h_v$ of the movable tab 260 can be about 5% greater than the height h of the plurality of ribs 218. In some embodiments, the second height $h_v$ of the movable tab 260 can be at least about 5% to about 20% (e.g., between about 5% to 10%, 10% to 15%, 15% to 20%) greater than the height h of the plurality of ribs 218.

In some embodiments, the cover 236 has a bottom surface 232 from which a plurality of ribs 218 can extend from. In the example shown in FIG. 2, substrate holder 201 includes a plurality of ribs 218 extending perpendicularly or protruding outwardly from bottom surface 232. In some embodiments, an insert does not come in contact (i.e., does not abut) the plurality of ribs 218. In some embodiments, the plurality of ribs 218 frame an area of the bottom surface 232 (e.g., an area that is sufficiently sized and configured to receive one or more inserts).

The plurality of ribs 218 has a width w extending along a direction that is parallel to the second side walls 205. In some embodiments, the plurality of ribs 218 can have an equal width w, as shown in FIG. 2. In some embodiments, the widths of the plurality of ribs 218 can vary. One of ribs 218 extends substantially upwards away from bottom surface 232 near a first end 211*a* of substrate holder 201. The remaining ribs 218 extend perpendicular from bottom surface 232 near a second end 211*b* of substrate holder 201. In some embodiments, the substrate holder 201 may include multiple ribs (e.g., 2, 3, 4, 5, 6, 7, 8, 9, 10 or more ribs). In some embodiments, the substrate holder 201 may include one rib. In some embodiments, the substrate holder 201 may not include any ribs. In some embodiments, the substrate holder 201 can include one or more ribs that extend perpendicular from bottom surface 232 of the cover.

The plurality of ribs 218 has a height h extending in a direction substantially upwards from bottom surface 232. In some embodiments, the plurality of ribs 218 can have an equal height h, as shown in FIG. 2. In some embodiments, a height h can be provided such that the top edge of the plurality of ribs 218 comes in contact with substrate 110 when the support device is in a closed position. In some embodiments, the plurality of ribs 218 secures substrate 110 by coming in contact with a surface of substrate 110 when the support device is in a closed position. In some embodiments, the first surface 228 of the substrate 110 engages with at least one of the plurality of ribs 218 when the substrate holder 101 is in the closed position. In some embodiments, the first surface 228 of the substrate 110 includes a sample region. In some embodiments, the sample region is an area of the substrate that is configured to receive one or more samples. In some embodiments, substrate 110 includes one or more sample regions.

Figures 3A, 3B, 4A, 4B, 5A, 5B:
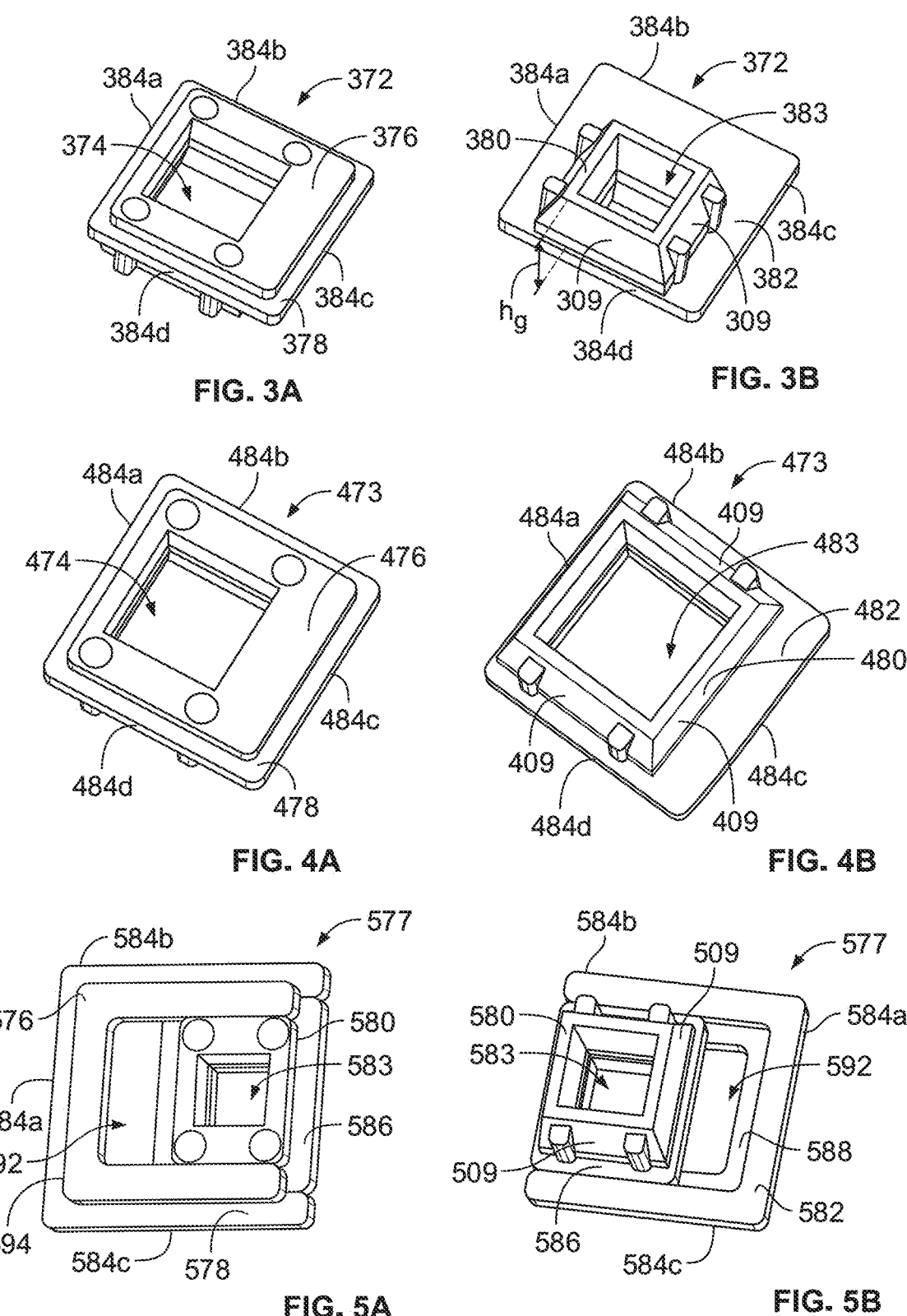
FIG. 3A is a top perspective view of an example insert.
FIG. 3B is a bottom perspective view of the insert of FIG. 3A.
FIG. 4A is a top perspective view of an example insert.
FIG. 4B is a bottom perspective view of the insert of FIG. 4A.
FIG. 5A is a top perspective view of an example slidable insert.
FIG. 5B is a bottom perspective view of the insert of FIG. 5A.

FIGS. 3A-3B are perspective views of an example insert 372 including gasket 380. In some embodiments, insert 372 and gasket 380 are sized and shaped to accommodate any suitable sample region, sample, substrate, or one or more additional, neighboring inserts. Insert 372 is a modular, support structure configured to be used in combination with the support devices of the disclosure and in combination with any other inserts described herein. For example, one or more inserts may be used in combination with a support device of the disclosure. Insert 372 may provide a user the ability to place a gasket (e.g., along with insert 372) on any desired portion of the surface of a substrate and create a sealed substrate well when the support device 100 is in a closed or locked configuration. A top surface 376 of insert 372 defines an insert opening 374. Insert opening 374 is square in shape. Gasket 380 is disposed around the perimeter of insert openings 374 below a top surface 376 of insert 372. Gasket 380 has four gasket walls 309 having a height h$_g$ and extending vertically below a top surface 376 of insert 372. Gasket walls 309 extend away from a bottom surface 382 and define a gasket opening 383, which is a continuation of insert opening 374 (e.g., the area of the gasket opening 383 is about equal to the area of the insert opening 374). In some embodiments, gasket walls 309 taper away from bottom surface 382 to form a gasket opening having an area that is less than the area of insert opening. Gasket 380, including gasket walls 309, and insert 372 can be fixedly attached to one another (e.g., by an overmolding process). Gasket 380 is configured to contact a substrate and form a seal (e.g., a vapor-tight seal, liquid-tight seal, and/or an air-tight seal) when support device 100 is in a closed configuration. In some embodiments, gasket 380 is an over-molded gasket.

Insert 372 can have a square shape defined by a first side 384*a*, a second side 384*b*, a third side 384*c*, and a fourth side 384*d*. In some embodiments, insert 372 may have a rectangular shape (e.g., the length of each first and second sides 384*a-b* may be greater than the length of each third and fourth sides 384*c-d*). In some embodiments, insert 372 may have a circular shape further defining circular insert and gasket openings. Insert 372 includes projections 378 extending outwardly from first, second, third, and fourth sides 384*a-d* of insert opening 374. In some embodiments, projections 378 may extend outwardly from two sides of insert openings 374. Projections 378 extend outwardly and when in use, the projections 378 that ride on/along recess 123 may be positioned in a widthwise direction of support device 100 (e.g., in an orthogonal direction with respect to the first pair of side walls 103 or in a parallel direction with respect to the second pair of side walls 105). Projections 378 may allow a user to optionally slide insert 372 along/on the recess 123 in a direction parallel to the first pair of side walls 103 in order to adjust placement of the insert 372 prior to locking the support device. Alternatively, recess 123 may receive projections 178, and a user may choose not to slide the insert 372 prior to its placement.

Referring now to FIGS. 4A and 4B, an example insert 473 including gasket 480 are shown. In some embodiments, the insert 473 and gasket 480 are sized and shaped to accommodate any suitable sample region, sample, substrate, or one or more additional, neighboring inserts. In an example embodiment, insert 473 includes an insert opening 475 and a gasket 480. In various example embodiments, insert 473 may include one or more features as described herein with reference to insert 372 described above and with reference to FIGS. 3A and 3B. Insert 473 may be substantially similar in construction and function in several aspects to the insert 372 discussed above, but can include an insert opening 475 and a gasket opening 483 that have an area that is larger than the area of insert opening 374 and gasket opening 383. In some embodiments, insert opening 475 has an area that is at least about 10% to about 100% larger than the area of insert opening 374 (e.g., between at least about 10% to 20%, 20% to 30%, 30% to 40%, 40% to 50%, 50% to 60%, 60% to 70%, 70% to 80%, 80% to 90%, 90% to 100%). In some embodiments, gasket opening 483 has an area that is at least about 10% to about 100% larger than the area of gasket opening 383 (e.g., between at least about 10% to 20%, 20% to 30%, 30% to 40%, 40% to 50%, 50% to 60%, 60% to 70%, 70% to 80%, 80% to 90%, 90% to 100%).

Referring now to FIGS. 5A and 5B, an example slidable insert 577 including slidable gasket 580 are shown. In some embodiments, the slidable insert 577 and slidable gasket 580 are sized and shaped to accommodate any suitable sample region, sample, substrate, or one or more additional, neighboring inserts. In an example embodiment, slidable insert 577 includes an insert opening 579 and a slidable gasket 580. In various example embodiments, slidable insert 577 may include one or more features as described herein with reference to insert 372 and insert 473 described above and with reference to FIGS. 3A, 3B, 4A, and 4B. Slidable insert 577 may be substantially similar in construction and function in several aspects to the insert 372 and/or insert 473 discussed above but can include a frame 594, a recess 588 and a flange 586.

Slidable insert 577 is square in shape and includes a frame 594 defining an aperture 592. Aperture 592 provides access to a substrate outside of the access provided by gasket opening 583. Frame 594 defines an insert opening 579 on a top surface 576 and defines a recess 588 on a bottom surface 582. Recess 588 is configured to receive a flange 586 extending outwardly on all sides of slidable gasket 580. When in use, flange 586 rides along recess 588 and provides a user with flexibility to control the position of slidable gasket 580. Flange 586 may allow a user to optionally slide slidable gasket 580 along recess 588 in a direction parallel or orthogonal to the first pair of side walls 103 in order to adjust placement of the slidable insert 577 prior to locking the support device. Alternatively, recess 588 may receive flange 586, and a user may choose not to slide the slidable gasket 580 prior to its placement. Slidable gasket 580 defines a gasket opening 583 and includes four gasket walls 309 having a height $h_g$ and extending vertically below a top surface 576 of slidable insert 577. Gasket walls 509 extend away from a bottom surface 582 and define gasket opening 583. Insert 577 includes projections 578 extending outwardly from all three sides of the frame 594.

In some embodiments, gasket opening 583 has an area that is at least about 10% to about 100% larger than the area of insert opening 374 (e.g., between at least about 10% to 20%, 20% to 30%, 30% to 40%, 40% to 50%, 50% to 60%, 60% to 70%, 70% to 80%, 80% to 90%, 90% to 100%). In some embodiments, gasket opening 583 has an area that is at least about 10% to about 100% larger than the area of gasket opening 380 (e.g., between at least about 10% to 20%, 20% to 30%, 30% to 40%, 40% to 50%, 50% to 60%, 60% to 70%, 70% to 80%, 80% to 90%, 90% to 100%).

In some embodiments, gasket opening 583 has an area that is at least about 10% to about 100% smaller than the area of insert opening 374 (e.g., between at least about 10% to 20%, 20% to 30%, 30% to 40%, 40% to 50%, 50% to 60%, 60% to 70%, 70% to 80%, 80% to 90%, 90% to 100%). In some embodiments, gasket opening 583 has an area that is at least about 10% to about 100% smaller than the area of gasket opening 380 (e.g., between at least about 10% to 20%, 20% to 30%, 30% to 40%, 40% to 50%, 50% to 60%, 60% to 70%, 70% to 80%, 80% to 90%, 90% to 100%).

In some embodiments, gasket opening 583 has an area that is at least about 10% to about 100% larger than the area of insert opening 475 (e.g., between at least about 10% to 20%, 20% to 30%, 30% to 40%, 40% to 50%, 50% to 60%, 60% to 70%, 70% to 80%, 80% to 90%, 90% to 100%). In some embodiments, gasket opening 583 has an area that is at least about 10% to about 100% larger than the area of gasket opening 483 (e.g., between at least about 10% to 20%, 20% to 30%, 30% to 40%, 40% to 50%, 50% to 60%, 60% to 70%, 70% to 80%, 80% to 90%, 90% to 100%).

In some embodiments, gasket opening 583 has an area that is at least about 10% to about 100% smaller than the area of insert opening 475 (e.g., between at least about 10% to 20%, 20% to 30%, 30% to 40%, 40% to 50%, 50% to 60%, 60% to 70%, 70% to 80%, 80% to 90%, 90% to 100%). In some embodiments, gasket opening 583 has an area that is at least about 10% to about 100% smaller than the area of gasket opening 483 (e.g., between at least about 10% to 20%, 20% to 30%, 30% to 40%, 40% to 50%, 50% to 60%, 60% to 70%, 70% to 80%, 80% to 90%, 90% to 100%).

Figure 11A:
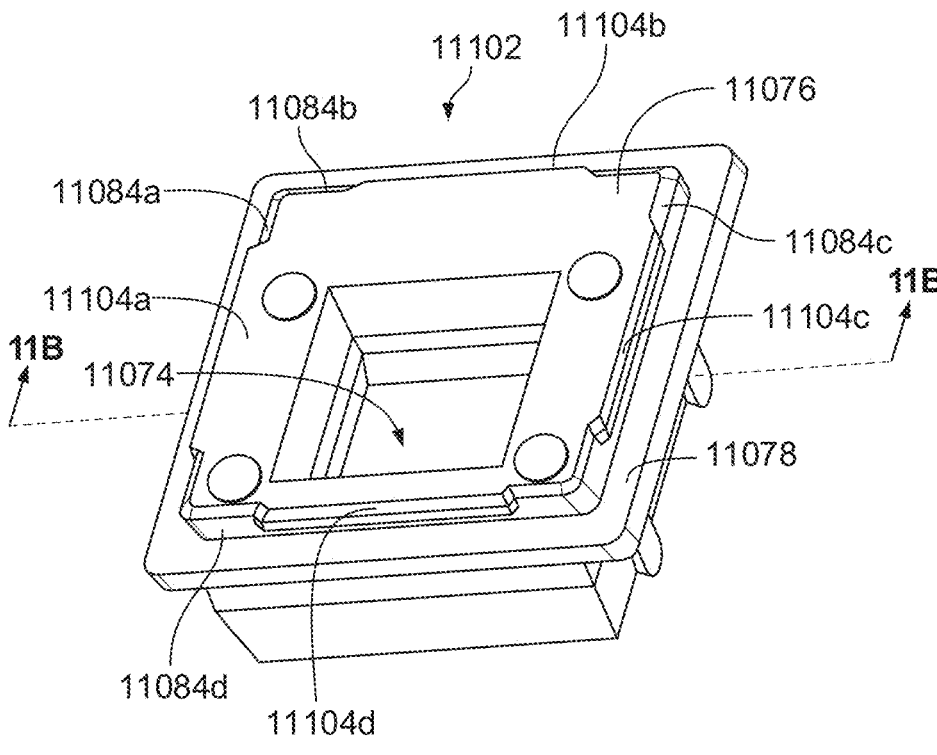
FIG. 11A is a perspective view of an example insert.
Figure 11B:
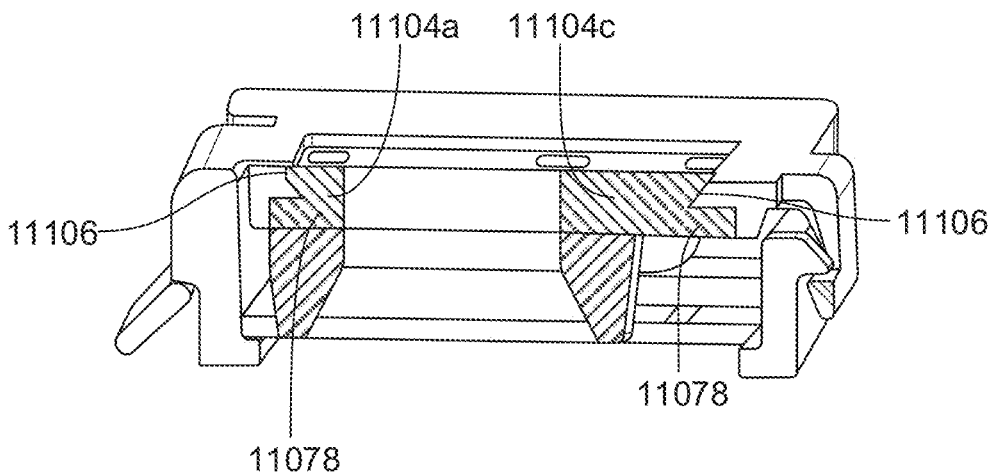
FIG. 11B is a cross-sectional view of the insert of FIG. 11A.

FIGS. 11A and 11B show an example insert 11102. In some embodiments, example insert 372 and gasket 380 are sized and shaped to accommodate any suitable sample region, sample, substrate, or one or more additional, neighboring inserts. In an example embodiment, insert 11102 includes an insert opening 579 and a slidable gasket 580. In various example embodiments, insert 11102 may include one or more features as described herein with reference to insert 372, insert 473, slidable insert 577 described above and with reference to FIGS. 3A, 3B, 4A, 4B, 5A, and 5B. Insert 11102 may be substantially similar in construction and function in several aspects to the insert 372, insert 473, and/or slidable insert 577 discussed above but can include first, second, third and fourth protruding edges 11104a, 11104b, 11104c, and 11104d.

A top surface 11076 of insert 11102 defines an insert opening 11074. Insert 11102 has a squared shape having a first side 11084a, a second side 11084b, a third side 11084c, and a fourth side 11084d. As seen in FIG. 11A, in certain embodiments, first, second, third, and fourth sides 11084a-d include protruding edges 11104a-d, respectively. In some embodiments, protruding edges 11104a-d are configured to engage with recess wall 11106, as shown in FIG. 11B, which is a cross-section of line 11B-11B. Recess wall 11106 is angled and is configured to engage the one or more of the protruding edges 11104a-d. In some embodiments, the protruding edges 11104a-d are angled at an angle that is supplementary to an angle of the recess wall 11106. Thus, in some embodiments, the insert 11102 is configured to snap into a recess of the base.

Figure 6:
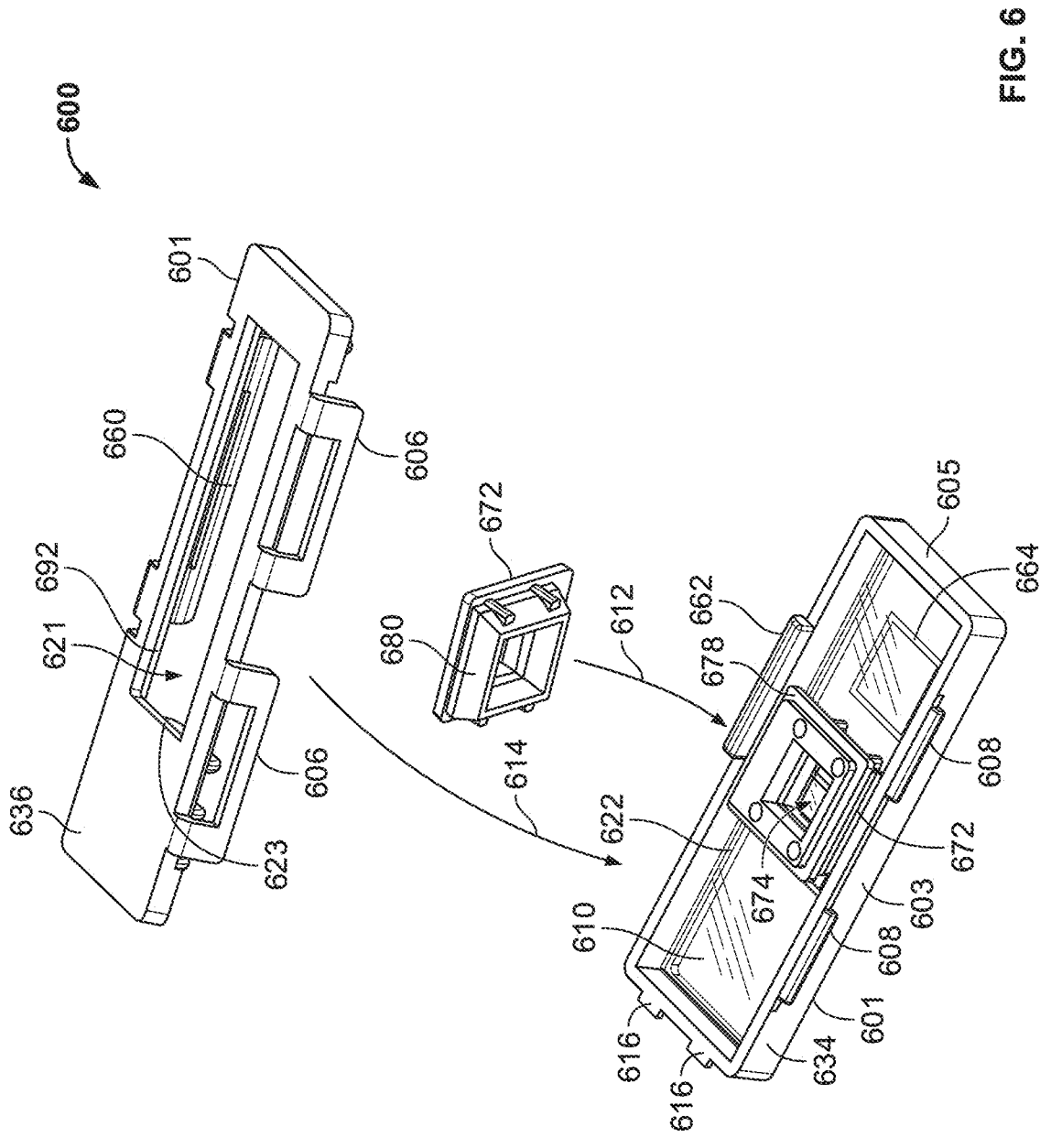
FIG. 6 is an exploded perspective view of an example support device.

FIG. 6 is a perspective view of the support device 600 including the substrate holder 601 and the substrate 610. The substrate holder 601 is shown as having the cover 636 detached from the base 634. The pair of hinges 616 can be breakable hinges. In some embodiments, the pair of hinges 616 are selectively, manually severable to permit a user to detach cover 636 from base 634. In some embodiments, the pair of hinges 616 can include a breakable portion. In some embodiments, the breakable portion can include breakable webbing. In some embodiments, the pair of hinges 616 is irreversibly breakable. For example, once broken, the cover 636 and base 634 cannot be attached via the pair of hinges 616. In some embodiments, the pair of hinges 616 may be reversibly breakable.

Figures 12A, 12B:
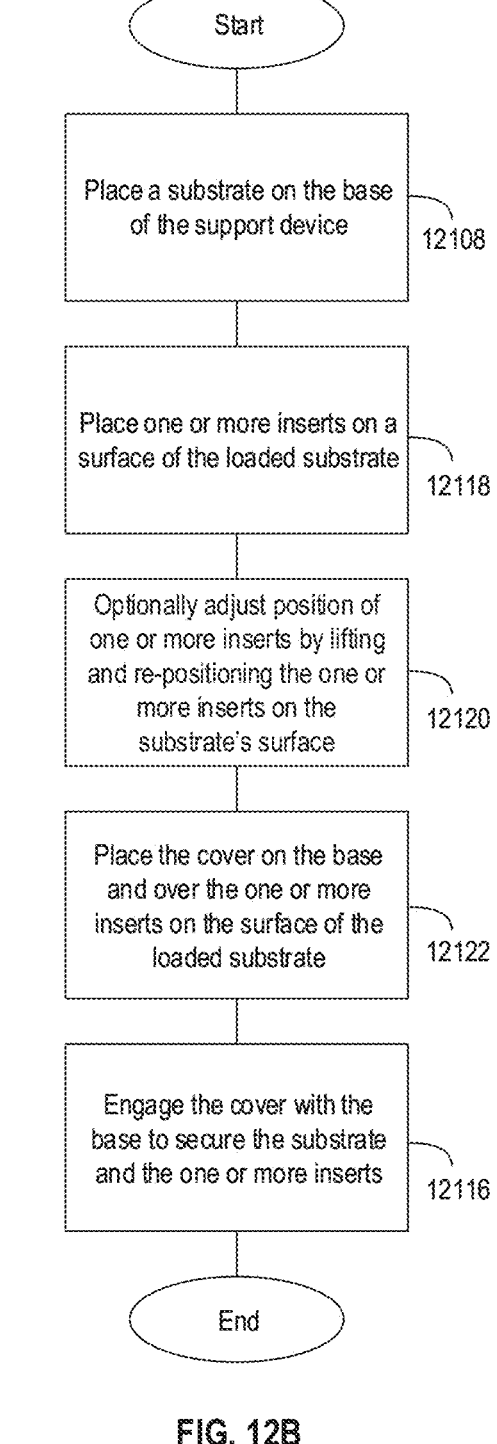
FIG. 12A is a flow chart of an example method for loading and securing a substrate and one or more inserts in a support device.
FIG. 12B is a flow chart of an example method for loading and securing a substrate and one or more inserts in a support device.

Referring to FIGS. 12A and 12B, two example methods of loading and securing the substrate and one or more inserts in the support device are shown. In some embodiments, the one or more inserts 672 can be positioned in any suitable direction and/or position such that the enclosed area defined by each one of the inserts 672 (e.g., insert opening 674) encloses one or more sample regions 664 on the first surface 628 of substrate 610 or one or more portions thereof. In some embodiments, substrate 610 may include samples (e.g., biological material samples) on one or more portions of its surface. In some embodiments, one or more inserts 672 are positioned such that their one or more of insert openings 674 are configured to be aligned with the samples or portions of the samples on the surface of the substrate. In some embodiments, the samples (e.g., biological material samples) may be identified by using the inserts 672. For example, in some embodiments, the inserts may be labeled (e.g., with a number, letter, and/or color), and the user may pair one or more labeled inserts with one or more specific samples as a way to label or identify the sample(s).

Referring to FIGS. 6, 12A, and 12B, in some embodiments, the base 634 is configured to receive the substrate 610. In some embodiments, as shown in step 12108, a user places the substrate 610 in the base 634. If the substrate holder 601 is in a closed position (e.g., the cover 636 engaging with the base 634), the user detaches the cover 636 from the base 634 before placing the substrate 610 in the base 634. Once detached, the user can insert the substrate 610 into the base 634 following the direction of the arrow 614. Next, as described in step 12118 (see FIG. 12B), the user can place inserts 672 on the first surface 628 of inserted substrate 610, e.g., in the direction of arrow 612. Optionally, the user can adjust the position and/or direction of inserts 672 by picking up the inserts 672 and changing their positions on the first surface 628 and/or rotating the inserts 672 as desired prior to engaging the cover 636 with the base 634, as described in step 12120 (see FIG. 12B). Once the inserts 672 are placed at a desired position and/or orientation, the user can place the cover 636 on top of the base 634 such that the inserts 672 are received by the opening 621 of the cover 636, as described in step 12122 (see FIG. 12B). In some embodiments, placing the cover 636 on top of the base 634 can help hold the substrate 610 and inserts 672 in place. Next, as described in step 12116 (see FIG. 12B), the user can engage (e.g., snap) the cover 636 with the base 634 via the locking tabs 607 and 658 to place the substrate holder 601 in a closed position. When the substrate holder 601 is in a closed position, engagement of the cover 636 with the base 634 can help secure the substrate 610 and the inserts 672, including gasket 680, in place.

In some embodiments, a user can insert the inserts 672 in the opening 621 of the cover 636 prior to placing the inserts 672 on the first surface 628 of the inserted substrate 610, as described in step 12110 (see FIG. 12A). Next, in some embodiments, the user can optionally adjust the position and/or orientation of the inserts 672 by sliding projection 678 along recess 623 while engaging recess walls 627 prior to engaging the cover 636 with the base 634, as described in step 12112 (see FIG. 12A). Once the position and/or orientation of the inserts 672 is optionally adjusted, the cover 636 (having the inserts 672 are inserted in the cover opening) is placed on the base 634; thus, the inserts 672 contact the first surface 628 of the inserted substrate 610 (e.g., the substrate 610 that is already inserted into the base 634) as the cover 636 is rested on the base 634, as described in step 12114 (see FIG. 12A). The remaining steps are similar to the steps described above. For example, the user can then proceed to engage (e.g., snap) the cover 636 with the base 634 via the locking tabs 607 and 658 to place the substrate holder 601 in a closed position (see step 12116).

In some examples, the second surface (e.g., a bottom surface) of the substrate 610 can rest on top of the base 634 of the substrate holder 601. For example, base 634 can include a lip 622 configured to retain the substrate 610 within the base 634. For example, substrate 610 can rest on lip 622 and be held in place. In some embodiments, lip 622 extends around the perimeter of the base 634. In some embodiments, the substrate can be secured to the base of the substrate holder. In an example, the substrate 610 can be placed in the base 634 in the direction of arrow 614. The second surface of substrate 610 can be placed such that it comes in contact with lip 622 and the first surface 628 of substrate 610 comes in contact with the plurality of ribs 618 and gasket 624 when the support device 600 is in a closed position. In some embodiments, substrate 610 can be loaded into base 634 without using a tool. The base 634 can include an opening 620 sufficiently sized to expose one or more portions of the substrate 610. In some embodiments, opening 620 is sized such that the majority of the second surface of substrate 610 is exposed and not covered. In some embodiments, opening 620 can enable the second surface of substrate 610 to come in contact with a surface of a heating device (e.g., a plate 3110, as described in PCT/US2019/065100, the entire contents of which are incorporated herein by reference). In some embodiments, the first surface 628 of substrate 610 includes a sample region 664. In some embodiments, the base 634 includes opening 620 that exposes at least a portion of the second surface of the substrate 610 when the substrate 610 is placed in the base 634.

In some embodiments, the base 634 does not define an opening (e.g., see base opening 220 in FIG. 2) and instead, it includes a flat, solid surface bottom. In some embodiments, the base 634 includes an interior bottom surface that is integrally molded with the walls of the base 634. In some embodiments, the interior bottom surface is flat or partially flat. In some embodiments, the interior bottom surface is curved or partially curved. In some embodiments, the interior bottom surface is smooth. In some embodiments, the interior bottom surface is uneven. In some embodiments, the uneven, interior bottom surface includes structures (e.g., ridges or projections) extending perpendicularly from the interior bottom surface to help secure a loaded substrate in place (e.g., to limit movement and/or position of the loaded substrate). In some embodiments, the uneven, interior bottom surface is coated with a material (e.g., rubberized) to help secure a loaded substrate in place (e.g., to limit movement and/or position of the loaded substrate). In some embodiments, the structures (e.g., ridges or projections) and/or coatings provide increased friction between the interior bottom surface and a surface (or portion thereof) of a loaded substrate.

In some embodiments, the base defines an opening, and the support device further includes a removable cover that is shaped and sized to be fit into and cover the base opening (e.g., in a snug fit manner). For example, in some embodiments, the removable cover can be fit into the base opening via one or more connectors (e.g., snap-fit or press-fit connectors). In some embodiments, the removable cover can be inserted into the base opening to provide a flat, solid surface to support a loaded substrate. Alternatively, in some embodiments, the removable cover can be removed (in the presence or absence of a loaded substrate) in order to view the loaded substrate (e.g., view a biological sample on the surface of the loaded substrate with the naked eye and/or with an optical microscopy device) more clearly.

In some embodiments, movable tabs 606 and 660 can have a C-shape structure. In some embodiments, movable tabs 606 and 660 are constructed from a flexible material that enables them to be flexed away from the body of the substrate holder in order to engage the non-movable tabs 608 and 662, respectively. In some embodiments, non-movable tabs 608 and 662 are unable to be flexed. In some embodiments, non-movable tabs 608 and 662 are rigid and do not flex when engaging the movable tabs 606, 660.

In some embodiments, a first and second side walls 603, 605 of the support device can be sized to accommodate any suitable size of substrate, inserts, tabs (locking, movable, and/or non-movable tabs), or any combination thereof. In some embodiments, a first side wall 603 can measure about 3 inches. In some embodiments, a second side wall 605 can measure about 1 inch. In some embodiments, the substrate 610 can have any suitable dimensions. In some embodiments, substrate 610 can measure about 75 millimeters (mm) by 25 mm. In some embodiments, substrate 610 can measure about 75 millimeters (mm) by 50 mm. In some embodiments, substrate 610 can measure about 48 millimeters (mm) by 28 mm. In some embodiments, substrate 610 can measure about 46 millimeters (mm) by 27 mm. In some embodiments, substrate 610 is a glass slide.

Figures 7A, 7B:
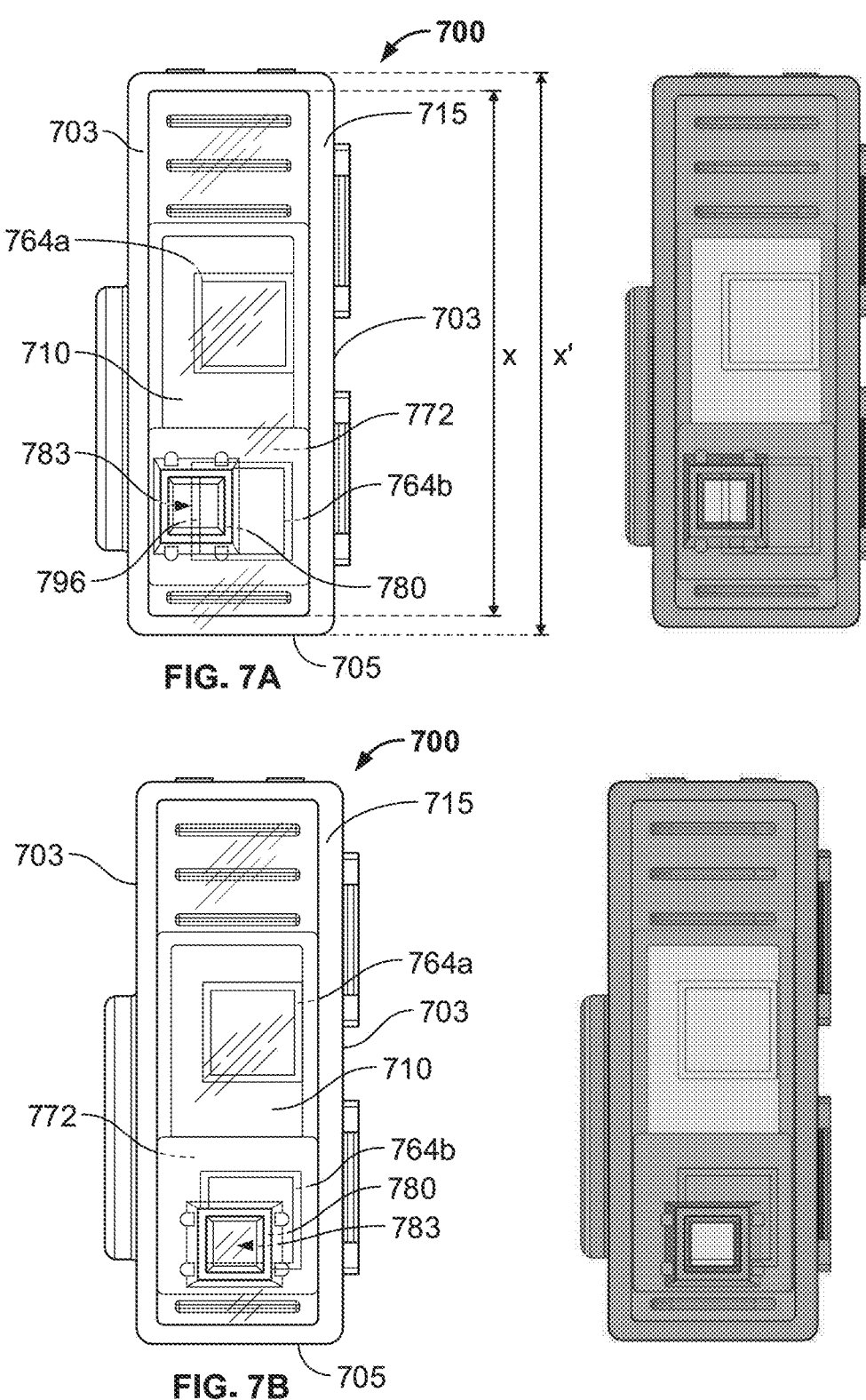
FIGS. 7A-7D are bottom views of an example support device showing an insert positioned at different locations.
Figures 7C, 7D:
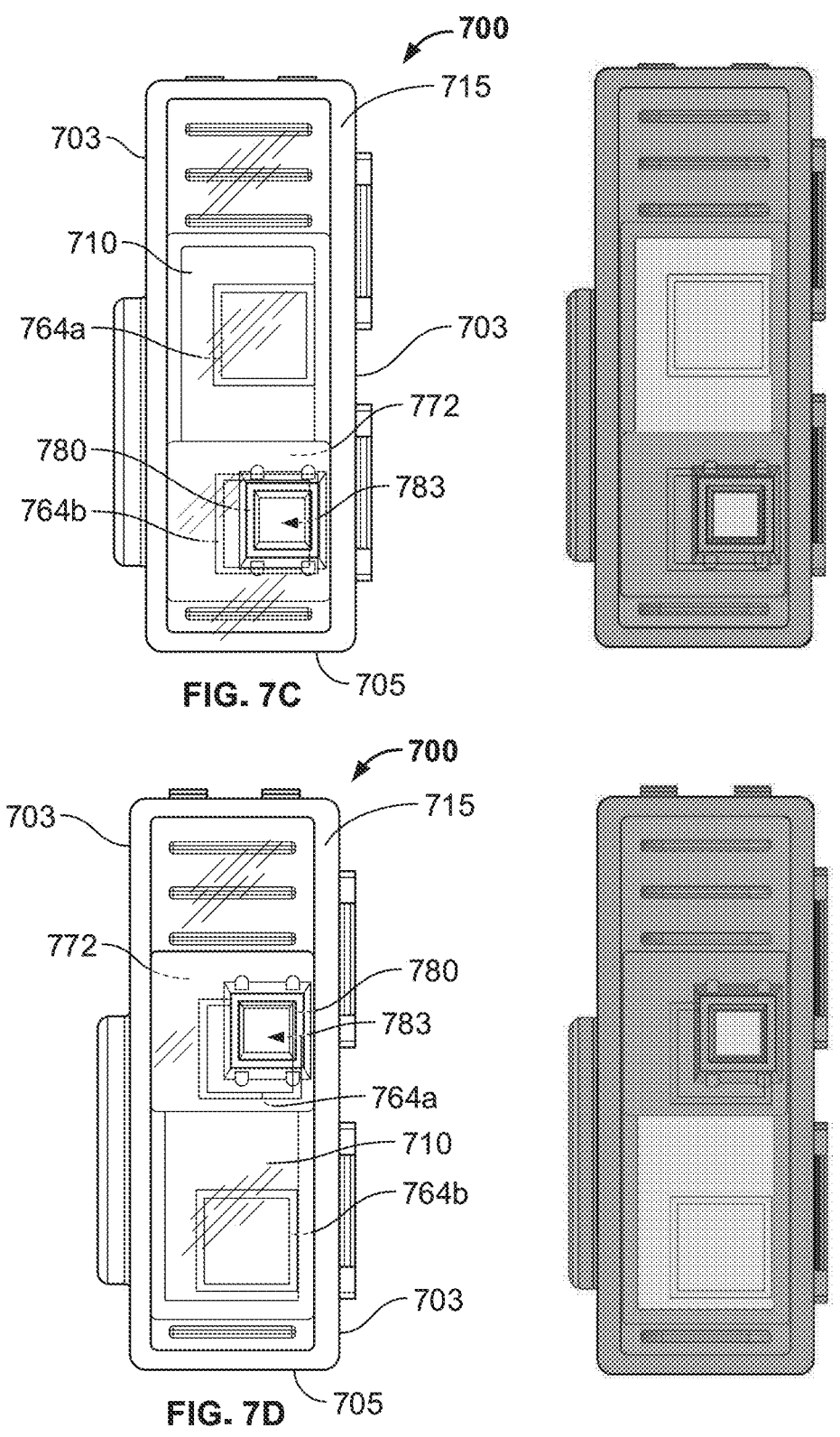

Referring now to FIGS. 7A, 7B, 7C, and 7D, bottom views of a bottom surface 715 of an example support device 700 in a closed position are shown. In an example embodiment, support device 700 includes an insert 772 including a gasket 780 and a gasket opening 783. Insert 772 may be substantially similar in construction and function in several aspects to the insert 372 discussed above, with reference to FIGS. 3A and 3B. FIGS. 7A, 7B, 7C, and 7D show various example positions of insert 772 and gasket 780 when loaded onto support device 700. For example, FIGS. 7A, 7B, and 7C show insert 772 positioned over and aligning with a second sample region 764*b*. FIG. 7A shows insert 772 having gasket 780 positioned over an edge 796 of second sample region 764*b*. FIG. 7B shows insert 772 having gasket 780 positioned over a lower, slightly off-center portion of second sample region 764*b*. FIG. 7C shows insert 772 having gasket 780 positioned over a side, slightly off-center portion of second sample region 764*b*. FIG. 7D shows insert 772 having gasket 780 positioned over a side, slightly off-center portion of first sample region 764*a*. By rotating insert 772 clockwise or counterclockwise prior to inserting it into support device 700, the position of gasket opening 783 can be controlled.

In some embodiments, the gasket 780 can be positioned in any suitable direction and/or position on the surface of the substrate 710 such that its gasket opening 783 can provide access to any portion of the surface of the substrate 710. In some embodiments, the area of gasket opening 783 overlaps with at least about 10% to about 100% (e.g., at least about 10% to 20%, 20% to 30%, 30% to 40%, 40% to 50%, 50% to 60%, 60% to 70%, 70% to 80%, 80% to 90%, 90% to 100%) of an area of a sample region. In some embodiments, gasket opening 783 is positioned about 4 millimeters (mm) to about 12 mm (e.g., at least about 4 mm to 5 mm, 5 mm to 6 mm, 6 mm to 7 mm, 7 mm to 8 mm, 8 mm to 9 mm, 9 mm to 10 mm, 10 mm to 11 mm, 11 mm to 12 mm, or more) away from an edge of first side wall 703. In some embodiments, gasket opening 783 is positioned about 6 mm to about 40 mm (e.g., at least about 6 mm to 10 mm, 10 mm to 15 mm, 15 mm to 20 mm, 20 mm to 25 mm, 25 mm to 30 mm, 30 mm to 35 mm, 35 mm to 40 mm, or more) away from an edge of first side wall 705.

In some embodiments, the gasket 780 and gasket opening 783 can have any suitable shape or dimensions to accommodate any suitable number of samples, any suitable area of a sample region on the surface of the substrate, any portion of the surface of the substrate 710, or any combination thereof. Gasket opening 783 is square in shape and has side length $s_1$, substrate 710 is rectangular in shape and has side length x, and support device 700 is rectangular in shape and has side length x'. In some embodiments, side length $s_1$ is about 8 mm long (e.g., at least about 6 mm to 7 mm, 7 mm to 8 mm, 8 mm to 9 mm, or 9 mm to 10 mm long). In some embodiments, gasket opening 783 has an area of about 64 mm² (e.g., about 35 mm² to 50 mm², about 50 mm² to 60 mm², about 60 mm² to 70 mm², about 70 mm² to 80 mm², about 80 mm² to 90 mm², or about 90 mm² to 100 mm²). In some embodiments, side length x is about 76 mm long (e.g., at least about 70 mm to 71 mm, 71 mm to 72 mm, 72 mm to 73 mm, 73 mm to 74 mm, 74 mm to 75 mm, 75 mm to 76 mm, 76 mm to 77 mm, 77 mm to 78 mm, 78 mm to 79 mm, or 79 mm to 80 mm long). In some embodiments, side length x is about 80 mm long (e.g., at least about 75 mm to 76 mm, 76 mm to 77 mm, 77 mm to 78 mm, 78 mm to 79 mm, 79 mm to 80 mm, 80 mm to 81 mm, 81 mm to 82 mm, 82 mm to 83 mm, 83 mm to 84 mm, or 84 mm to 85 mm long). In some embodiments, side length $s_1$ is about 10% of side length x (e.g., at least about 5% to 10%, 10% to 11%, 11% to 12%, 12% to 13%, 13% to 14%, or 14% to 15%). In some embodiments, side length $s_1$ is about 10% of side length x' (e.g., at least about 5% to 10%, 10% to 11%, 11% to 12%, 12% to 13%, 13% to 14%, or 14% to 15%).

Figures 8A, 8B:
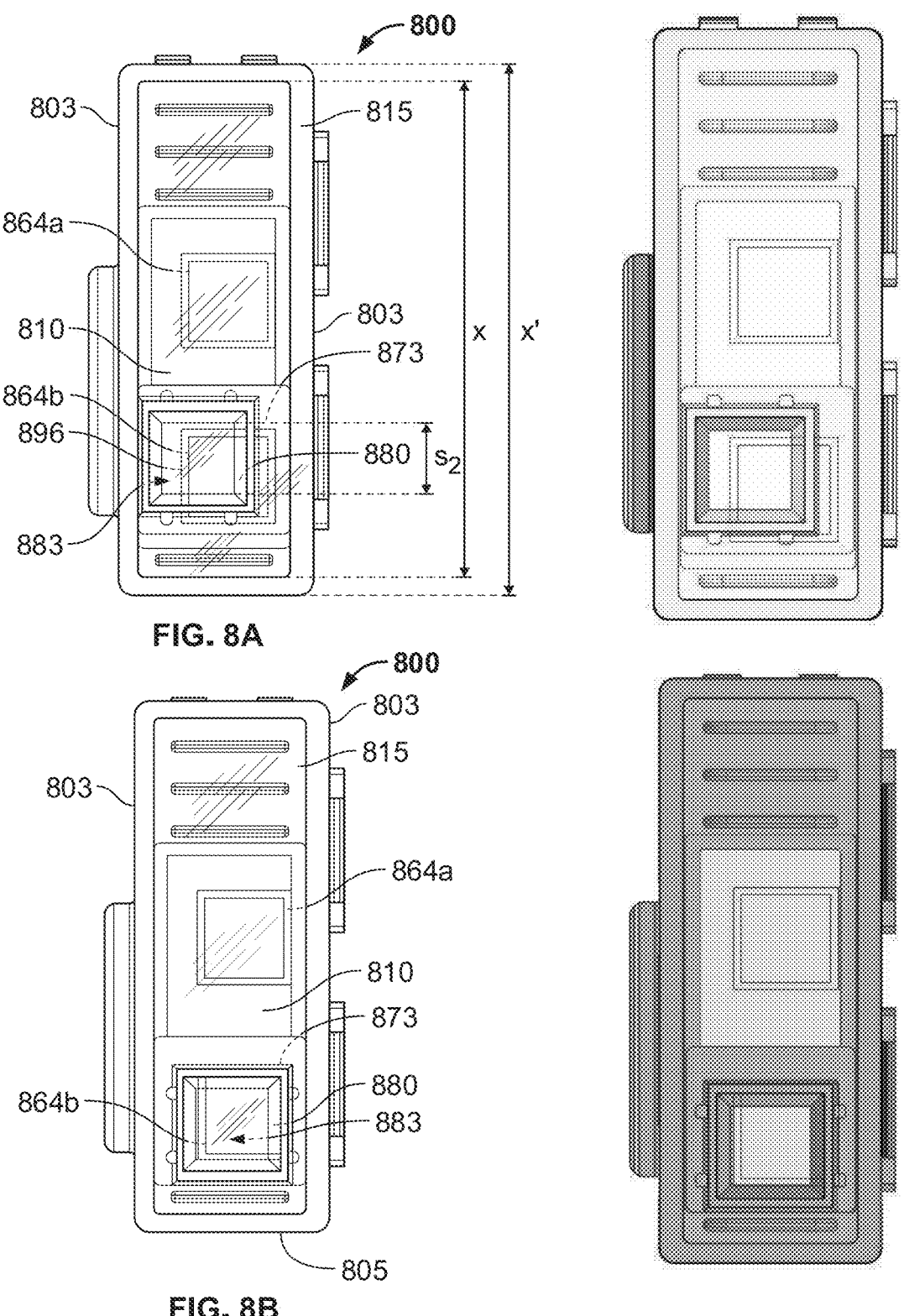
FIGS. 8A-8D are bottom views of an example support device showing an insert positioned at different locations.
Figures 8C, 8D:
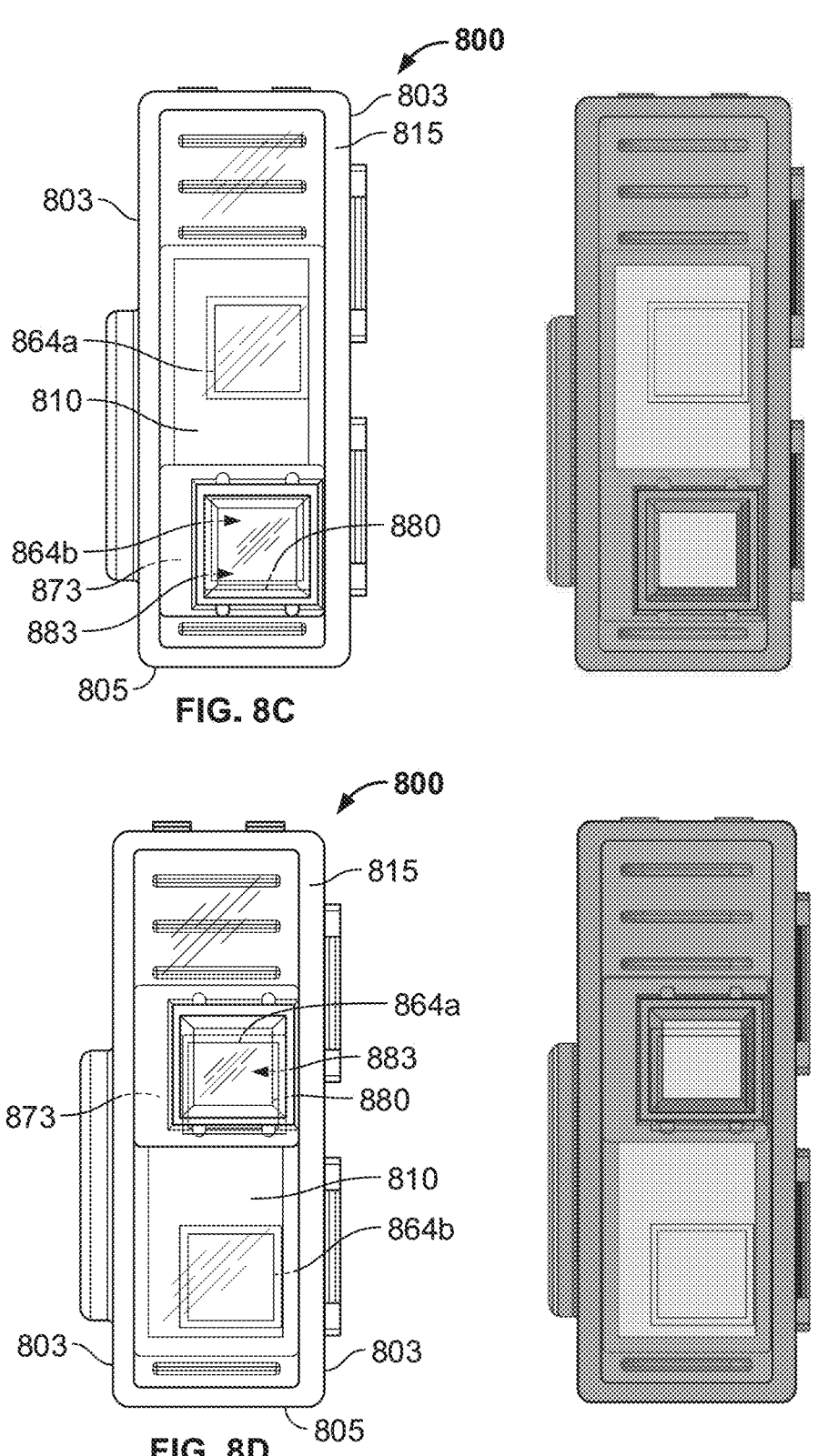

Referring now to FIGS. 8A, 8B, 8C, and 8D, bottom views of a bottom surface 815 of an example support device 800 in a closed position are shown. In an example embodiment, support device 800 includes an insert 873 including a gasket 780 and a gasket opening 883. Insert 873 may be substantially similar in construction and function in several aspects to the inserts 473 discussed above, with reference to FIGS. 4A and 4B. FIGS. 8A, 8B, 8C, and 8D show various example positions of insert 873 and gasket 880 when loaded onto support device 800. For example, FIGS. 8A, 8B, and 8C show insert 873 positioned over and aligning with a second sample region 864*b*. FIG. 8A shows insert 873 having gasket 880 positioned over an edge 896 of second sample region 864*b*. FIG. 8B shows insert 873 having gasket 880 positioned over a lower, slightly off-center portion of second sample region 864*b*. FIG. 8C shows insert 873 having gasket 880 positioned over a side, slightly off-center portion of second sample region 864*b*. FIG. 8D shows insert 873 having gasket 880 positioned over a side, slightly off-center portion of first sample region 864*a*. By rotating insert 873 clockwise or counterclockwise prior to inserting it into support device 700, the position of gasket opening 883 can be controlled.

In some embodiments, the gasket 880 can be positioned in any suitable direction and/or position on the surface of the substrate 810 such that its gasket opening 883 can provide access to any portion of the surface of the substrate 810. In some embodiments, the area of gasket opening 883 overlaps with at least about 10% to about 100% (e.g., at least about 10% to 20%, 20% to 30%, 30% to 40%, 40% to 50%, 50% to 60%, 60% to 70%, 70% to 80%, 80% to 90%, 90% to 100%) of an area of a sample region. In some embodiments, gasket opening 883 is positioned about 3 mm to about 12 mm (e.g., at least about 3 mm to 4 mm, 4 mm to 5 mm, 5 mm to 6 mm, 6 mm to 7 mm, 7 mm to 8 mm, 8 mm to 9 mm, 9 mm to 10 mm, 10 mm to 11 mm, 11 mm to 12 mm, or more) away from an edge of first side wall 803. In some embodiments, gasket opening 883 is positioned about 7 mm to about 40 mm (e.g., at least about 7 mm to 10 mm, 10 mm to 15 mm, 15 mm to 20 mm, 20 mm to 25 mm, 25 mm to 30 mm, 30 mm to 35 mm, 35 mm to 40 mm, or more) away from an edge of first side wall 805.

In some embodiments, the gasket 880 and gasket opening 883 can have any suitable shape or dimensions to accommodate any suitable number of samples, any suitable area of a sample region on the surface of the substrate, any portion of the surface of the substrate 810, or any combination thereof. Gasket opening 883 is square in shape and has side length $s_2$, substrate 810 is rectangular in shape and has side length x, and support device 800 is rectangular in shape and has side length x'. In some embodiments, side length $s_2$ is about 14 mm long (e.g., at least about 11 mm to 12 mm, 12 mm to 13 mm, 13 mm to 14 mm, 14 mm to 15 mm, 15 mm to 16 mm, 16 mm to 17 mm, or 17 mm to 18 mm long). In some embodiments, gasket opening 883 has an area of about 196 mm² (e.g., about 190 mm² to 200 mm², about 200 mm² to 225 mm², about 225 mm² to 250 mm², about 250 mm² to 275 mm², about 275 mm² to 300 mm², or about 300 mm² to 325 mm²). In some embodiments, side length x is about 76 mm long (e.g., at least about 70 mm to 71 mm, 71 mm to 72 mm, 72 mm to 73 mm, 73 mm to 74 mm, 74 mm to 75 mm, 75 mm to 76 mm, 76 mm to 77 mm, 77 mm to 78 mm, 78 mm to 79 mm, or 79 mm to 80 mm long). In some embodiments, side length x' is about 80 mm long (e.g., at least about 75 mm to 76 mm, 76 mm to 77 mm, 77 mm to 78 mm, 78 mm to 79 mm, 79 mm to 80 mm, 80 mm to 81 mm, 81 mm to 82 mm, 82 mm to 83 mm, 83 mm to 84 mm, or 84 mm to 85 mm long). In some embodiments, side length $s_2$ is about 18% of side length x (e.g., at least about 16% to 17%, 17% to 18%, 18% to 19%, 19% to 20%, 20% to 21%, or 21% to 22%). In some embodiments, side length $s_2$ is about 16% of side length x' (e.g., at least about 14% to 15%, 15% to 16%, 16% to 17%, 17% to 18%, 18% to 19%, or 19% to 20%).

Figures 9A, 9B:
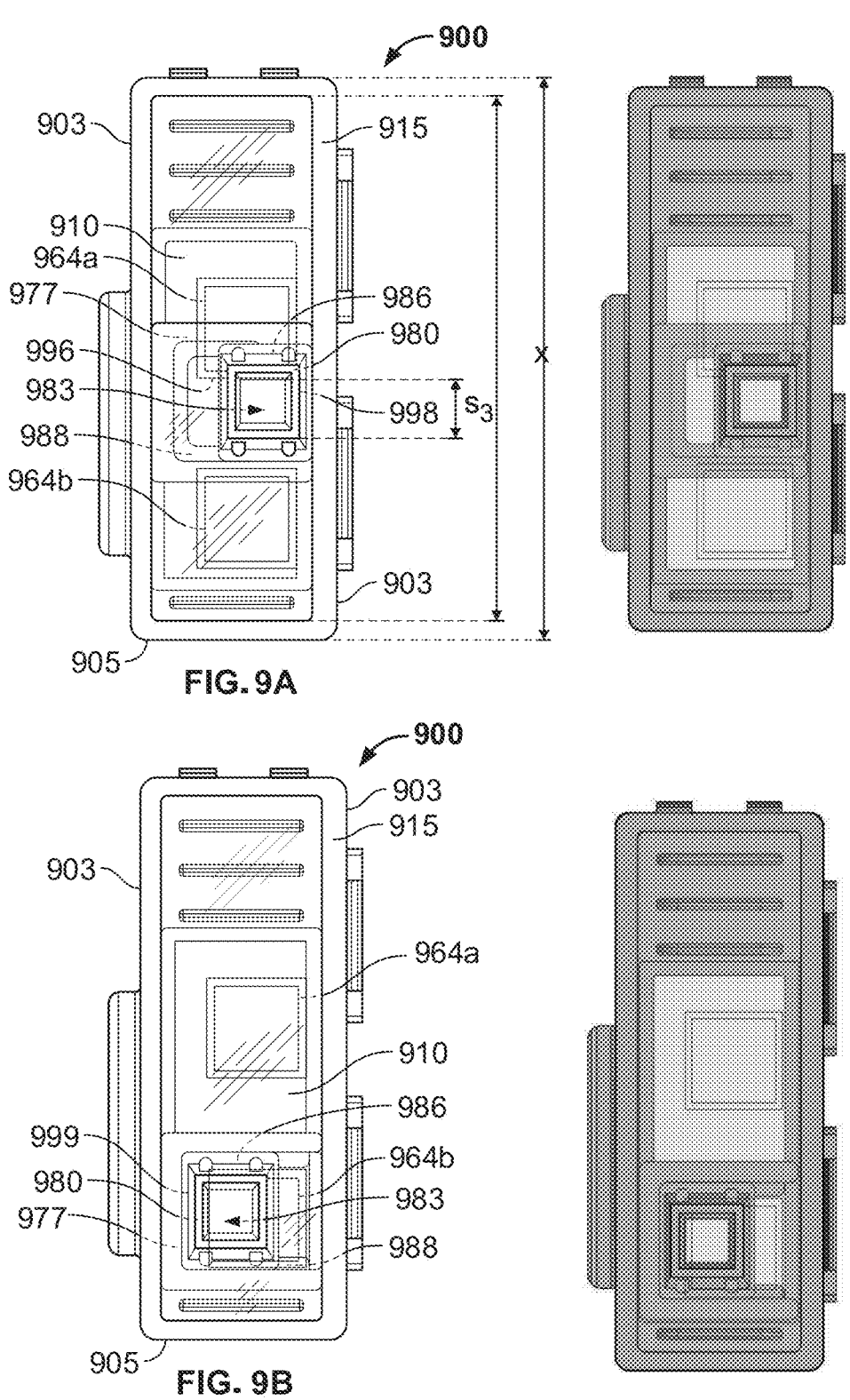
FIGS. 9A-9D are bottom views of an example support device showing an insert positioned at different locations.
Figure 9C:
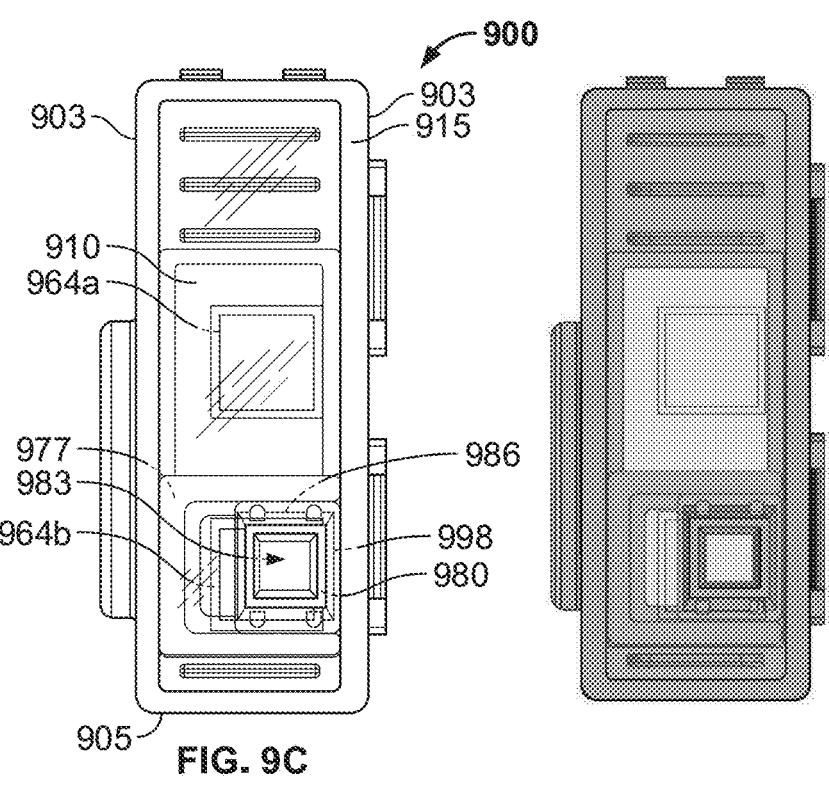
Figure 9D:
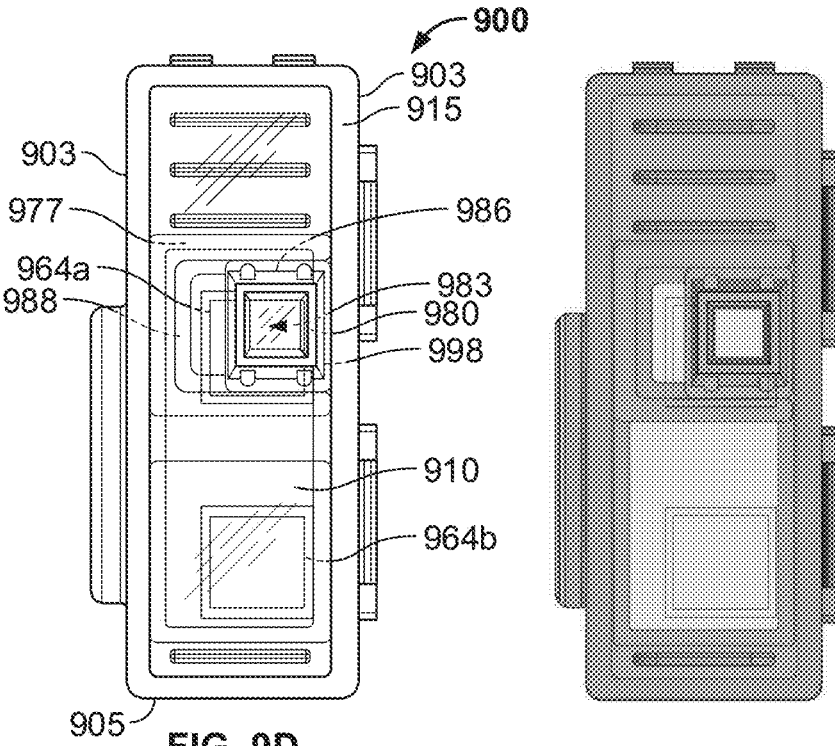

Referring now to FIGS. 9A, 9B, 9C, and 9D, bottom views of a bottom surface 915 of an example support device 900 in a closed position are shown. In an example embodiment, support device 900 includes a slidable insert 977 including a gasket 980 and a gasket opening 983. Slidable insert 977 may be substantially similar in construction and function in several aspects to the inserts 577 discussed above, with reference to FIGS. 5A and 5B. FIGS. 9A, 9B, 9C, and 9D show various example positions of slidable insert 977 and gasket 980 when loaded onto support device 900. For example, slidable insert 977 is shown as positioned over first and second sample regions 964a, 964b and between first and second sample regions 964a, 964b. FIG. 9A shows slidable insert 977 having gasket 980 positioned over an area between first and second sample regions 964a, 964b. A portion of an edge of gasket 980 is shown to overlap an edge 996 of first sample region 964a. Flange 986 is in contact with recess 988 and is shown in a first configuration (e.g., slid to the right side 998 of slidable insert 977). FIG. 9B shows slidable insert 977 having gasket 980 positioned over a portion of second sample region 964b. Flange 986 is in contact with recess 988 and is shown in a second configuration (e.g., slid to the left side 999 of slidable insert 977). Slidable insert 977 does not require to be rotated in order to be switched from a first configuration (e.g., slid to the right side 998 of slidable insert 977) to a second configuration (e.g., slid to the left side 999 of slidable insert 977) as flange 986 can be slid along recess 988 to adjust a position of gasket 980. FIG. 9C shows slidable insert 977 having gasket 980 positioned over a portion of second sample region 964b. Flange 986 is in contact with recess 988 and is shown in a second configuration (e.g., slid to the right side 998 of slidable insert 977). FIG. shows slidable insert 977 having gasket 980 positioned over a portion of first sample region 964a. Flange 986 is in contact with recess 988 and is shown in a second configuration (e.g., slid to the right side 998 of slidable insert 977). The position of slidable insert 977 can be adjusted by removing slidable insert 977 from support device 900 and re-inserting it to a preferred location (e.g., over a first or second sample region 964a, 964b).

In some embodiments, the gasket 980 can be positioned in any suitable direction and/or position on the surface of the substrate 910 such that its gasket opening 983 can provide access to any portion of the surface of the substrate 910. In some embodiments, the area of gasket opening 983 overlaps with at least about 10% to about 100% (e.g., at least about 10% to 20%, 20% to 30%, 30% to 40%, 40% to 50%, 50% to 60%, 60% to 70%, 70% to 80%, 80% to 90%, 90% to 100%) of an area of a sample region. In some embodiments, gasket opening 983 is positioned about 4 mm to about 12 mm (e.g., at least about 4 mm to 5 mm, 5 mm to 6 mm, 6 mm to 7 mm, 7 mm to 8 mm, 8 mm to 9 mm, 9 mm to 10 mm, 10 mm to 11 mm, 11 mm to 12 mm, or more) away from an edge of first side wall 903. In some embodiments, gasket opening 983 is positioned about 7 mm to about 40 mm (e.g., at least about 7 mm to 10 mm, 10 mm to 15 mm, 15 mm to 20 mm, 20 mm to 25 mm, 25 mm to 30 mm, 30 mm to 35 mm, 35 mm to 40 mm, or more) away from an edge of first side wall 905.

In some embodiments, the gasket 980 can be positioned in any suitable direction and/or position on the surface of the substrate 710 such that its gasket opening 983 can provide access to any portion of the surface of the substrate 910.

Gasket opening 983 is square in shape and has side length $s_3$, substrate 910 is rectangular in shape and has side length x, and support device 900 is rectangular in shape and has side length x'. In some embodiments, side length $s_3$ is about 8 mm long (e.g., at least about 6 mm to 7 mm, 7 mm to 8 mm, 8 mm to 9 mm, or 9 mm to 10 mm long). In some embodiments, gasket opening 983 has an area of about 64 $mm^2$ (e.g., about 35 $mm^2$ to 50 $mm^2$, about 50 $mm^2$ to 60 $mm^2$, about 60 $mm^2$ to 70 $mm^2$, about 70 $mm^2$ to 80 $mm^2$, about 80 $mm^2$ to 90 $mm^2$, or about 90 $mm^2$ to 100 $mm^2$). In some embodiments, side length x is about 76 mm long (e.g., at least about 70 mm to 71 mm, 71 mm to 72 mm, 72 mm to 73 mm, 73 mm to 74 mm, 74 mm to 75 mm, 75 mm to 76 mm, 76 mm to 77 mm, 77 mm to 78 mm, 78 mm to 79 mm, or 79 mm to 80 mm long). In some embodiments, side length x is about 80 mm long (e.g., at least about 75 mm to 76 mm, 76 mm to 77 mm, 77 mm to 78 mm, 78 mm to 79 mm, 79 mm to 80 mm, 80 mm to 81 mm, 81 mm to 82 mm, 82 mm to 83 mm, 83 mm to 84 mm, or 84 mm to 85 mm long). In some embodiments, side length $s_3$ is about 10% of side length x (e.g., at least about 5% to 10%, 10% to 11%, 11% to 12%, 12% to 13%, 13% to 14%, or 14% to 15%). In some embodiments, side length $s_3$ is about 10% of side length x' (e.g., at least about 5% to 10%, 10% to 11%, 11% to 12%, 12% to 13%, 13% to 14%, or 14% to 15%).

In an aspect, the present disclosure includes a method of using the support devices or substrate holders described herein. Example methods of using the support devices and substrate holders are shown in FIGS. 12A and 12B. In some embodiments, the method includes mounting a substrate on a base of a substrate holder of a support device. In some embodiments, the methods include positioning one or more removable inserts of the substrate holder on a surface of the substrate. For example, a user may place a sample on a first surface of the substrate and may contact a second surface of the substrate on the base of the substrate holder. One or more removable inserts can be positioned on the first surface of the substrate (e.g., around the sample) in order to provide a liquid-tight and/or a vapor-tight seal around a sample region containing a sample. In some embodiments, the methods include inserting at least a portion of each removable insert in an opening defined by the cover of the substrate holder. In some embodiments, the method includes placing a cover of the substrate holder over the one or more removable inserts and on the base receiving the substrate prior to engaging the cover with the base. In some embodiments, the methods include engaging the cover with the base to secure the substrate and the one or more removable inserts.

In some embodiments, the methods include adjusting or sliding the projection within the opening when the base is not engaged with the cover. For example, a user may adjust or slide the projection within the opening in order to re-position the gasket and create a seal (e.g., a liquid-tight and/or vapor-tight seal) at a different location on the substrate (e.g., a different sample region).

In some embodiments, the methods include using a slidable insert (e.g., slidable insert 577 shown in FIGS. 5A and 5B) and engaging a flange of the slidable insert with a second recess of the slidable insert. In some embodiments, the methods include adjusting or sliding a flange of the slidable insert within the second recess of the slidable insert. For example, the user can further re-position the gasket by sliding or adjusting the flange of slidable insert within the second recess without having to slide or adjust the entire insert (e.g., by adjusting or sliding the projection of the insert within the opening of the cover). In some embodiments, the slidable insert may provide the advantage of re-adjusting the gasket of the slidable insert at smaller ranges than those provided by adjusting or sliding the entire insert. In some embodiments, the methods include engaging at least a portion of each removable insert with a first recess and recess walls of the cover. In some embodiments, the methods include adjusting or sliding the projection of the insert within the opening of the cover when the base is not engaged with the cover.

A support device may be substantially similar in construction and function in several aspects to the support devices 100, 600, 700, 800, and 900 discussed above but can include one or more alternative features of the substrate holders 101, 201, and 601 and/or can include one or more alternative inserts instead of the inserts 172, 173, 372, 473, 577, 672, 772, 873, 977, and 11102. For example, in some embodiments, the alternative features include an alternative movable tab instead of movable tabs 106, 160, 206, 260, 606, and 660 and/or an alternative non-movable tab instead of non-movable tabs 108, 162, 206, 262, 608, and 662.

In some embodiments, the substrate holder may have one or more features that enable the substrate holder to be placed in an unlocked state where the cover rests on the base such that engageable, mateable portions of the cover and base are separated by a gap distance. For example, one or more movable tabs of the cover can be disposed (e.g., rested) on one or more corresponding non-movable tabs of the base when the substrate holder is in the unlocked state. Such an unlocked state configuration can allow a user to manipulate the position of an insert within the cover opening while the cover is positioned over the base without contacting the substrate. Thus, the unlock state advantageously allows a user to visually verify that the insert has been positioned at the desired location over the substrate, while also minimizing the risk of causing potential damage to a biological sample on the substrate.

In some embodiments, the insert can have one or more features that enable the insert to engage with the cover opening. For example, the insert may include one or more insert tabs that can engage at least one of the inner sidewalls of the opening of the cover. In some embodiments, the insert can have one or more features that enable portions of the insert (e.g., the gasket of the insert) to be slid within the insert opening. For example, the insert may include a holding tab configured to engage with the gasket to help secure the gasket during its translation (e.g., sliding). Such slidable configurations of the insert can allow a user to manipulate the position of the insert within the cover opening and further manipulate the position of the gasket within the insert, thereby giving the user the ability to position the gasket over any desired location of the substrate. In some embodiments, the insert can be moved within the cover opening in a direction along a first axis, and the gasket within the insert can be moved in a direction along a second axis that is generally orthogonal to the first axis, which gives the user the ability to position the gasket over a desired location of the substrate along two different axes.

Figure 14:
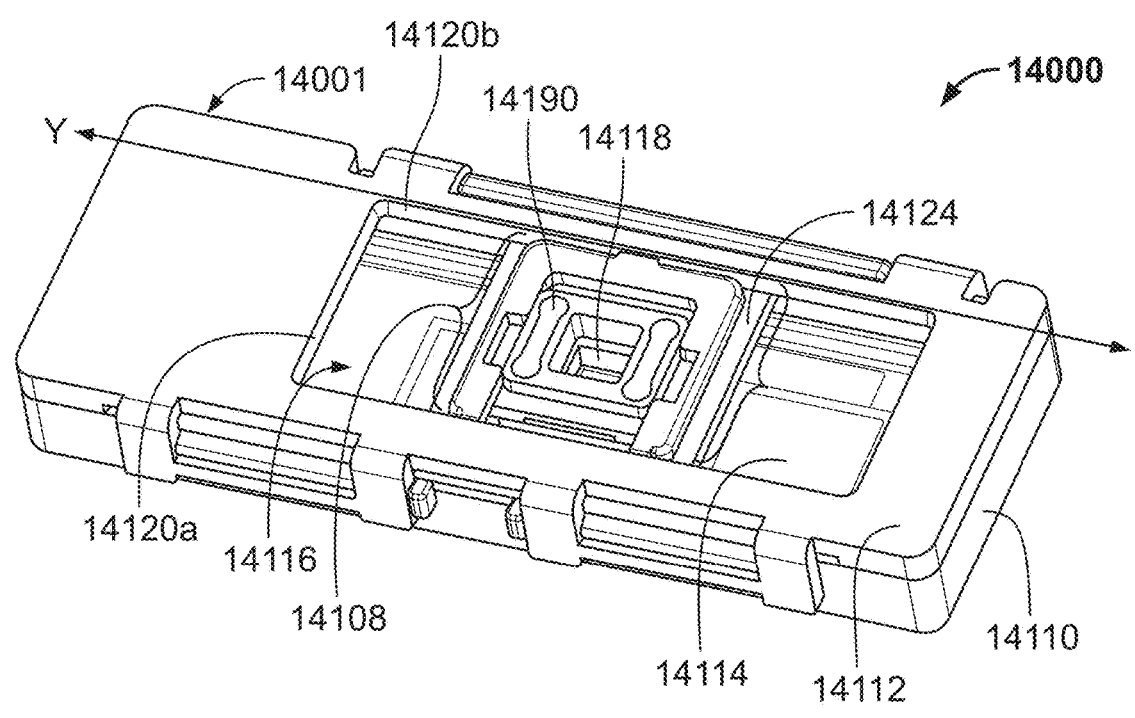
FIG. 14 shows a top perspective view of an example support device in a closed position.

FIGS. 14-19E illustrate an example support devices 14000 and 15000 including example substrate holders 14001, 17001, 18001, and 19001 and removable inserts 14108, 16108, and 19108. In general, any of the support devices can comprise a substrate holder disclosed herein. Referring particularly to FIG. 14, the support device 14000 including a substrate holder 14001 and a substrate 14114 is shown. In some embodiments, the substrate holder 14001 includes a base 14110 and a cover 14112. In some embodiments, the base 14110 is configured to receive a substrate 14114. In some embodiments, the cover 14112 is configured to mateably engage with the base 14110 and further defines an opening 14116. The cover 14112 can mateably engage with base 14110 because the cover 14112 and the base 14110 are both shaped and sized as mating parts that are configured to couple together. In some embodiments, the substrate holder 14001 includes a removable insert 14108 shown inserted within the opening 14116 in FIG. 14. In some embodiments, the opening 14116 is formed by a pair of first inner sidewalls 14120a and a pair of second inner sidewalls 14120b. In some embodiments, the removable insert 14108 is configured to be moved (e.g., translated) within the opening 14116 along a longitudinal axis (i.e., the y-axis) defined by the second inner sidewall 14120b when the base 14110 is not engaged with the cover 14112. In some embodiments, a surface of the cover 14112 includes one or more markings or features (e.g., to provide guidance for the translation of the removable insert with respect to a substrate or a sample on the substrate) (not shown). For example, the surface of the cover 14112 can be marked with a grid of lines (e.g., to provide a reference for a distance that the removable insert has been translated and/or for a position of the removable insert). In some embodiments, such markings or features can be made using techniques including, but not limited to, printing, etching, and/or molding on the surface of the cover 14112 or any other suitable part of the substrate holder (e.g., the base 14110).

In some embodiments, the substrate holder 14001 includes a first removable insert and a second removable insert (see e.g., FIGS. 1A-1B). In some embodiments, the first removable insert defines a first insert opening having an area that is greater than an area of a second insert opening defined by the second removable insert. In some embodiments, the first insert opening has an area that is about equal to an area of the second insert opening. In some embodiments, the substrate holder includes three or more removable inserts.

In some embodiments, the removable insert 14108 includes a gasket insert 14190 that is configured to couple (e.g., slidably couple) with the projection 14124. In some embodiments, the gasket insert 14190 is reversibly coupled with the projection 14124. The gasket insert 14190 includes a gasket 14118. In some embodiments, the gasket 14118 is over-molded with the removable insert 14108 or a component thereof (e.g., with gasket insert 14190) such that the gasket 14118 is coupled with the removable insert 14108 or a component thereof (e.g., with gasket insert 14190). In some embodiments, the gasket 14118 is fixedly attached (e.g., by mechanically means or fixtures) with the gasket insert 14190. In some embodiments, the gasket 14118 is reversibly attached (e.g., slidably coupled) with the gasket insert 14190. In some embodiments, the removable insert 14108 and the gasket 14118 are sized and shaped to accommodate any suitable sample, portion of a substrate, sample region on a substrate, one or more neighboring inserts, or combinations thereof.

Figure 15:
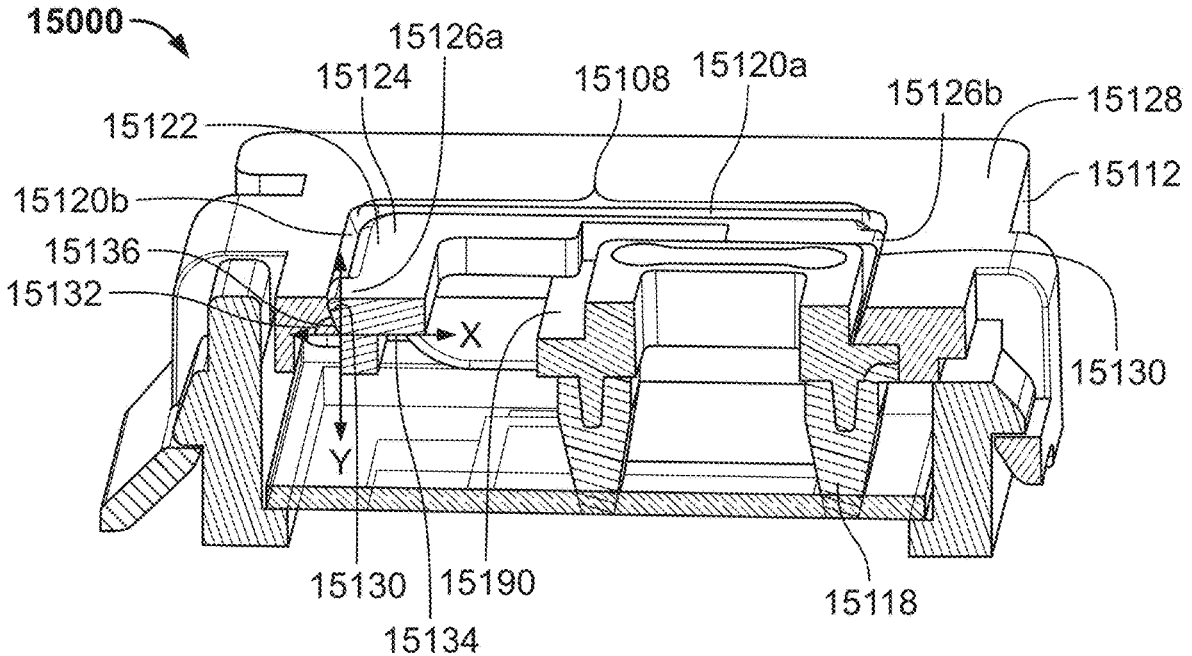
FIG. 15 is a cross-sectional view of the example support device.

FIG. 15 is a cross-sectional view of an exemplary support device 15000 (that is similar to exemplary support device 14000 but shows alternative positioning of a removable insert). In some embodiments, the removable insert 15108 is configured to be received within the opening of the cover 15112. In some embodiments, the removable insert 15108 includes a projection 15124 that is releasably coupled to a gasket insert 15190. In some embodiments, the removable insert 15108 further includes at least a first insert tab 15126a and a second insert tab 15126b extending from opposite sides of the removable insert. In some embodiments, each insert tab 15126a and 15126b extends the surface 15122 of the removable insert 15108 along a same planar direction. In some embodiments, each insert tab 15126a and 15126b is configured to engage with at least one of the inner sidewalls 15120 forming the opening of the cover 15112 such that the surface 15122 of the removable insert 15108 becomes substantially flush or parallel with the face 15128 of the cover 15112. As shown in FIG. 15, the inner sidewalls 15120 (e.g., first inner sidewall 15120a and the second inner sidewall 15120b) of the cover 15112 can be sloped, and the first and second insert tabs 15126a and 15126b can include a sloped surface 15130. In some embodiments, the sloped surfaces 15130 are configured to engage with the sloped, inner sidewalls 15120 of the cover 15112. In some embodiments, the sloped surface 15130 is defined by an angle that is complementary to an angle of the sloped, inner sidewall 15120 of the cover 15112, which facilitates the engagement of both surfaces. As used herein, "an angle that is complementary to another angle" and the term "complementary angles" refer to one or more angles having a sum of about 90 degrees. In some embodiments, the angled surfaces of the inner sidewalls 15120 of the cover 15112 and the sloped surface 15130 of the first and second insert tabs 15126a and 15126b enable the removable insert 15108 to be snap-fit within the opening of the cover 15112.

As shown in FIG. 15, the inner sidewalls 15120 of the cover 15112 can be sloped at an angle 15132 defined relative to a lateral axis (i.e., the x-axis) defined by a bottom surface 15134 of the removable insert 15108. In some embodiments, the angle 15132 ranges from about 1 degree to about 80 degrees (e.g., at least about 1 degree to 5 degrees, 5 degrees to 10 degrees, 10 degrees to 15 degrees, 15 degrees to 20 degrees, 20 degrees to 25 degrees, 25 degrees to 30 degrees, 30 degrees to 35 degrees, 35 degrees to 40 degrees, 40 degrees to 45 degrees, 45 degrees to 50 degrees, 50 degrees to 55 degrees, 55 degrees to 60 degrees, 60 degrees to 65 degrees, 65 degrees to 70 degrees, 70 degrees to 71 degrees, 71 degrees to 72 degrees, 72 degrees to 73 degrees, 73 degrees to 74 degrees, 74 degrees to 75 degrees, 75 degrees to 76 degrees, 76 degrees to 77 degrees, 77 degrees to 78 degrees, 78 degrees to 79 degrees, 79 degrees to 80 degrees, 80 degrees to 81 degrees, 81 degrees to 82 degrees, 82 degrees to 83 degrees, 83 degrees to 84 degrees, 84 degrees to 85 degrees, 85 degrees to 86 degrees, 86 degrees to 87 degrees, 87 degrees to 88 degrees, or 88 degrees to 89 degrees). In some embodiments, the angle 15132 ranges from about 70 degree to about 75 degrees. In some embodiments, the angle 15132 ranges from about 75 degrees to about 80 degrees. In some embodiments, the angle 15132 ranges from about 80 degree to about 85 degrees. In some embodiments, the angle 15132 ranges from about 85 degrees to about 89 degrees.

Furthermore, the sloped surface 15130 of the first and second insert tabs 15126a and 15126b can be sloped at an angle 15136 defined relative to the lateral axis (i.e., the x-axis) and a longitudinal axis (i.e., y-axis). In some embodiments, the angle 15136 is complementary to angle 15132. In some embodiments, the angle 15136 ranges from about 1 degree to about 45 degrees (e.g., at least about 1 degree to 5 degrees, 5 degrees to 10 degrees, 10 degrees to 15 degrees, 15 degrees to 20 degrees, 20 degrees to 25 degrees, 25 degrees to 30 degrees, 30 degrees to 35 degrees, 35 degrees to 40 degrees, 40 degrees to 45 degrees). In some embodiments, the angle 15136 ranges from about 1 degree to about 5 degrees. In some embodiments, the angle 15136 ranges from about 5 degrees to about 10 degrees. In some embodiments, the angle 15136 ranges from about 5 degrees to about 15 degrees. In some embodiments, the angle 15136 ranges from about 5 degrees to about 20 degrees. In some embodiments, the angle 15136 ranges from about 15 degrees to about 20 degrees. In some embodiments, the angle 15132 is complementary to the angle 15136. In some embodiments, the sum of the angles 15132 and 15136 is about 90 degrees.

Figures 16A, 16B, 16C:
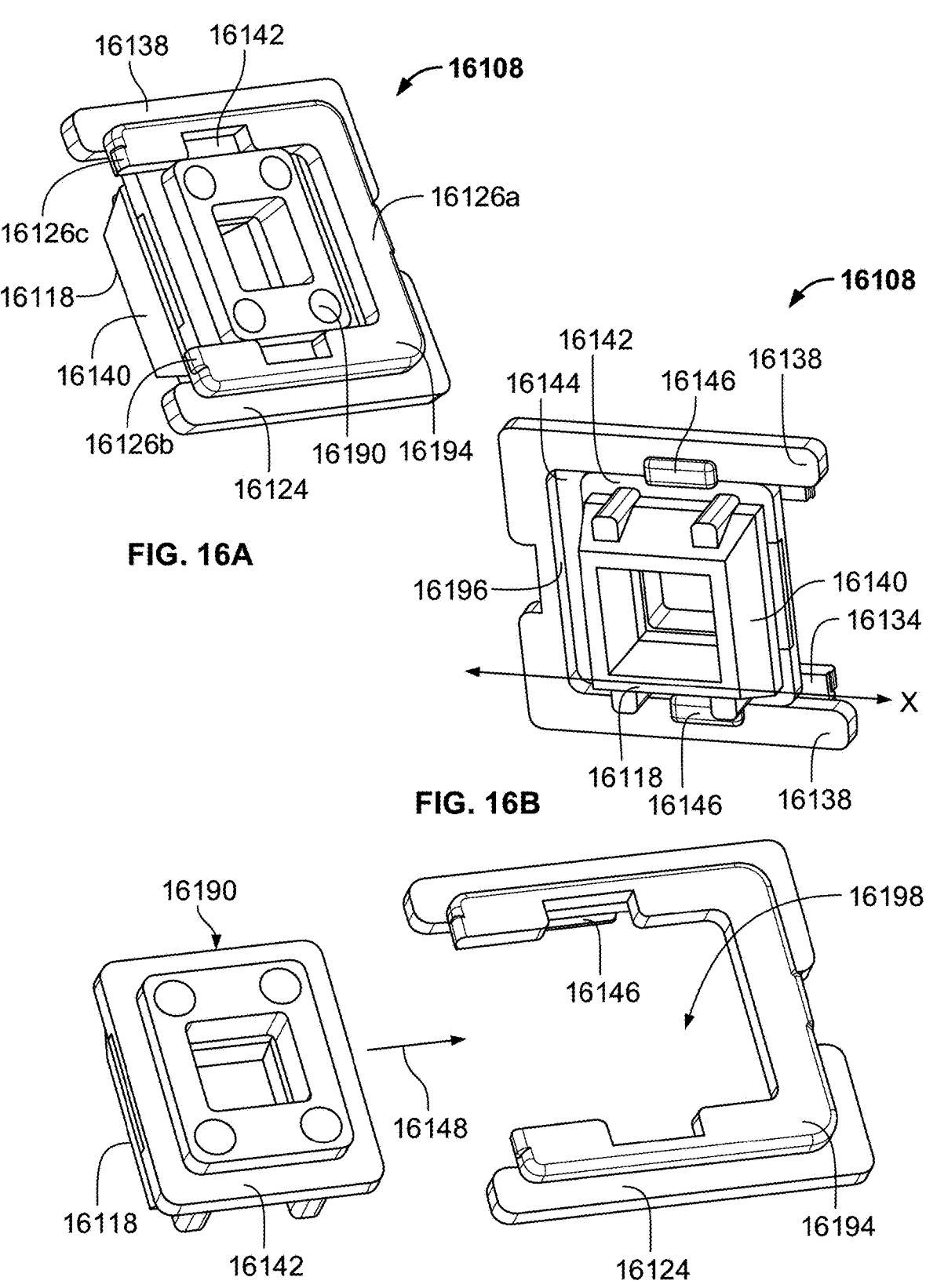
FIG. 16A is a top perspective view of an example slidable insert.
FIG. 16B is a bottom perspective view of the example slidable insert of FIG. 16A.
FIG. 16C is an exploded top view of the example slidable insert of FIG. 16A.

FIGS. 16A-16C show top perspective, bottom perspective, and expanded views of an exemplary removable insert 16108, respectively. In some embodiments, the removable insert 16108 includes a gasket insert 16190 and a projection 16124.

In some embodiments, the gasket insert 16190, which includes the gasket 16118, is configured to couple (e.g., slidably couple) with the projection 16124. When the gasket insert 16190 is coupled with the projection 16124, the gasket insert 16190 can be the innermost component of the removable insert 16108. In some embodiments, the gasket 16118 includes one or more gasket walls 16140 that are fixedly attached to the gasket insert 16190 and further define a perimeter of the gasket 16118. In some embodiments, the gasket 16118 includes four gasket walls 16140. In some embodiments, the gasket insert 16190 includes a flange 16142 that is substantially flat and projects outwardly or at an approximately perpendicular fashion relative to the perimeter defined by the gasket walls 16140.

In some embodiments, the projection 16124 is U-shaped and has a pair of opposing arms 16138. In some embodiments, the projection 16124 includes multiple components. In some embodiments, the projection 16124 includes a frame 16194. In some embodiments, the projection 16124 is a separate component from the frame 16194. In some embodiments, the projection 16124 is coupled (e.g., fixedly coupled or reversibly coupled) to the frame 16194. The projection 16124 may be substantially flat and projects outwardly or at an approximately perpendicular fashion relative to a perimeter defined by the frame 16194. In some embodiments, the frame 16194 includes first, second, and third insert tabs 16126a, 16126b, 16126c that enable the removable insert 16108 to engage (e.g., be snap-fitted) with the opening of the cover, as discussed above (refer to FIG. 15). In some embodiments, the projection 16124 includes a pair of holding tabs 16146 extending inwardly from the arms 16138, into the opening 16198, as shown in FIG. 16B. Furthermore, a bottom surface 16134 of the projection 16124 and inner sidewalls 16196 of the frame 16194 together can define a recess 16144. The recess 16144 can be U-shaped and can be configured to guide the flanges 16142 of the gasket insert 16190 during assembly of the gasket insert 16190 and, optionally, during in-use translation (e.g., sliding) within the projection 16124 to obtain desired positioning over the substrate.

In some embodiments, the gasket insert 16190 is configured to be translated within the recess 16144 of the projection 16124. The flange 16142 of the gasket insert 16190 can be configured to be received by the recess 16144 of the projection 16124, as shown in FIG. 16B. The flange 16142 can be adjustable or slidable within the recess 16144. In some embodiments, the pair of holding tabs 16146 are configured to engage with the flange 16142 when a user inserts and slides the flange 16142 into and within the recess 16144. Thus, the pair of holding tabs 16146 can advantageously secure the removable insert 16108 when a user is adjusting the position of the gasket 16118 within the projection 16124.

In operation, a user can assemble the removable insert 16108 by aligning the gasket insert 16190 with the arms 16138 of the projection and subsequently inserting and pushing the gasket insert 16190 into the projection 16124 in the direction of arrow 16148, as shown in FIG. 16C, such that the flange 16142 can freely slide linearly within the recess 16144 in a substantially frictionless manner and is completely inserted. In some embodiments, the gasket insert 16190 and projection 16124 are composed of a friction-reducing material, such as, for example, polytetrafluoroethylene (PTFE) or other similar friction-reducing material. In some embodiments, the contacting surfaces of the flange 16142 and the recess 16144 comprise or are composed of a friction-reducing material, such as, for example, polytetrafluoroethylene (PTFE) or other similar friction-reducing material. In some embodiments, the contacting surfaces of the flange 16142 and the recess 16144 are coated with a friction-reducing material, such as, for example, polytetrafluoroethylene (PTFE) or other similar friction-reducing material. In some embodiments, the contacting surfaces of the flange 16142 and the recess 16144 comprise or are composed of a high temperature thermoplastic material. Exemplary high temperature thermoplastic materials include, e.g., PPSU (polyphenylsulfone) and silicone elastomers.

Once the gasket insert 16190 is releasably coupled with the projection 16124, the user can adjust the position of the gasket insert 16190 within the projection 16124 by translating the gasket insert 16190 within the projection 16124 along the lateral axis (i.e., the x-axis) defined by the bottom surface 16134 of the removable insert 16108, as illustrated in FIG. 16B. Thus, in some embodiments, the direction of the movement of the internal components of the removable insert is generally orthogonal to the direction of movement of the removable insert 16108 in the opening of the cover of the substrate holder.

Figure 17A:
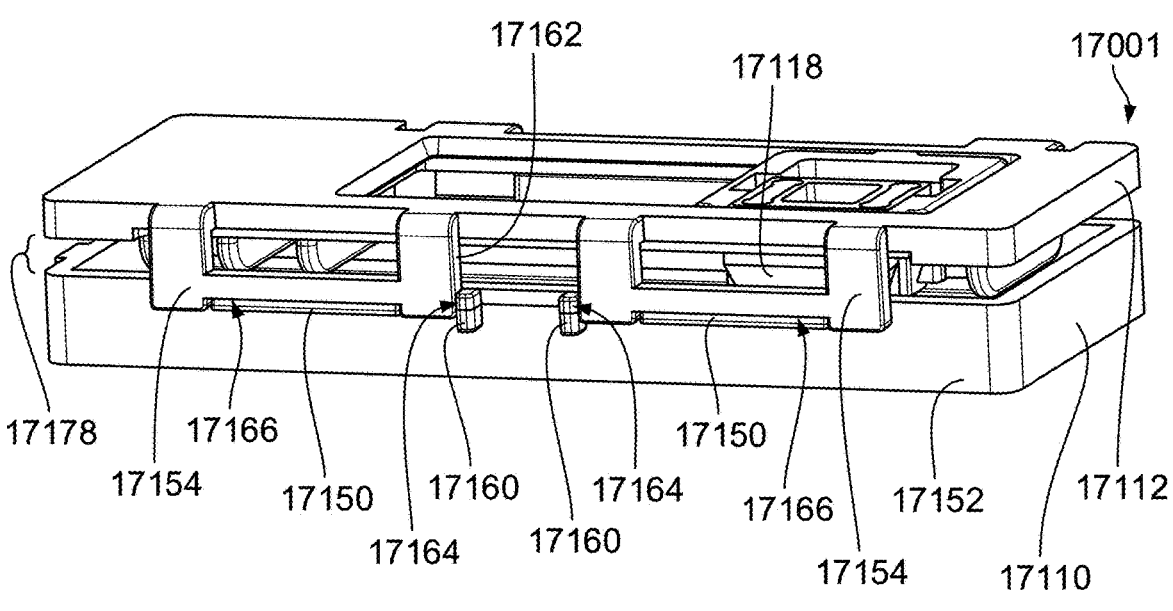
FIG. 17A is a side perspective view of the example support device of FIG. 14 in an unlocked state.
Figure 17B:
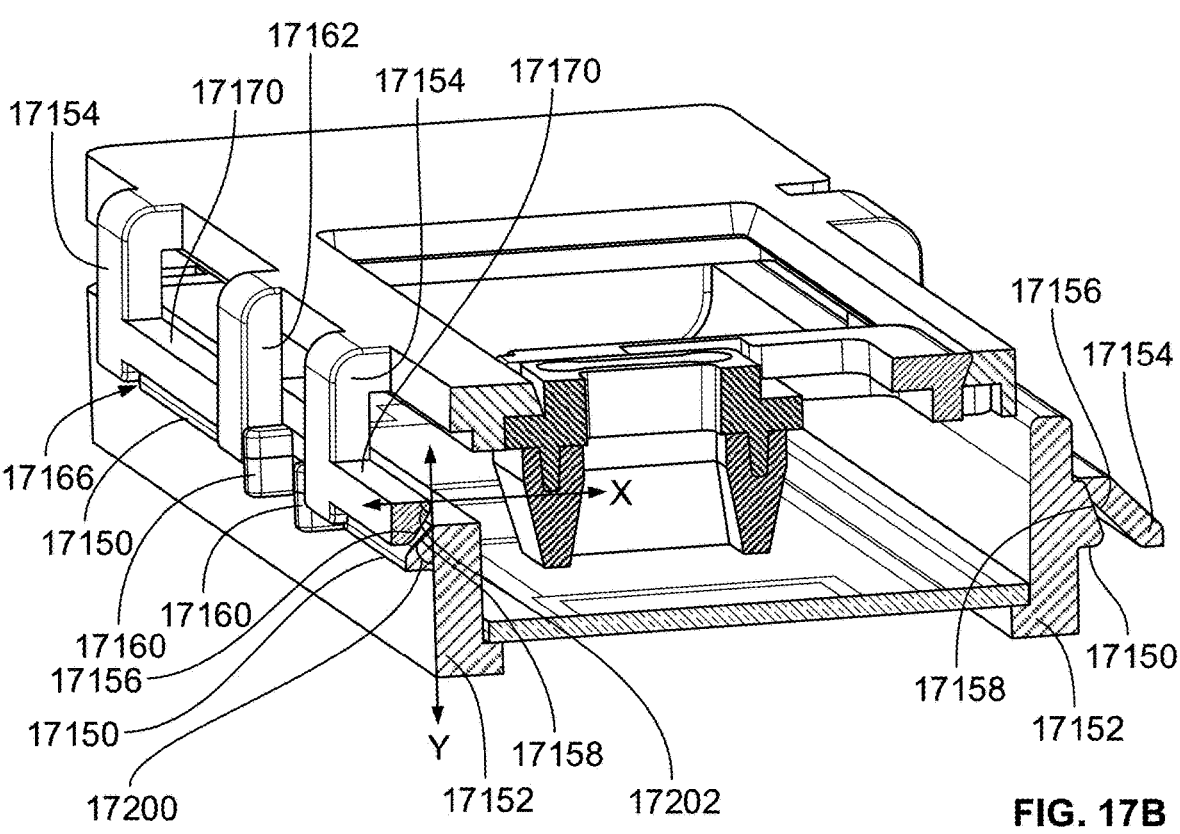
FIG. 17B is a cross-sectional view of the example support device of FIG. 14 in an unlocked state.

FIGS. 17A and 17B show an exemplary substrate holder 17001 in an unlocked state where the cover 17112 of the substrate holder 17001 can rest on top of the base 17110, without engagement of a locking mechanism, such that a gap 17178 is present between mating surfaces of the cover 17112 and the base 17110 to allow a user to visualize the position of the cover components of the substrate holder over the substrate before the user locks the cover 17112 over the base 17110. For example, in some embodiments, the mating surfaces of the cover 17112 and the base 17110 are separated by the gap 17178 in the unlocked state. The gap 17178 can be dimensioned such that the gasket 17118 does not contact a surface of a substrate when the substrate is loaded in the substrate holder 17001 in an unlocked state. In some embodiments, the gap 17178 is dimensionally configured to facilitate movable adjustment of the removable insert within the opening of the cover 17112 in the unlocked state. In some embodiments, the gap 17178 can be about 0.25 mm or more.

The base 17110 can optionally include two guides 17160 that protrude from a sidewall 17152. In some embodiments, each guide 17160 is coupled to the sidewall 17152 and has a substantially rectangular prism shape having lateral faces 17164. In some embodiments, the lateral faces 17164 of the guides 17160 are configured to contact a side surface 17162 of the movable tabs 17154. In some embodiments, in the unlocked state, at least a portion of the lateral faces 17164 of the guides 17160 (e.g., at least about 50% of the surface area of each lateral face 17164) contacts the side surface 17162 of the movable tabs 17154. In some embodiments, in the locked state (refer to FIG. 18A), the entirety of the surface area of the lateral faces 17164 of the guides 17160 can contact the side surface 17162 of the movable tabs 17154. In some embodiments, in the locked state, the majority of the surface area of the lateral faces 17164 of the guides 17160 (e.g., about 90% or more of the surface area of each lateral face 17164) can contact the side surface 17162 of the movable tabs 17154. In some embodiments, the engagement of the cover 17112 and the base 17110 is guided by guides 17160, thereby providing a user an efficient way to visually and tactilely align both components to place the substrate holder in either an unlocked state or a locked state.

In some embodiments, the base 17110 includes non-movable tabs 17150 extending from two opposing sidewalls 17152. In some embodiments, the base 17110 includes three non-movable tabs 17150 extending from two opposing sidewalls 17152. In some embodiments, the cover 17112 includes movable tabs 17154 that are configured to engage with the non-movable tabs 17150 of the base 17110. In some embodiments, the movable tabs 17154 include a first contacting surface 17156 that is configured to engage with a corresponding non-movable tab 17150 of the base 17110. In some embodiments, the first contacting surface 17156 is configured to engage with the corresponding non-movable tab 17150 such that the cover 17112 and the base 17110 are engaged in an unlocked state. In some embodiments, the first contacting surface 17156 of the movable tab 17454 is configured to be positioned and rest on a surface 17158 of the corresponding non-movable tab 17150 in the unlocked state, as shown in FIG. 17B.

As shown in FIG. 17B, the first contacting surfaces 17156 of the movable tabs 17454 can optionally include an angled surface, and the surfaces 17158 of the non-movable tabs 17150 can also optionally be angled. In some embodiments, the first contacting surfaces 17156 are sloped at an angle 17202 defined relative to a lateral axis (i.e., the x-axis) that is defined by a second contacting surface 17170 of movable tab 17454 and relative to a longitudinal axis (i.e., the y-axis) that is orthogonal to the lateral axis. In some embodiments, the angle 17202 ranges from about 1 degree to about 80 degrees (e.g., at least about 1 degree to 5 degrees, 5 degrees to 10 degrees, 10 degrees to 15 degrees, 15 degrees to 20 degrees, 20 degrees to 25 degrees, 25 degrees to 30 degrees, 30 degrees to 35 degrees, 35 degrees to 40 degrees, 40 degrees to 45 degrees, 45 degrees to 50 degrees, 50 degrees to 55 degrees, 55 degrees to 60 degrees, 60 degrees to 65 degrees, 65 degrees to 70 degrees, 70 degrees to 75 degrees, or 75 degrees to 80 degrees).

In some embodiments, the surfaces 17158 are sloped at an angle 17200 defined relative to the longitudinal axis (i.e., the y-axis) that is orthogonal to the lateral axis (i.e., the x-axis). In some embodiments, the angle 17200 ranges from about 1 degree to about 80 degrees (e.g., at least about 1 degree to 5 degrees, 5 degrees to 10 degrees, 10 degrees to 15 degrees, 15 degrees to 20 degrees, 20 degrees to 25 degrees, 25 degrees to 30 degrees, 30 degrees to 35 degrees, 35 degrees to 40 degrees, 40 degrees to 45 degrees, 45 degrees to 50 degrees, 50 degrees to 55 degrees, 55 degrees to 60 degrees, 60 degrees to 65 degrees, 65 degrees to 70 degrees, 70 degrees to 75 degrees, or 75 degrees to 80 degrees).

In some embodiments, the first contacting surfaces 17156 are configured to engage the surfaces 17158 and enable the cover 17112 to remain aligned over the base 17110 (e.g., such that the peripheral edges of the cover 17112 are flush and/or substantially aligned with the peripheral edges of the base 17110) in the unlocked state. In some embodiments, having angled surfaces facilitates engagement of the first contacting surfaces 17156 and the surfaces 17158. Furthermore, the angled surfaces can allow the cover 17112 to be easily fitted (e.g., snap-fitted) onto the base 17110 in the releasably locked state since the first contacting surfaces slide against one another when a normal force is applied to the cover surface. In some embodiments, the movable tabs 17154 include a notch 17166 that is defined, at least in part, by the first contacting surfaces 17156. In some embodiments, the notch 17166 has a substantially rectangular U-shape having a width that is about equal to or greater than a width of the non-movable tab 17150. In some embodiments, the non-movable tab 17150 can be sized to tightly fit within the notch 17166.

Figure 18A:
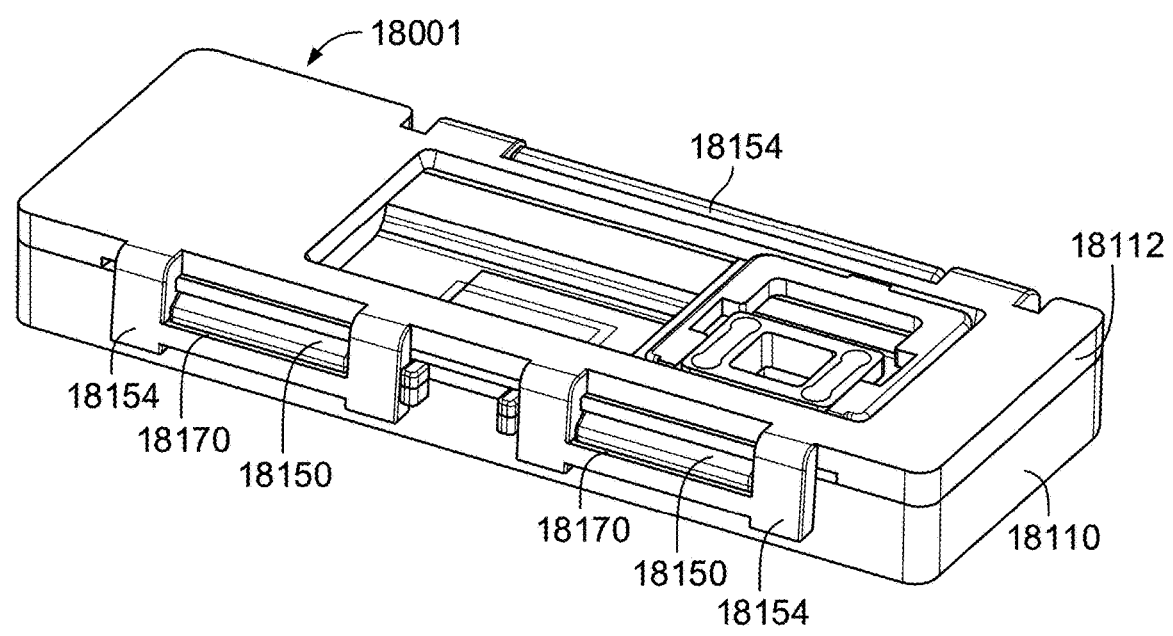
FIG. 18A is a side perspective view of the example support device of FIG. 14 in a locked state.
Figure 18B:
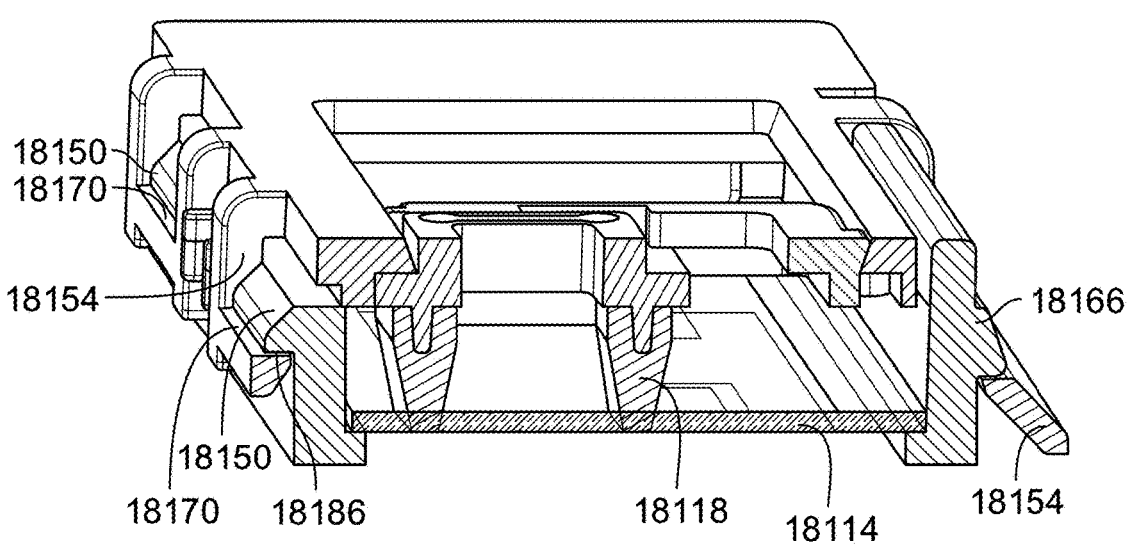
FIG. 18B is a cross-sectional view of the example support device of FIG. 14 in a locked state.

FIGS. 18A and 18B show an exemplary substrate holder 18001 in a releasably locked state where the cover 18112 of the substrate holder 18001 can rest on top of the base 18110, and a locking mechanism is engaged such that there is no gap present between the mating surfaces of the cover 18112 and the base 18110. As shown, the mating surfaces of the cover 18112 and the base 18110 can be in direct contact in the releasably locked state. Furthermore, the peripheral edges of the cover 18112 can be substantially aligned with peripheral edges of the base 18110 the releasably locked state in FIGS. 18A-B. In some embodiments, the gasket 18118 can be configured to form a vapor-tight seal and/or a fluid-tight seal between the gasket 18118 and the substrate 18114 when the substrate 18114 is secured by the substrate holder 18001, and the cover 18112 and the base 18110 are in the releasably locked state.

In some embodiments, the movable tabs 18154 include a second contacting surface 18170 that is configured to engage with a corresponding non-movable tab 18150 of the base 18110 such that the cover 18112 and the base 18110 are engaged in a releasably locked state. In some embodiments, each movable tab 18154 is configured to flex to engage with the non-movable tab 18150 when the cover 18112 and the base 18110 are in the releasably locked state. In some embodiments, when in the releasably locked state, the second contacting surface 18170 engages with a surface 18186 of the non-movable tab 18150, as shown in FIG. 18B. In some embodiments, the second contacting surface 18170 and the surface 18186 are flat surfaces.

Figure 19A:
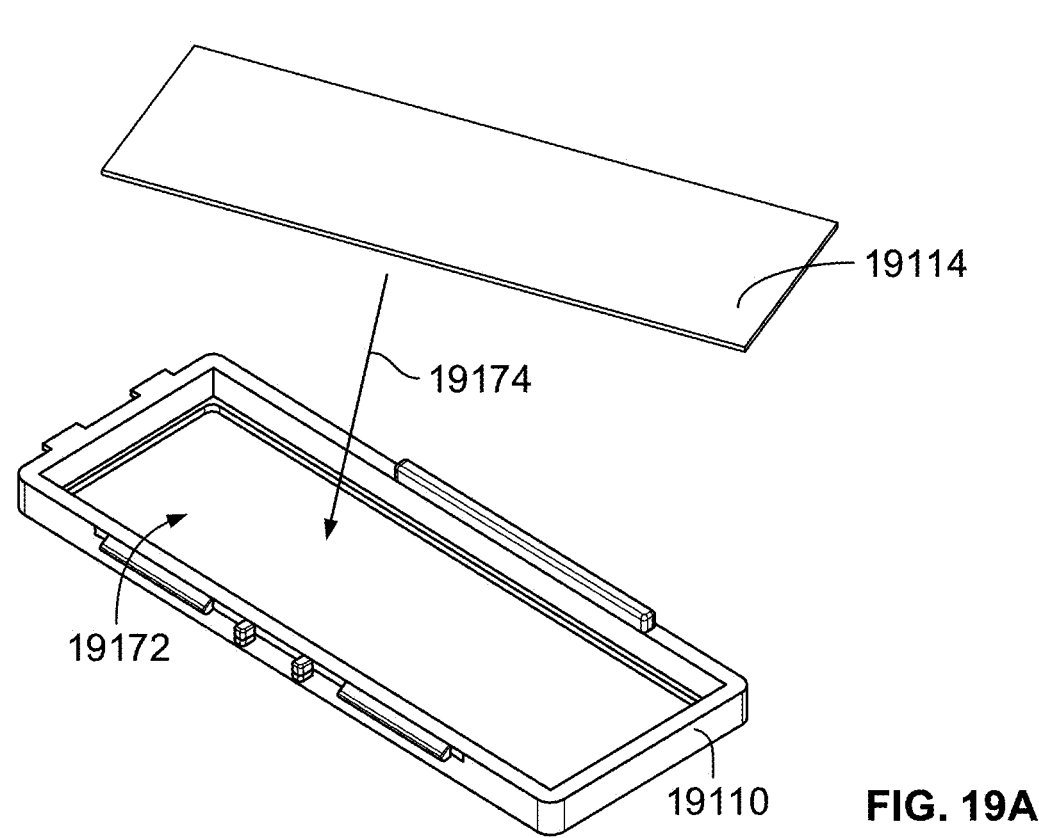
FIGS. 19A-19E illustrate example method steps for loading and securing a substrate and a slidable insert in an example substrate holder.
Figure 19B:
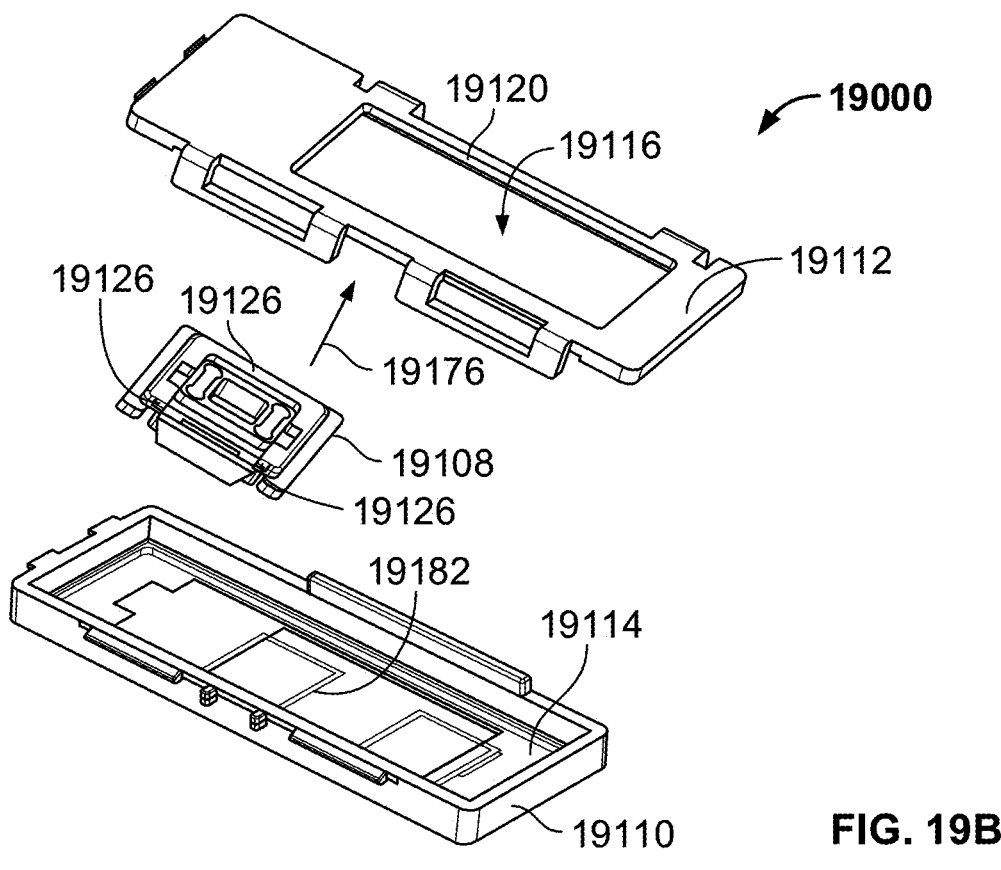

In an aspect, the present disclosure includes a method of using the support devices or substrate holders described herein. FIGS. 19A-19E illustrate example steps for the assembly of the support device 19000. In some embodiments, the methods include mounting a substrate 19114 on a base 19110 of a substrate holder 19001 by inserting the substrate 19114 into a base opening 19172 in the direction of arrow 19174, as shown in FIG. 19A. In some embodiments, the methods include inserting the removable insert 19108 in the opening 19116 of the cover 19112. For example, a user can insert the removable insert 19108 in the opening 19116 through an underside of the cover 19112 in the direction of arrow 19176, as shown in FIG. 19B. In some embodiments, inserting the removable insert 19108 in the opening 19116 includes engaging at least one of the insert tabs 19126 with at least one of the inner sidewalls 19120 of the opening 19116 the cover 19112. In some embodiments, inserting the removable insert 19108 in the opening 19116 includes snap-fitting the removable insert 19108 into the opening 19116 of the cover 19112.

Figure 19C:
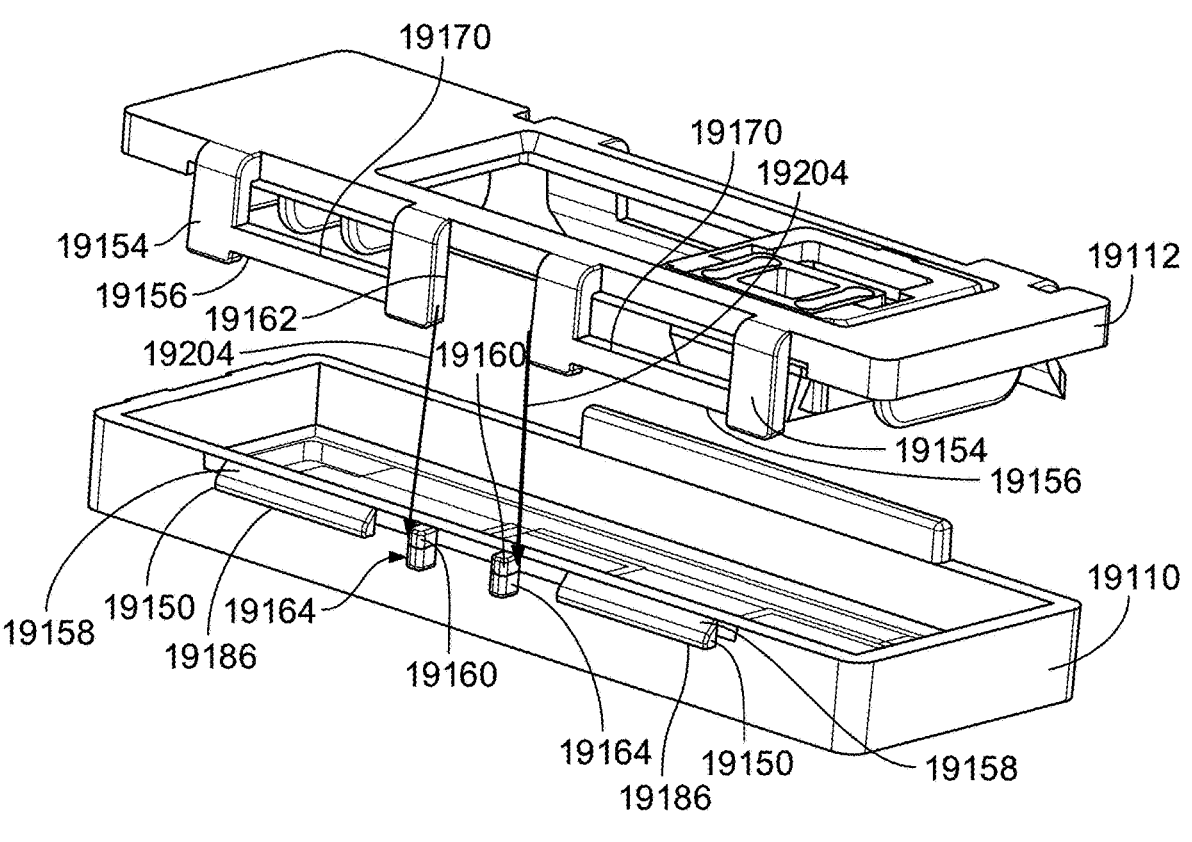
Figure 19D:
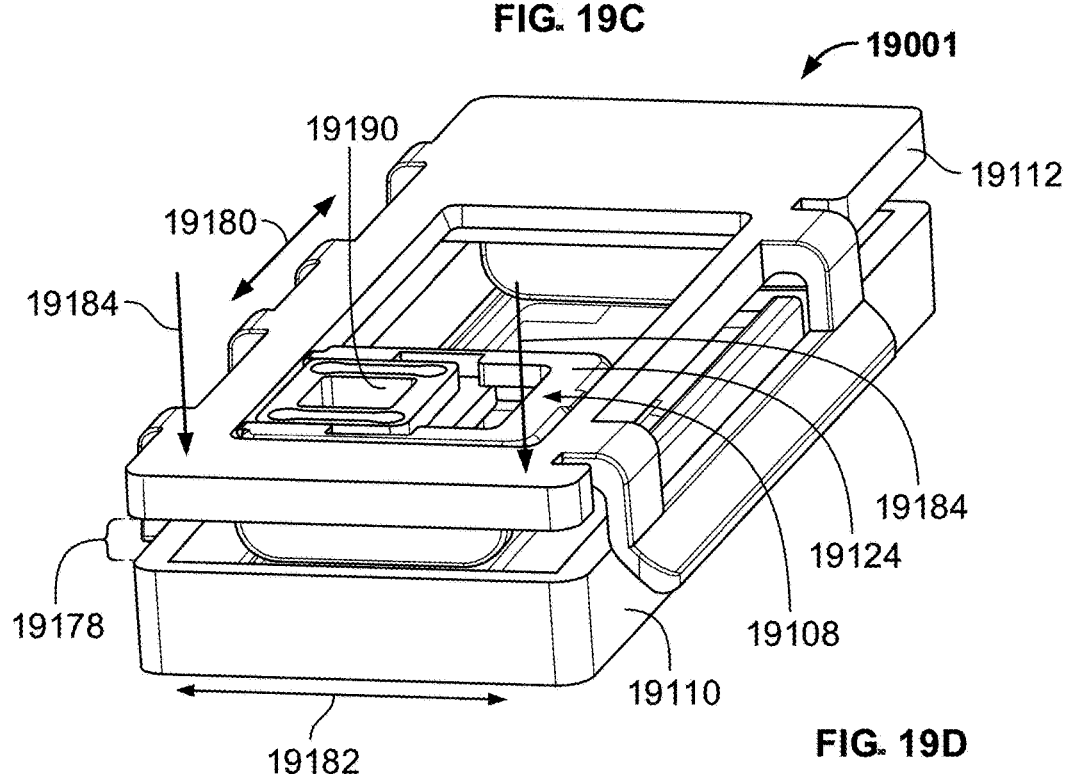

In some embodiments, the methods include placing the cover 19112 over the base 19110 in the direction of arrows 19204 and aligning the cover 19112 and the base 19110 (e.g., such that the peripheral edges of the cover 19112 are flush and/or substantially aligned with the peripheral edges of the base 19110) by contacting a side surface 19162 of the movable tab 19154 to a lateral face 19164 of each guide 19160, as shown in FIG. 19C. In some embodiments, the methods further include engaging the first contacting surface 19156 of the movable tab 19154 with a surface 19158 of the non-movable tab 19150 such that the cover 19112 and the base 19110 are engaged in the unlocked state, as shown in FIG. 19D. In some embodiments, a gap 19178 separating the cover 19112 from the base 19110 in the unlocked state can permit a user to adjust a position of the removable insert 19108 within the opening 19116 of the cover 19112 and to adjust a position of the gasket insert 19190, which includes the gasket, within the projection 19124 without contacting a surface of the substrate with a surface of the gasket. In some embodiments, the removable insert 19108 is slideably coupled with the cover 19112 such that the removable insert 19108 can be translated along sidewalls 19120 (as indicated by arrow 19180). Similarly, in some embodiments, the gasket is slideably coupled with the projection 19124 such that the gasket can be translated along the recess (refer to FIG. 16B) of the projection 19124 (as indicated by indicia 19182).

In some embodiments, the slideably couplings of the removable insert and gasket may advantageously allow a user to adjust the positions of the removable insert and/or gasket without contacting the substrate, which may avoid potentially damaging a biological sample that may be disposed on the surface of the substrate. In some embodiments, the methods include aligning the removable insert with at least a portion of a biological sample disposed on the surface of the substrate. For example, in some embodiments, aligning the removable insert with at least a portion of a biological sample includes aligning the inner edges of the gasket with the periphery of a biological sample and/or with the periphery of an area of interest on the substrate (e.g., a sample region). In some embodiments, aligning the removable insert with at least a portion of a biological sample includes positioning the removable insert such that the gasket walls surround the biological sample or a portion thereof, e.g., when the substrate holder is in a releasably locked state. In some embodiments, the sample region can be marked with indicia that provides a visual marker for identifying the sample location on the substrate (e.g., see indicia 19182 of FIG. 19B).

Figure 19E:
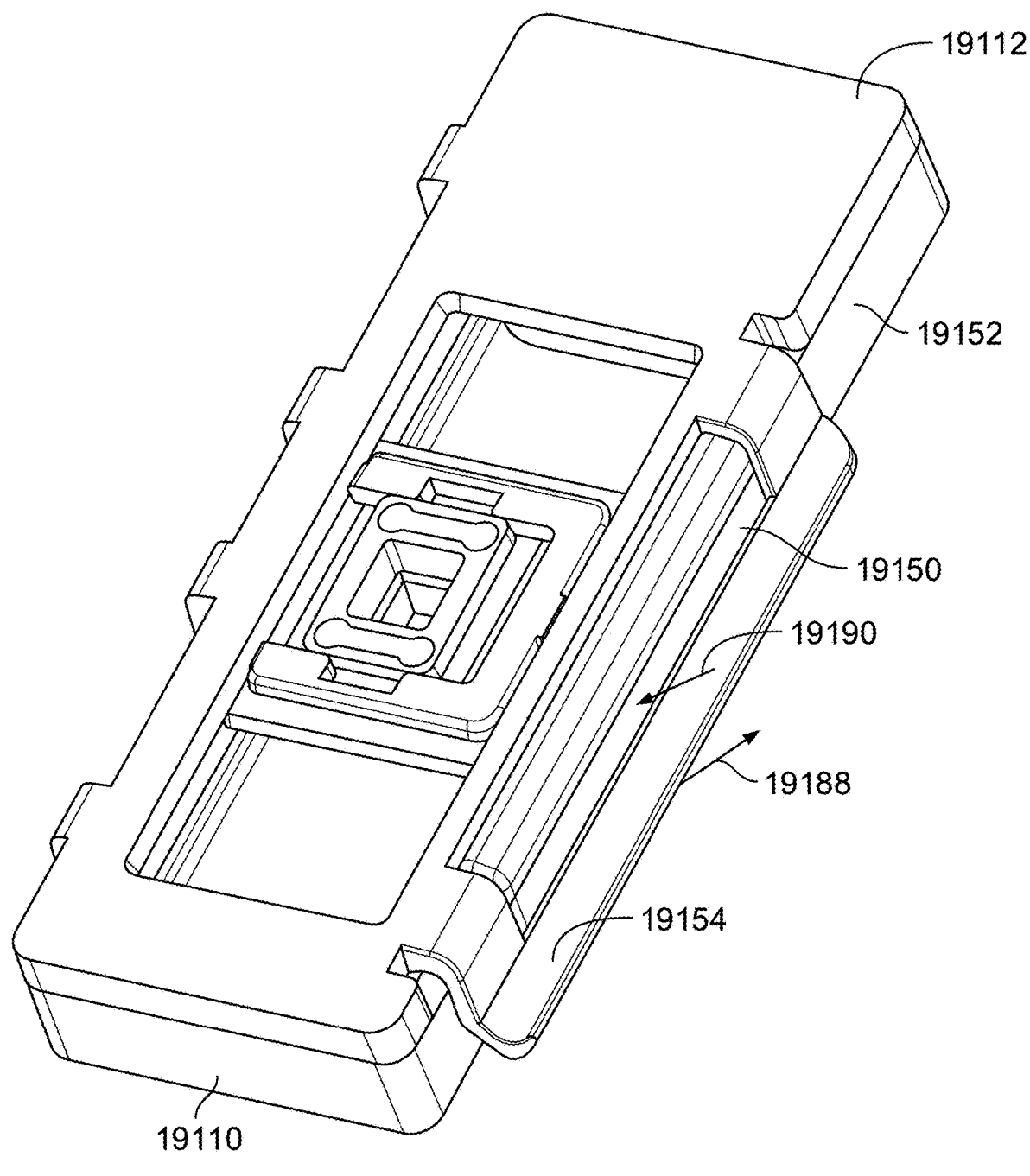

In some embodiments, the methods include applying a force in the direction of arrows 19184 to snap-fit the cover 19112 onto the base 19110 and place the substrate holder 19001 in a releasably locked state, as shown in FIG. 19E. In some embodiments, the substrate holder is placed in a releasably locked state by engaging the second contacting surface 19170 of the movable tab with a surface 19186 of the non-movable tab 19150 (refer to FIG. 19C) such that the cover 19112 and the base 19110 are engaged in the releasably locked state. In some embodiments, to disengage the second contacting surface 19170 from the surface 19186 and change the substrate holder from a releasably locked state to a the unlocked state, a user can flex and lift movable tab 19154 away from a sidewall 19152 of base 19110 (as indicated by arrow 19188) while simultaneously exerting a force on the non-movable tab 19150, in an opposite direction, e.g., towards the sidewall 19152 (as indicated by arrow 19190).

Disclosed herein, in certain embodiments, is a kit including any of the substrate devices of the disclosure, which further include a substrate holder and one or more inserts, and a substrate. In some embodiments, the kit includes any of the substrate holders disclosed herein, any of the inserts disclosed herein, and a substrate. In some embodiments, the kit includes any of the substrate holders described herein and one or more inserts described herein. In some embodiments, the kit includes a first removable insert and a second removable insert (see e.g., FIGS. 1A-1B, FIGS. 16A-16C).

In some embodiments, the first removable insert defines a first insert opening having an area that is greater than an area of a second insert opening defined by the second removable insert. In some embodiments, the first insert opening has an area that is about equal to an area of the second insert opening. Thus, in some embodiments, the kits of the disclosure enable a user to seal off one or more samples disposed on a substrate and having varying sizes. In some embodiments, the kit includes three or more removable inserts.

In some embodiments, the methods include using the support devices or the substrate holders described herein to perform a biological assay on a sample. In some embodiments, the sample is a tissue sample. In some embodiments, the sample is a tissue section. In some embodiments, the tissue section is mounted on a substrate, e.g., a slide. In some embodiments, the sample is a fresh frozen tissue or a formalin-fixed paraffin-embedded (FFPE) tissue. In some embodiments, the support devices described herein are used to support substrates that may include a biological sample (e.g., a frozen tissue or a fixed formalin paraffin embedded (FFPE) tissue). In some embodiments, the support devices described herein can assist a user during various stages of an assay. For example, in some embodiments, various stages of an assay can include staining of a biological tissue (e.g., hematoxylin and/or eosin staining, antibody staining, etc.), imaging of a sample (e.g., microscopy imaging such as high resolution microscopy imaging), de-crosslinking of a sample, de-staining of a sample, washing step of an assay, digestion of a sample, or any combination thereof. In some embodiments, the support devices or substrate holders described herein can be used for in situ hybridization assays. In some embodiments, the support devices or substrate holders described herein can be used for an extraction of an analyte (e.g., a nucleic acid or a protein). For example, the inserts of the support devices described herein may be adjusted and/or slid to accommodate one or more biological samples during these various stages of an assay.

In some embodiments, methods disclosed herein include incubating a sample disposed on a sample region of any of the substrates disclosed herein with one or more assay reagent solutions. In some embodiments, the method includes mounting the substrate on any of the support devices disclosed herein. In some embodiments, the method further includes positioning the substrate and support device on a heating apparatus (e.g., a laboratory heat plate). In some embodiments, the method further includes activating the heating apparatus to transfer heat to the sample (e.g., via the second surface of the substrate that is exposed via the opening of the substrate holder).

In some embodiments, the methods may include using any of the inserts disclosed herein with a support device. For example, the methods may include inserting one or more (e.g., one, two, three, or four) inserts into a base of the support device loaded with a substrate (e.g., a glass slide) such that the gasket comes in contact with a surface of the substrate and creates a seal (e.g., a vapor-tight seal, a liquid-tight seal, and/or an air-tight seal). Furthermore, the methods may include locking the position of an inserted insert (e.g., inserted into a base of a support device) by placing a cover over the inserted insert to close the support device and engaging the one or more locking tabs to lock the support device (e.g., secure the cover to the base). In some embodiments, the methods may include adjusting the position of an insert opening, gasket opening, or port by sliding a projection of an insert on a guiding rail of a recess and locking the position of the insert by closing and locking the support device (e.g., switching from an open position to a closed and locked position of the support device). In some embodiments, the methods may include adjusting the position of an insert opening, gasket opening, or port by sliding a flange of a slidable insert on a recess of a frame of the slidable insert and locking the position of the slidable insert by closing and locking the support device (e.g., switching from an open position to a closed and locked position of the support device).

Figure 10:
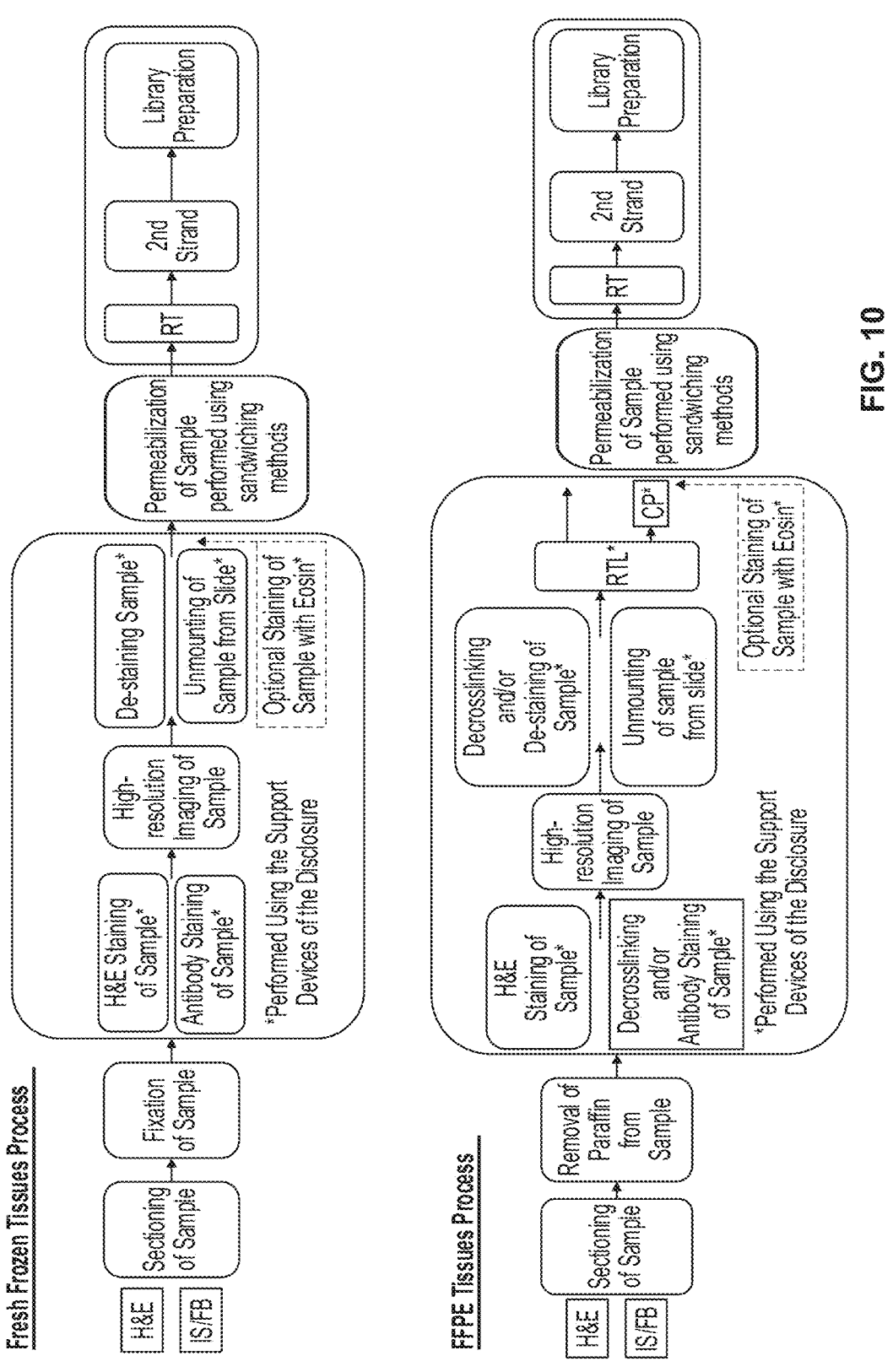
FIG. 10 shows example workflows in which the support devices of the disclosure may be utilized.

FIG. 10 shows an example workflow for processing fresh frozen tissues and an example workflow for processing FFPE tissues using a support device disclosed herein. In some embodiments, the Fresh Frozen Tissues Process and the FFPE Tissues Process include histological, immunostaining, and/or immunohistochemistry steps. For example, in some embodiments, the Fresh Frozen Tissues Process and the FFPE Tissues Process begin with preparing a sample (e.g., a biological sample) by sectioning the sample and fixing the sample (e.g., if the sample is a frozen tissue) on a substrate (e.g., a glass slide), as shown in FIG. 10. In particular embodiments, the processes begin with providing a substrate with a sectioned and fixed tissue sample mounted thereon. Alternatively, in some embodiments, the sample is sectioned, mounted on a substrate, and paraffin is removed from the sample (e.g., if the sample is already fixed and embedded in paraffin), as shown in the FFPE Tissues Process. In particular embodiments, the Fresh Frozen Tissues Process and the FFPE Tissues Process begin with providing a substrate with a FFPE tissue section mounted thereon. Next, in some embodiments, the sample (disposed on the substrate) can be stained with hematoxylin and eosin (H&E) or de-crosslinked and/or immunostained by using the support devices of the disclosure. For example, the substrate including the sample can be inserted in the substrate holder, and a seal formed by the gasket of the insert can create a well enclosing the sample. In some embodiments, the well can hold a volume of liquid (e.g., one or more reagents) used in the processing of the sample (e.g., H&E staining, immunostaining, etc.). In some embodiments, the substrate including the sample is removed from the support device and imaged. Next, the substrate including the sample can be placed back in the substrate holder for the next phase of processing. In example workflows for processing fresh frozen tissue, the next phase of processing can include de-staining, unmounting, eosin staining, or any combination thereof using the support device. In example workflows for processing FFPE tissues, the next phase of processing can include de-staining, de-crosslinking, unmounting from the substrate, or any combination thereof using the support device. Example workflows for processing FFPE tissue can also include RNA-templated ligation (RTL).

In example workflows for fresh frozen tissue and/or FFPE tissue, analytes from the sample can undergo analyte labeling and/or capturing via a capture probe (e.g., spatially-barcoded feature).

Typically, for spatial array-based methods, a substrate functions as a support for direct or indirect attachment of capture probes to features of the array. A "feature" is an entity that acts as a support or repository for various molecular entities used in spatial analysis. In some embodiments, some or all of the features in an array are functionalized for analyte capture. Example substrates are described in Section (II)(c) of WO 2020/176788 and/or U.S. Patent Application Publication No. 2020/0277663. Example features and geometric attributes of an array can be found in Sections (II)(d)(i), (II)(d)(iii), and (II)(d)(iv) of WO 2020/176788 and/or U.S. Patent Application Publication No. 2020/0277663.

Generally, analytes and/or intermediate agents (or portions thereof) can be captured when contacting a biological sample with a substrate including capture probes (e.g., a substrate with capture probes embedded, spotted, printed, fabricated on the substrate, or a substrate with features (e.g., beads, wells) comprising capture probes). As used herein, "contact," "contacted," and/or "contacting," a biological sample with a substrate refers to any contact (e.g., direct or indirect) such that capture probes can interact (e.g., bind covalently or non-covalently (e.g., hybridize)) with analytes from the biological sample. Capture can be achieved actively (e.g., using electrophoresis) or passively (e.g., using diffusion). Analyte capture is further described in Section (II)(e) of WO 2020/176788 and/or U.S. Patent Application Publication No. 2020/0277663.

In some cases, spatial analysis can be performed by attaching and/or introducing a molecule (e.g., a peptide, a lipid, or a nucleic acid molecule) having a capture probe (e.g., a spatial barcode) to a biological sample (e.g., to a cell in a biological sample). In some embodiments, a plurality of molecules (e.g., a plurality of nucleic acid molecules) having a plurality of capture probes (e.g., a plurality of spatial barcodes) are introduced to a biological sample (e.g., to a plurality of cells in a biological sample) for use in spatial analysis. In some embodiments, after attaching and/or introducing a molecule having a capture probe to a biological sample (e.g., spatially-barcoded feature), the biological sample can be physically separated (e.g., dissociated) into single cells or cell groups for analysis. Some such methods of spatial analysis are described in Section (III) of WO 2020/176788 and/or U.S. Patent Application Publication No. 2020/0277663.

Methods of RTL have been described previously. See, e.g., Credle et al., Nucleic Acids Res. 2017 Aug. 21; 45(14):e128. Typically, RTL includes hybridization of two oligonucleotides to adjacent sequences on an analyte (e.g., an RNA molecule, such as an mRNA molecule). In some instances, the oligonucleotides are DNA molecules. In some instances, one of the oligonucleotides includes at least two ribonucleic acid bases at the 3' end and/or the other oligonucleotide includes a phosphorylated nucleotide at the 5' end. In some instances, one of the two oligonucleotides includes a capture domain (e.g., a poly(A) sequence, a non-homopolymeric sequence). After hybridization to the analyte, a ligase (e.g., SplintR ligase) ligates the two oligonucleotides together, creating a ligation product. In some instances, the two oligonucleotides hybridize to sequences that are not adjacent to one another. For example, hybridization of the two oligonucleotides creates a gap between the hybridized oligonucleotides. In some instances, a polymerase (e.g., a DNA polymerase) can extend one of the oligonucleotides prior to ligation.

After ligation, the ligation product is released from the analyte. In some embodiments, the releasing of the connected probe (e.g., a ligation product) includes contacting the biological sample with a reagent medium comprising a permeabilization agent and an agent for releasing the connected probe (e.g., a ligation product), thereby permeabilizing the biological sample and releasing the connected probe (e.g., a ligation product) from the analyte. In some embodiments, the agent for releasing the connected probe (e.g., a ligation product) comprises a nuclease. In some embodiments, the nuclease is an endonuclease. In some embodiments, the nuclease is an exonuclease. In some embodiments, the nuclease includes an RNase. In some embodiments, the RNase is selected from RNase A, RNase C, RNase H, or RNase I. In some embodiments, the reagent medium further includes a permeabilization agent. In some embodiments, the releasing further includes simultaneously permeabilizing the biological sample and releasing the capture agent barcode domain from the analyte. In some embodiments, the permeabilization agent further includes a protease. In some embodiments, the protease is selected from trypsin, pepsin, elastase, or Proteinase K. In some embodiments, the reagent medium further includes a detergent. In some embodiments, the detergent is selected from sodium dodecyl sulfate (SDS), sarkosyl, saponin, Triton X-100™, or Tween-20™. In some embodiments, the reagent medium includes less than 5 w/v % of a detergent selected from sodium dodecyl sulfate (SDS) and sarkosyl. In some embodiments, the reagent medium includes as least 5% w/v % of a detergent selected from SDS and sarkosyl. In some embodiments, the reagent medium does not include SDS or sarkosyl. In some embodiments, the reagent medium comprises one or more of sodium dodecyl sulfate (SDS), proteinase K, pepsin, N-lauroylsarcosine, RNAse, and a sodium salt thereof. The released ligation product can then be captured by capture probes (e.g., instead of direct capture of an analyte) on an array, optionally amplified, and sequenced, thus determining the location and optionally the abundance of the analyte in the biological sample.

During analysis of spatial information, using, for example, capture probes, sequence information for a capture probe (e.g., a spatial barcode) associated with an analyte is obtained, and the sequence information can be used to provide information about the spatial distribution of the analyte in the biological sample. Various methods can be used to obtain the spatial information. In some embodiments, specific capture probes and the analytes they capture are associated with specific locations in an array of features on a substrate. For example, specific capture probes can be associated with specific array locations prior to array fabrication, and the sequences of the capture probes can be stored (e.g., in a database) along with specific array location information, so that each capture probe uniquely maps to a particular array location.

Alternatively, specific capture probes can be deposited at predetermined locations in an array of features during fabrication such that at each location, only one type of capture probe is present so that capture probes are uniquely associated with a single feature of the array. Where necessary, the arrays can be decoded so that capture probes are uniquely associated with array feature locations, and this mapping can be stored as described above.

When sequence information is obtained for capture probes and/or analytes during analysis of spatial information, the locations of the capture probes and/or analytes can be determined by referring to the stored information that uniquely associates each capture probe with an array feature location. In this manner, specific capture probes and captured analytes are associated with specific locations in the array of features. Each array feature location represents a position relative to a coordinate reference point (e.g., an array location, a fiducial marker) for the array. Accordingly, each feature location has an "address" or location in the coordinate space of the array.

In some embodiments, both "Fresh Frozen Tissues" and "FFPE Tissues" Processes include an optional step of staining the sample with eosin after de-staining and unmounting ("Fresh Frozen Tissues" Process) or after the addition of capture probes (CP) ("FFPE Tissues" Process) by using the support device of the disclosure. Next, in some embodiments, the sample is permeabilized by adding one or more suitable reagents (e.g., an RNAse, proK, and/or sarkosyl) prior to subjecting the sample to reverse transcription, second strand cDNA synthesis, and preparation of the cDNA library preparation.

Sandwich Processes

In some embodiments, the permeabilization step occurs during a sandwiching process. In some embodiments, the sandwiching process includes sandwiching together a first substrate (e.g., any of the substrates disclosed described herein) with a second substrate having an array with capture probes.

(i) High Level Summary of Sandwiching Process

Figure 13:
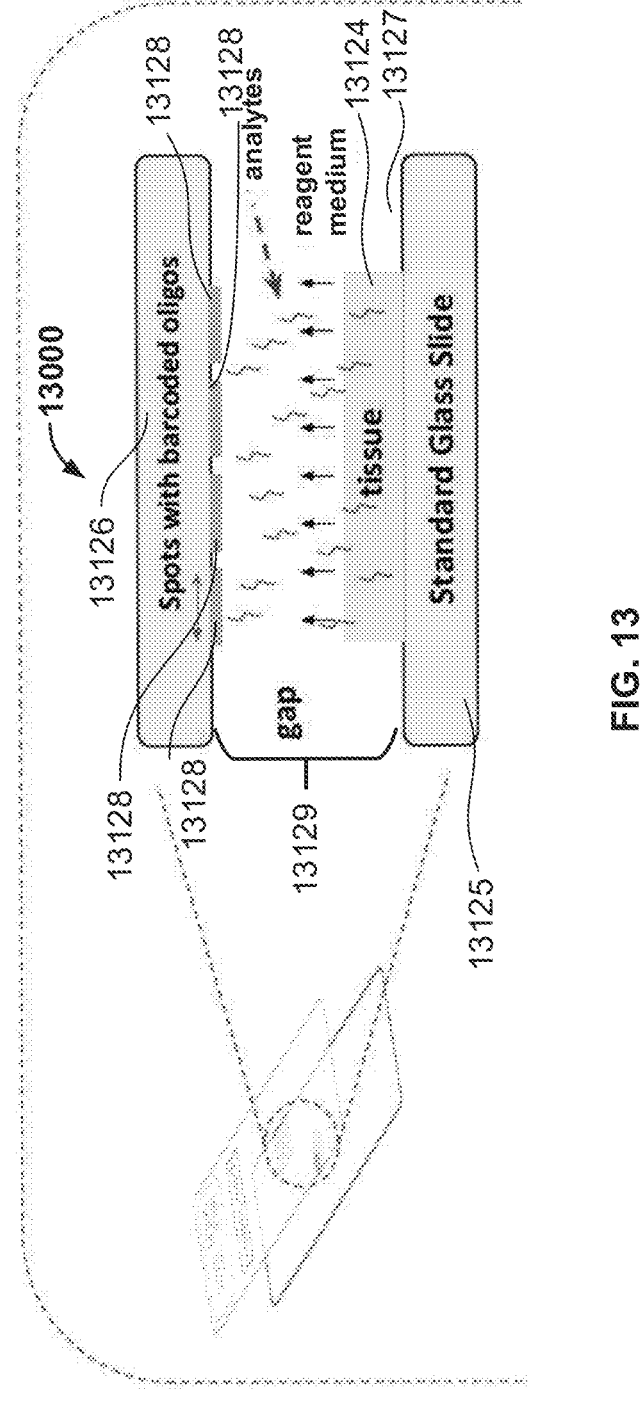
FIG. 13 shows an exemplary schematic diagram depicting a sandwiching process.

FIG. 13 is a schematic diagram depicting an example sandwiching process 13000 between a first substrate comprising a biological sample (e.g., a tissue section 13124 on a slide 13125) and a second substrate comprising a spatially barcoded array, e.g., a slide 13126 that is populated with spatially-barcoded capture probes 13128. During the example sandwiching process, the first substrate is aligned with the second substrate, such that at least a portion of the biological sample is aligned with at least a portion of the array (e.g., aligned in a sandwich configuration). As shown, the slide 13126 is in a superior position to the slide 13125. In some embodiments, the slide 13125 may be positioned superior to the slide 13125. In some embodiments, the first and second substrates are aligned to maintain a gap or separation distance 13129 between the two substrates. When the first and second substrates are aligned, one or more analytes are released from the biological sample and actively or passively migrate to the array for capture. In some embodiments, the migration occurs while the aligned portions of the biological sample and the array are contacted with a reagent medium 13127. The released one or more analytes may actively or passively migrate across the gap 13129 via the reagent medium 13127 toward the capture probes 13128 and be captured by the capture probes 13128.

(ii) Sandwiching Device/Array Alignment Device

In some embodiments, an array alignment device is used in the sandwiching processes. In some embodiments, the first and second substrates are placed in the array alignment device configured to align the first and second substrates (e.g., a biological sample and an array). In some embodiments, the array alignment device includes a first and second member that receive a first and second substrate, respectively. The device can include an alignment mechanism that is connected to at least one of the members and aligns the first and second members. Thus, the array alignment device can advantageously align the first substrate and the second substrate and any samples, capture probes (e.g., barcoded probes), and/or permeabilization reagents that may be on the surface of the first and second substrates. Example devices and example array alignment devices are described in PCT Patent Application Publication No. WO 2020/123320, which is incorporated by reference in its entirety. Other example array alignment devices are described in PCT Patent Application Publication No. WO 2021/252747 filed Jun. 10, 2021, and PCT/US2021/050931 filed Sep. 17, 2021, which are incorporated by reference in their entirety.

While this specification contains many specific implementation details, these should not be construed as limitations on the scope of any technology or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any suitable sub-combination. Moreover, although features may be described herein as acting in certain combinations and/or initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Particular embodiments of the subject matter have been described. Other embodiments are within the scope of the following claims.

Kits

In some embodiments, also provided herein are kits that include one or more substrate holders described herein and instructions for performing any one of the methods disclosed herein. In some instances, the kit includes one or more assay reagents. In some embodiments, the assay reagents include one or more of a reagent medium described elsewhere herein. For example, in some embodiments, the assay reagent comprises a permeabilization agent. In some embodiments, the permeabilization agent further includes a protease. In some embodiments, the protease is selected from trypsin, pepsin, elastase, or Proteinase K. In some embodiments, the reagent medium further includes a detergent. In some embodiments, the detergent is selected from sodium dodecyl sulfate (SDS), sarkosyl, saponin, Triton X-100™ or Tween-20™. In some embodiments, the reagent medium includes less than 5 w/v % of a detergent selected from sodium dodecyl sulfate (SDS) and sarkosyl. In some embodiments, the reagent medium includes as least 5% w/v % of a detergent selected from SDS and sarkosyl. In some embodiments, the reagent medium does not include SDS or sarkosyl. In some embodiments, the reagent medium comprises one or more of sodium dodecyl sulfate (SDS), proteinase K, pepsin, N-lauroylsarcosine, RNAse, and a sodium salt thereof.

In some instances, the kit includes a plate. In some embodiments, the plate has a first surface and a second surface. In some embodiments, the first surface includes one or more platforms configured to receive the substrate holder. In some embodiments, the platform is a raised, level portion of the first surface of the plate. In some embodiments, the second surface is configured to be received by a heating device (e.g., a thermocycler). In some embodiments, the plate is generally formed of thermally conductive material to facilitate heat transfer between the heating device and the substrate holder. In some embodiments, the plate can be composed of a metal such as, but not limited to, aluminum and/or stainless steel. In some embodiments, the kit includes one or more magnetic separators. In some embodiments, the one or more magnetic separators may be used for separation of paramagnetic and ferromagnetic particles from a suspension or a biological sample.

Systems

In some embodiments, also provided herein are systems that include one or more substrate holders described herein and a substrate comprising a biological sample. In some embodiments, the system further includes one or more assay reagents. In some embodiments, the one or more assay reagents is any of the assay reagents described elsewhere herein. In some embodiments, the system further includes a heating device. In some embodiments, the heating device is a thermocycler or a thermal cycler. In some embodiments, method is disclosed and discussed and a number of systems, apparatuses, or methods are discussed, each and every combination and permutation of the systems, apparatuses, and the methods are specifically contemplated unless specifically indicated to the contrary. Likewise, any subset or combination of these is also specifically contemplated and disclosed.

Other aspects, advantages, and modifications are within the scope of the following claims.

---

SEQUENCE LISTING

```
Sequence total quantity: 3
SEQ ID NO: 1            moltype = AA   length = 16
FEATURE                 Location/Qualifiers
source                  1..16
                        mol_type = protein
                        organism = synthetic construct
SEQUENCE: 1
RADARADARA DARADA                                          16

SEQ ID NO: 2            moltype = AA   length = 16
FEATURE                 Location/Qualifiers
source                  1..16
                        mol_type = protein
                        organism = synthetic construct
SEQUENCE: 2
AEAEAKAKAE AEAKAK                                          16

SEQ ID NO: 3            moltype = AA   length = 12
FEATURE                 Location/Qualifiers
source                  1..12
                        mol_type = protein
                        organism = synthetic construct
SEQUENCE: 3
KLDLKLDLKL DL                                              12
```

--- the heating device is a device used to control a temperature of a biological sample (e.g., a biological sample on a substrate) in discrete, pre-programmed steps. In some embodiments, the heating device increases and decreases the temperature of a biological sample. In some embodiments, the heating device is used to amplify segments of nucleic acids (e.g., DNA and/or RNA) via polymerase chain reaction (PCR). In some embodiments, the heating device controls the temperature of a biological sample on a substrate that is loaded in any of the substrate holders described herein.

OTHER EMBODIMENTS

It is to be understood that while the invention has been described in conjunction with the detailed description thereof, the foregoing description is intended to illustrate and not limit the scope of the invention, which is defined by the scope of the appended claims.

Disclosed are systems, apparatuses (e.g., devices), and methods that can be used for, can be used in conjunction with, can be used in preparation for, or are products of the disclosed methods. These and other systems, apparatuses, and methods are disclosed herein, and it is understood that combinations, subsets, interactions, groups, etc. of these systems, apparatuses, and methods are disclosed. That is, while specific reference to each various individual and collective combinations and permutations of these systems, apparatuses and methods may not be explicitly disclosed, each is specifically contemplated and described herein. For example, if a particular system, apparatus, or a particular

What is claimed is:

1. A method comprising:

mounting a substrate on a base of a substrate holder, the substrate comprising a sample region supporting at least one sample, the base comprising a first base tab extending laterally outward from and along a first side of a perimeter of the base and a second base tab extending laterally outward from and along a second side of the perimeter of the base, the second side of the perimeter of the base arranged opposite the first side of the perimeter of the base;

releasably locking a cover of the substrate holder to the base, the cover comprising a first cover tab extending laterally outward from and along a first side of a perimeter of the cover and a second cover tab extending laterally outward from and along a second side of the perimeter of the cover, the second side of the perimeter of the cover being arranged opposite the first side of the perimeter of the cover, wherein releasably locking the cover to the base comprises releasably locking the first cover tab to the first base tab and the second cover tab to the second base tab thereby forming a well around the sample region; and after releasably locking the cover to the base, contacting the at least one sample with a reagent by adding the reagent to the well through an opening arranged within the perimeter of the cover.

2. The method of claim 1, wherein:

the first cover tab and the second cover tab are movable relative to the perimeter of the cover, and the first base tab and the second base tab are non-movable relative to the perimeter of the base, and releasably locking the first cover tab to the first base tab and the second cover tab to the second base tab comprises:

causing the first cover tab to move relative to the perimeter of the cover to releasably lock to the first base tab and the second cover tab to move relative to the perimeter of the cover to releasably lock to the second base tab.

3. The method of claim 1, wherein the second cover tab is centered along a length of the opening.

4. The method of claim 1, wherein the substrate is a glass slide.

5. The method of claim 1, wherein releasably locking the cover to the base comprises:

aligning the opening with the sample region.

6. The method of claim 1, wherein:

releasably locking the cover to the base comprises:
engaging the cover and the base to secure the substrate in place.

7. The method of claim 6, wherein:

the cover comprises one or more ribs extending along a surface of the cover; and engaging the cover and the base to secure the substrate in place comprises:
engaging the one or more ribs of the cover with the substrate.

8. The method of claim 1, wherein forming the well comprises:

forming a seal on the substrate around the well.

9. The method of claim 1, wherein:

the second side of the perimeter of the cover comprises a single tab corresponding to the second cover tab.

10. The method of claim 1, wherein:

the first cover tab and the second cover tab each comprises a C-shaped structure.

11. The method of claim 1, wherein:

the base comprises a retaining surface extending along the perimeter of the base; and mounting the substrate on the base comprises:
securing the substrate to the base with the retaining surface.

12. The method of claim 1, wherein:

contacting the at least one sample with the reagent comprises:
permeabilizing at least a portion of the at least one sample via a permeabilization agent of the reagent.

13. The method of claim 1, wherein:

the first cover tab, the second cover tab, and the cover are integrally joined, and the first base tab, the second base tab, and the base are integrally joined.

14. The method of claim 12, wherein:

after permeabilizing at least the portion of the at least one sample via the permeabilization agent of the reagent, performing a spatial analysis of analytes in the at least one sample.

15. The method of claim 1, wherein the sample region comprises a plurality of spatially-barcoded capture probes.

16. The method of claim 15, wherein the at least one sample comprises a tissue section.

17. The method of claim 12, wherein:

after permeabilizing at least the portion of the at least one sample via the permeabilization agent of the reagent, performing reverse transcription, second strand cDNA synthesis, and preparation of a cDNA library.

18. The method of claim 17, wherein the sample region comprises a plurality of spatially-barcoded capture probes.

19. The method of claim 18, wherein the at least one sample comprises a tissue section.

20. The method of claim 1, wherein the opening is at least 90% as large as a total surface area of the sample region.

21. The method of claim 1, wherein the substrate holder comprises a hinge pivotally coupling the cover to the base, wherein releasably locking the cover to the base further comprises rotating the cover about the hinge.

22. The method of claim 21, wherein the base has a short side and a long side, the cover has a short side and a long side, and the hinge pivotally couples the short side of the base to the short side of the cover.

23. The method of claim 1, wherein the first cover tab comprises a contacting surface that is complementary to, and configured to engage with, the first base tab, wherein releasably locking the cover to the base further comprises engaging the contacting surface of the first cover tab with the first base tab.

24. A method comprising:

mounting a substrate on a base of a substrate holder, the substrate comprising a sample region supporting at least one sample, and the base comprising:
a bottom portion extending from a first end to a second end;
a first side wall extending from the first end of the bottom portion;
a second side wall extending from the second end of the bottom portion;
a first base tab extending laterally outward from and along at least a portion of an outer surface of the first side wall; and
a second base tab extending laterally outward from and along at least a portion of an outer surface of the second side wall, the second side wall arranged opposite the first side wall;

releasably locking a cover of the substrate holder to the base, the cover comprising:
a main body extending from a first end to a second end, the second end being arranged opposite the first end;
a first cover tab extending laterally outward from and along at least a portion of the first end; and
a second cover tab extending laterally outward from and along at least a portion of the second end, wherein releasably locking the cover to the base comprises releasably locking the first cover tab to the first base tab and the second cover tab to the second base tab thereby forming a well around the sample region; and contacting the at least one sample with a reagent by adding the reagent to the well through an opening formed in the cover.

25. The method of claim 24, wherein contacting the at least one sample comprises dispensing the reagent to the well from above the substrate holder.

26. The method of claim 24, wherein the opening is at least 90% as large as a total surface area of the sample region, and wherein the total surface area of the sample region is at least 190 mm$^2$.

27. The method of claim 24, wherein the substrate is a glass slide and the sample region comprises a plurality of spatially-barcoded capture probes.

28. The method of claim 24, wherein the base has a short side and a long side, the cover has a short side and a long side, and wherein the substrate holder comprises a hinge pivotally coupling the short side of the base to the short side of the cover;

wherein releasably locking the cover to the base further comprises rotating the cover about the hinge;

wherein the first cover tab comprises a contacting surface that is complementary to, and configured to engage with, the first base tab; and wherein releasably locking the cover to the base further comprises engaging the contacting surface of the first cover tab with the first base tab.

29. The method of claim 24, wherein contacting the at least one sample with the reagent comprises permeabilizing at least a portion of the at least one sample via a permeabilization agent of the reagent;

the method comprising:

after permeabilizing at least the portion of the at least one sample via the permeabilization agent of the reagent, performing reverse transcription, second strand cDNA synthesis, and preparation of a cDNA library.

30. The method of claim 1, wherein contacting the at least one sample with the reagent comprises dispensing the reagent to the well from above the substrate holder.

\* \* \* \* \*